United States Patent
Iwamoto et al.

(10) Patent No.: US 8,406,611 B2
(45) Date of Patent: Mar. 26, 2013

(54) INTEGRATED CIRCUIT FOR USE IN A PLAYBACK APPARATUS

(75) Inventors: Hiroaki Iwamoto, Hirakata (JP); Wataru Ikeda, Osaka (JP); Tomoyuki Okada, Nara (JP); Masafumi Okubo, Osaka (JP)

(73) Assignee: Panasonic Corporation, Osaka (JP)

( * ) Notice: Subject to any disclaimer, the term of this patent is extended or adjusted under 35 U.S.C. 154(b) by 805 days.

(21) Appl. No.: 12/581,193

(22) Filed: Oct. 19, 2009

(65) Prior Publication Data
US 2010/0034518 A1 Feb. 11, 2010

Related U.S. Application Data

(63) Continuation of application No. 12/241,517, filed on Sep. 30, 2008, now Pat. No. 7,627,233, which is a continuation of application No. 10/549,318, filed as application No. PCT/JP2004/016598 on Nov. 9, 2004, now Pat. No. 7,565,062.

(30) Foreign Application Priority Data

Nov. 10, 2003 (JP) .................................. 2003-380464
Sep. 8, 2004 (JP) .................................. 2004-261376

(51) Int. Cl.
*H04N 5/93* (2006.01)
*H04N 9/80* (2006.01)
(52) U.S. Cl. ..................... 386/281; 386/248; 386/290
(58) Field of Classification Search .............. 386/278, 386/281, 248, 262, 223, 290
See application file for complete search history.

(56) References Cited

U.S. PATENT DOCUMENTS

| | | | |
|---|---|---|---|
| 5,508,994 | A | 4/1996 | Nakamichi et al. |
| 5,541,738 | A | 7/1996 | Mankovitz |
| 6,580,870 | B1 | 6/2003 | Kanazawa et al. |
| 6,728,174 | B1 | 4/2004 | Sako et al. |
| 7,369,747 | B2 | 5/2008 | Ando et al. |
| 7,565,062 | B2 * | 7/2009 | Iwamoto et al. .............. 386/240 |

(Continued)

FOREIGN PATENT DOCUMENTS

| | | |
|---|---|---|
| CN | 1096126 | 12/1994 |
| CN | 1288226 | 3/2001 |

(Continued)

OTHER PUBLICATIONS

Peng et al., "Digital television application manager," Multimedia and Expo, 2001, ICME 2001, IEEE International Conference on Aug. 22-25, 2001, Piscataway, NJ, USA, IEEE, Aug. 22, 2001, pp. 685-688, ISBN: 0-7695-1198-8.

(Continued)

*Primary Examiner* — Robert Chevalier
(74) *Attorney, Agent, or Firm* — Greenblum & Bernstein, P.L.C.

(57) ABSTRACT

A machine readable disc in which a machine readable application program, a digital stream, and management information including plural pieces of play list information which define playback paths of the digital stream are recorded. The machine readable application program is readable by a virtual machine included in a machine. A life cycle during which the machine readable application program can be read and executed by the virtual machine is specified. The management information includes information that indicates a predetermined piece of play list information, among plural pieces of play list information, which defines a playback path of the digital stream that is played back by a playback control engine included in the machine during the life cycle, simultaneously with the execution of the machine readable application program.

9 Claims, 54 Drawing Sheets

U.S. PATENT DOCUMENTS

| | | |
|---|---|---|
| 7,912,357 B2 | 3/2011 | Jung |
| 8,009,530 B2 | 8/2011 | Kato et al. |
| 2002/0009042 A1 | 1/2002 | Ikedo et al. |
| 2002/0012517 A1 | 1/2002 | Ichioka et al. |
| 2002/0024904 A1 | 2/2002 | Kobayashi et al. |
| 2002/0141741 A1 | 10/2002 | Zou et al. |
| 2002/0186485 A1 | 12/2002 | Cho et al. |
| 2002/0194618 A1 | 12/2002 | Okada et al. |
| 2003/0021590 A1 | 1/2003 | Jung |
| 2003/0161615 A1 | 8/2003 | Tsumagari et al. |
| 2005/0262149 A1 | 11/2005 | Jung et al. |
| 2007/0172207 A1 | 7/2007 | Cho et al. |
| 2007/0274180 A1 | 11/2007 | Kato et al. |
| 2011/0262107 A1 | 10/2011 | Kato et al. |

FOREIGN PATENT DOCUMENTS

| | | |
|---|---|---|
| CN | 1325108 | 12/2001 |
| CN | 1338731 | 3/2002 |
| CN | 1341936 | 3/2002 |
| EP | 1672637 | 6/2006 |
| JP | 6-4166 | 1/1994 |
| JP | 6-230946 | 8/1994 |
| JP | 2813245 | 8/1998 |
| JP | 10-293703 | 11/1998 |
| JP | 11-161663 | 6/1999 |
| JP | 2001-056772 | 2/2001 |
| JP | 2002-063051 | 2/2002 |
| JP | 2002-262233 | 9/2002 |
| JP | 2002-369154 | 12/2002 |
| JP | 2003-061055 | 2/2003 |
| JP | 2003-123389 | 4/2003 |
| JP | 2003-249057 | 9/2003 |
| JP | 2003-274306 | 9/2003 |
| JP | 2005-159589 | 6/2005 |
| JP | 2007-538456 | 12/2007 |
| KR | 10-1998-0072969 | 11/1998 |
| KR | 10-2003-0010086 | 2/2003 |
| WO | 01/04743 | 1/2001 |
| WO | 01/37269 | 5/2001 |
| WO | 2005/124763 | 12/2005 |
| WO | 2006/031054 | 3/2006 |

OTHER PUBLICATIONS

Japan Office action, mail date is Nov. 30, 2010.
Japan Office action, mail date is Jan. 17, 2012.
China Office action, dated Jul. 13, 2012 along with an english translation thereof.
Korea Office action, mail date is Sep. 14, 2011.

* cited by examiner

FIG.16

Title with No PLMT (Title with Only Control Procedure)

1st Row: Title(title_id)

2nd Row: BD-J Object (bobj_id)

3rd Row: Application Management Table

4th Row: Application

FIG.20A Application Management Table (AMT)

| life_cycle |
|---|
| apli_id_ref |
| run_attribute |
| run_priority |

FIG.20B Application Management Table (AMT)

| life_cycle | apli_id_ref | run_attribute | run_priority |
|---|---|---|---|
| Application "Life Cycle" Represented by Title, PL, Chapter | Reference Value for "Application ID" Being 5-Digit Integer ZZZZZ Assigned to JAR File Name | "Run Attribute" That Is Auto Run, Present (No Specification), or Suspend | "Run Priority" That Takes Value Ranging from 0 to 255 |

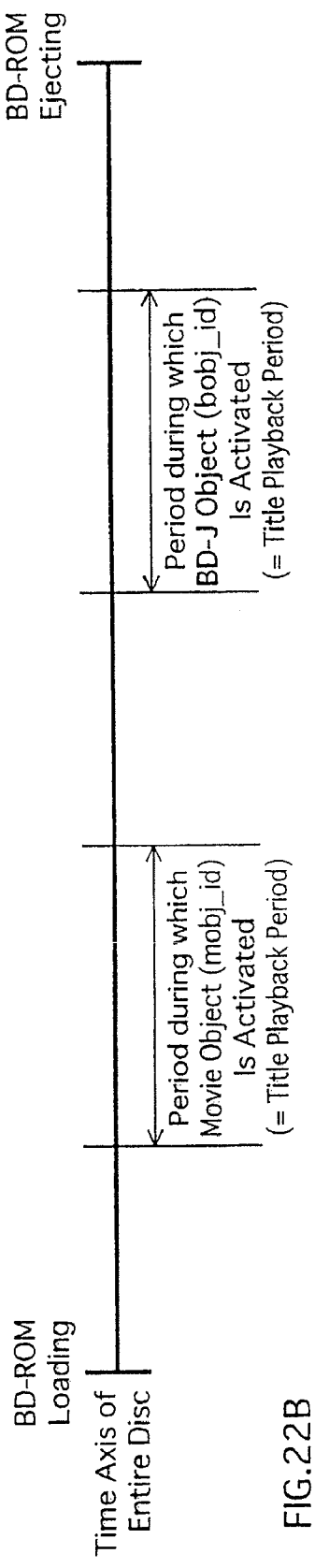
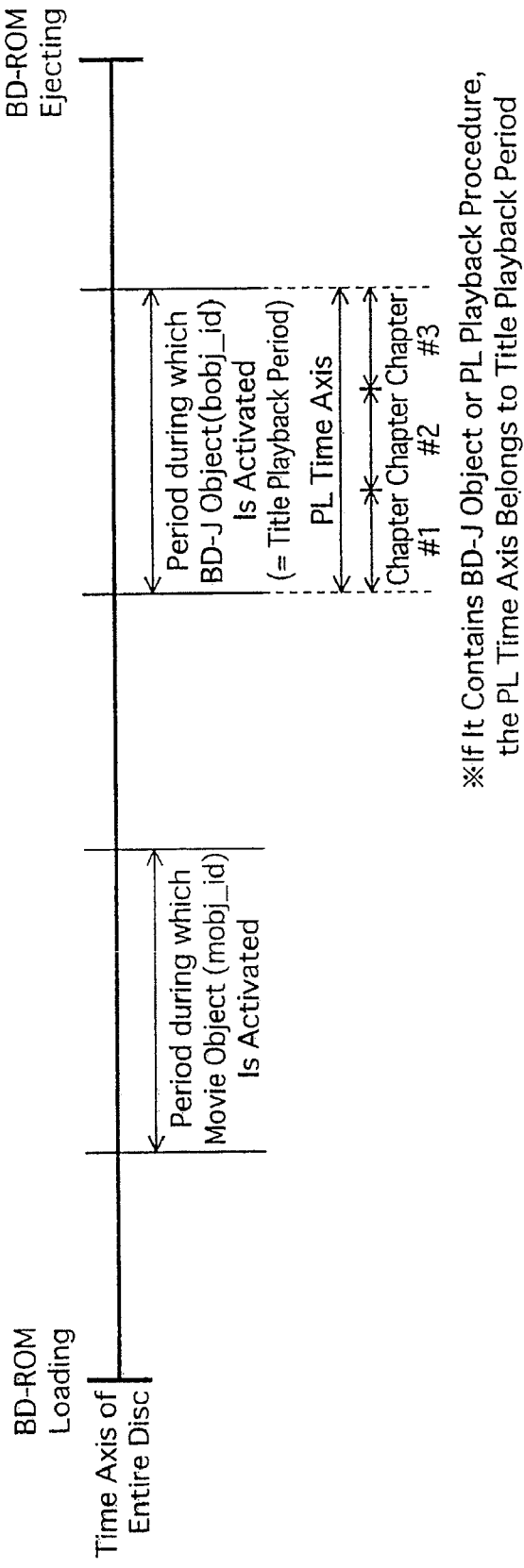
FIG.22A
FIG.22B

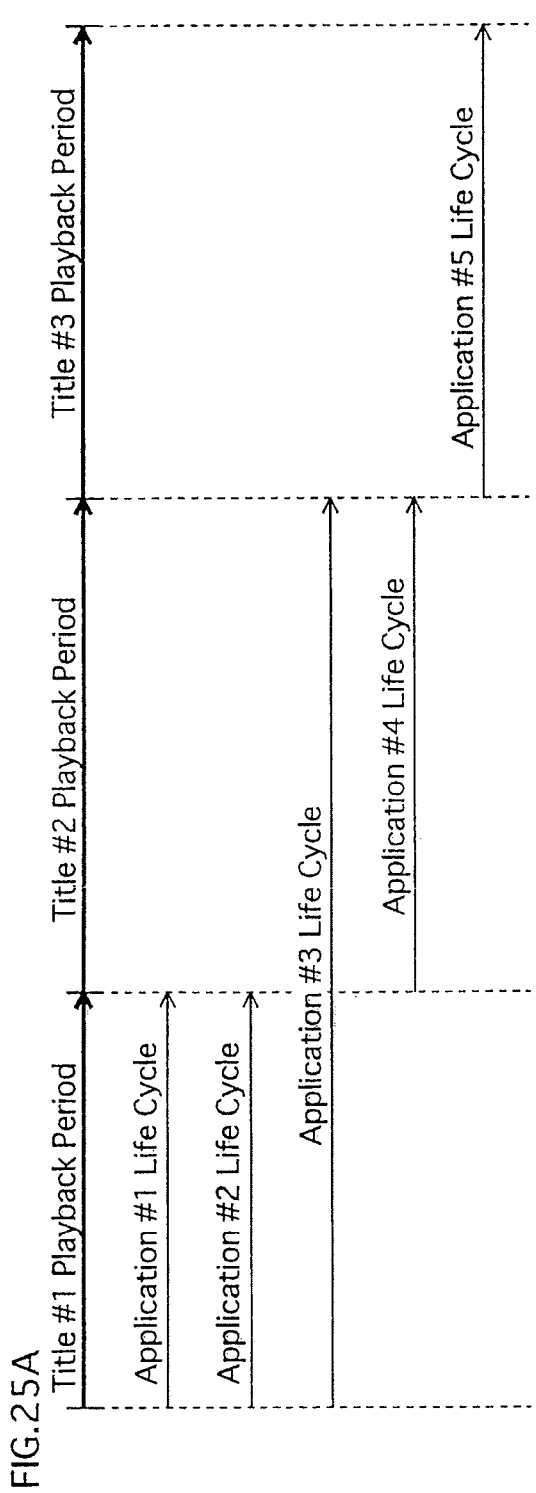

FIG.26

Application Status Change According to Run Attribute

| | | Run Attribute | | |
|---|---|---|---|---|
| | | Present | AutoRun | Suspend |
| Application Status in Previous Title | Not Run | Maintain Status with No Operation | Start Application | Maintain Status with No Operation |
| | Running | Maintain Status with No Operation | Maintain Status with No Operation | Suspend |
| | Suspend | Resume | Resume | Maintain Status with No Operation |

FIG.27A

Play List Management Table (PLMT)

| PL_id_ref | Playback_Attribute |
|---|---|

FIG.27B

Play List Management Table (PLMT)

| PL_id_ref | Playback_Attribute |
|---|---|
| "Play List ID" Being 5-Digit Value in MPLS File Name | "Playback Attribute" That Is Auto Play or Present (No Specification) |

FIG.28

| | Branch Destination Title Has No PLMT | Branch Destination Title Has PLMT | |
|---|---|---|---|
| | | Playback Attribute : Auto Play | Playback Attribute : Present |
| Branch Source Title Being Played Back | Stop Playback | Maintain Status | Maintain Status |
| Branch Source Title Not Being Played Back | Maintain Status | Start Automatic Playback | Maintain Status |

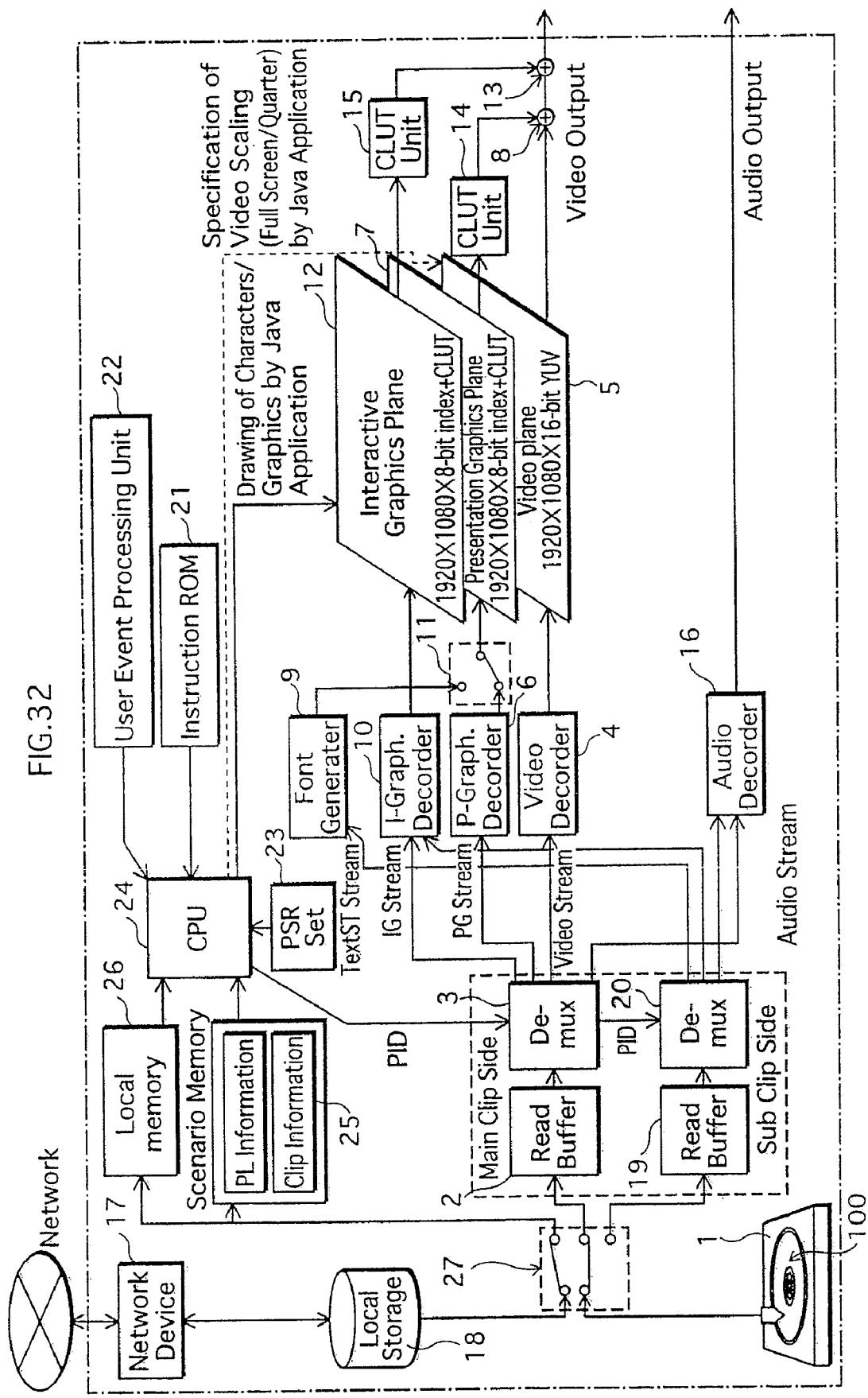

xlet Loading and Activation Control

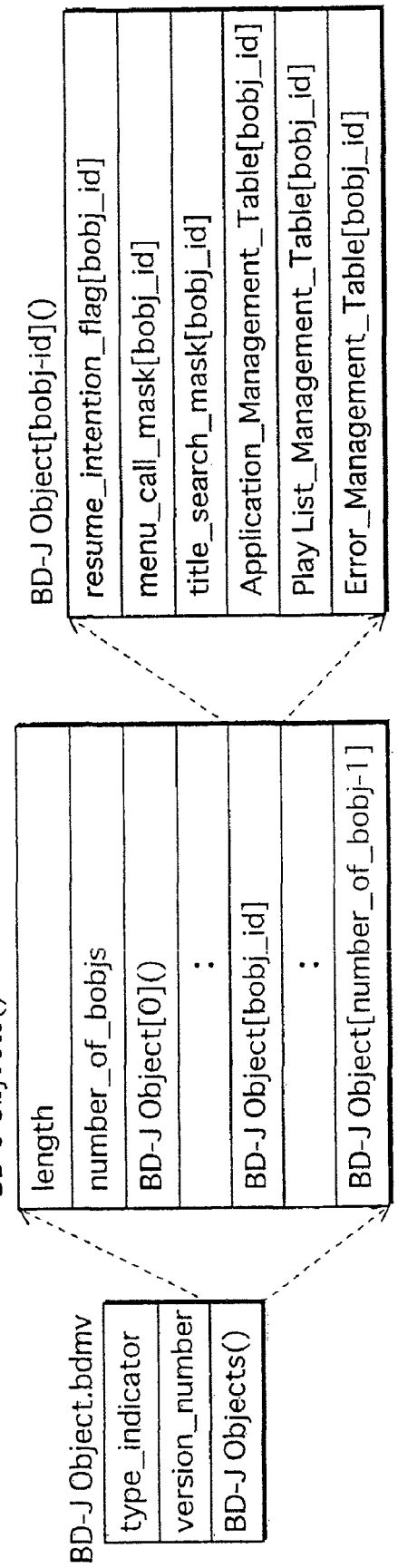
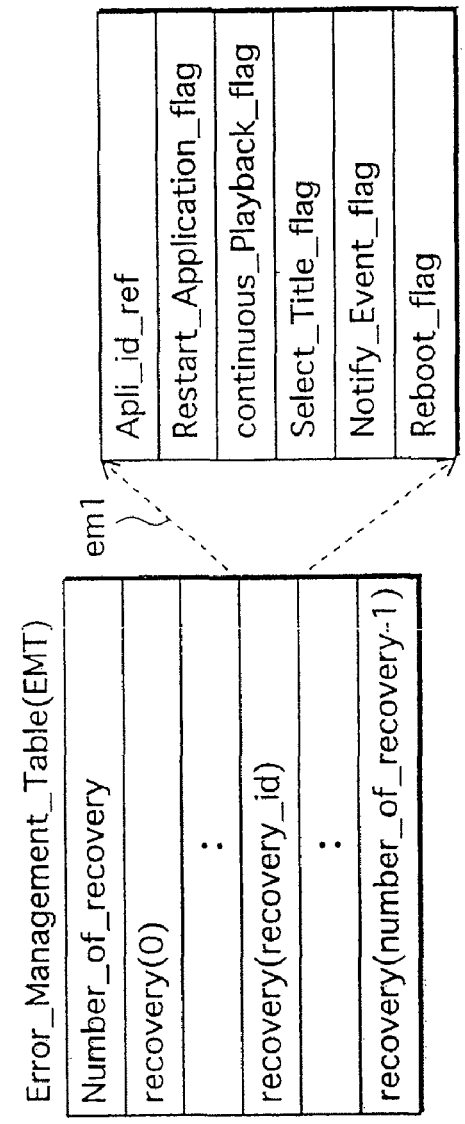
FIG.41A
FIG.41B

FIG.42

Recovery()

| | Value | Default |
|---|---|---|
| Restart_Application_Flag (Restart Application) | 0 : No<br>n : Number of Restarts | 0 |
| Continuous_Playback_Flag (Continuous Playback of PlayList) | 0 : No<br>1 : Yes<br>2 : Full Screen/Normal Speed Playback | 0 |
| Select_Title_Flag (Select Title) | 0 : No<br>n : Title Number | 0 |
| Notify_Event_Flag (Notify Event) | 0 : No<br>n : Event Number | 1 |
| Reboot_Flag (Reboot System) | 0 : No<br>1 : Yes | 0 |

FIG. 48A  Selection Algorithm by Parental Level

| PSR range | Play List_id_ref |
|---|---|
| PSR(13)<14 | Play List #1 |
| 14≦PSR(13)<18 | Play List #2 |
| 18≦PSR(13) | Play List #3 |

FIG. 48B  Selection Algorithm by Language Code for Audio

| PSR range | Play List_id_ref |
|---|---|
| PSR(16)=English | Play List #1 |
| PSR(16)=Japanese | Play List #2 |
| PSR(16)=others | Play List #3 |

FIG. 48C  Selection Algorithm by Player Configuration for Video

| PSR range | Play List_id_ref |
|---|---|
| PSR(14)=525×60 TV system 4:3 Letter Box | Play List #1 |
| PSR(14)=525×60 TV system 16:9 | Play List #2 |
| PSR(14)=1920×1080TV system | Play List #4 |

INTEGRATED CIRCUIT FOR USE IN A PLAYBACK APPARATUS

CROSS-REFERENCE TO RELATED APPLICATIONS

This application is a continuation of pending U.S. patent application Ser. No. 12/241,517, filed Sep. 30, 2008, which is a continuation of pending U.S. patent application Ser. No. 10/549,318, filed Sep. 16, 2005, issued as U.S. Pat. No. 7,565,062 on Jul. 21, 2009, which is a U.S. National Stage Patent Application of PCT/JP2004/016598, filed Nov. 9, 2004, the disclosures of which are expressly incorporated herein by reference in its entirety. The International Application was not published under PCT Article 21(2) in English.

This application claims priority of Japanese Patent Application Nos. 2003-380464, filed Nov. 10, 2003 and 2004-261376, filed Sep. 8, 2004, the disclosures of which are expressly incorporated by reference herein.

TECHNICAL FIELD

The present invention relates to a field of application control technology for controlling execution of applications in a virtual machine, and more specifically to an applied technology for applying the control technology to a recording medium such as BD-ROM used for distributing a movie work, and applying it to a BD-ROM playback apparatus.

BACKGROUND ART

The application control technology, such as the Java™ programming, for virtual machines has been widespread in the personal computer software industry. Currently, how the Java (Registered Trademark, herein after ™) programming, as a development from personal computer software, can be used to achieve playback control in BD-ROM (Blu-ray Disc Read Only Memory) playback apparatuses is studied eagerly.

As a conventional technology in regards with a similar playback apparatus, the technology recited in the following Patent Document 1 is known.

Patent Document 1: Japanese Patent Publication No. 2813245

DISCLOSURE OF THE INVENTION

The Problems the Invention is Going to Solve

Meanwhile, the operation of applications created by the Java™ programming is unstable, the operation status changing depending on the resource use status and the load of CPU. Therefore, it often happens that a shortage of, resource occurs, which causes a start-up failure of an application or causes an application to terminate abnormally, resulting a black-out of the apparatus. This may not be regarded as a serious problem in the personal computer software industry. In the field of manufacturing consumer products such as BD-ROM playback apparatus, however, such phenomenon may be regarded a quality problem. For this reason, many makers hesitated to achieve the apparatus control by the Java™ programming. (Note: the black-out means such a status in which software in the apparatus freezes and the display screen turns black)

It is the object of the present invention to provide a recording medium that can achieve a Fail Safe when an application that controls the recording medium terminates abnormally, or when a start-up failure of the application occurs.

Means to Solve the Problems

The above object is fulfilled by a recording medium in which an application, a digital stream, and management information are recorded, wherein the application is a program that is written in a programming language for a virtual machine, a life cycle during which the application can be executed by the virtual machine is specified, and the management information indicates a playback control of the digital stream that is performed during the life cycle simultaneously with the execution of the application.

Effects of the Invention

According to the recording medium of the present invention, with the arrangement of defining, for each life cycle, the playback control of the digital stream, which is to be performed simultaneously with the execution of the application, if a start-up failure of the application occurs or if the application terminates abnormally in the middle of the execution of the application, the simultaneously performed playback of the digital stream is continued, which provides the status in which "something is displayed on the screen". With such an arrangement, the worst case scenario that the apparatus blacks out can be avoided. This gives a minimum sense of assurance to the maker of the apparatus.

Such provision of the sense of assurance will strongly push the makers who are nervous about the quality problem toward the development of the playback apparatus control by the Java™ application. With such a strong push, the playback apparatus will become less expensive and more varied, and then the contents of the BD-ROM will be enriched, which will strongly lead the contents-related industry in the growth.

BRIEF DESCRIPTION OF THE DRAWING

FIG. 16 shows a Title that does not include the PlayList Management Table.

FIG. 20A shows the internal structure of the application management table.

FIG. 20B shows the meaning of the information elements that constitute the application management table.

FIGS. 22A and 22B show, in the time axis of the entire BD-ROM, Title playback periods that are identified by a BD-J Object that is identified by the identifier "bobj_id".

FIGS. 25A and 25B show examples of the application management table and the life cycle.

FIG. 26 shows combinations of the three run attributes (Present, AutoRun, and Suspend) and three possible statuses of the previous Title (Not Run, Running, and Suspend).

FIG. 27A shows the internal structure of the PlayList management table.

FIG. 27B shows the meaning of the information elements that constitute the PlayList management table.

FIG. 28 shows six combinations of three possible statuses of the branch destination Title ((i) Not having PlayList management table, (ii) Having PlayList management table and AutoPlay, and (iii) Having PlayList management table and Present) and two possible statuses of the PL in the previous Title (Not being played back, and Being played back).

FIG. 32 shows the internal structure of the playback apparatus of the present invention.

FIG. 41A shows the internal structure of the BD-J Object in Embodiment 2.

FIG. 41B shows the internal structure of the error management table.

FIG. 42 shows the meaning of the five flags in the error management table.

FIG. 48A shows the contents of the selection algorithm based on the parental level.

FIG. 48B shows the contents of the selection algorithm based on Language for Audio.

FIG. 48C shows the contents of the selection algorithm based on Player Configuration for Video.

DESCRIPTION OF CHARACTERS

Figure 1:
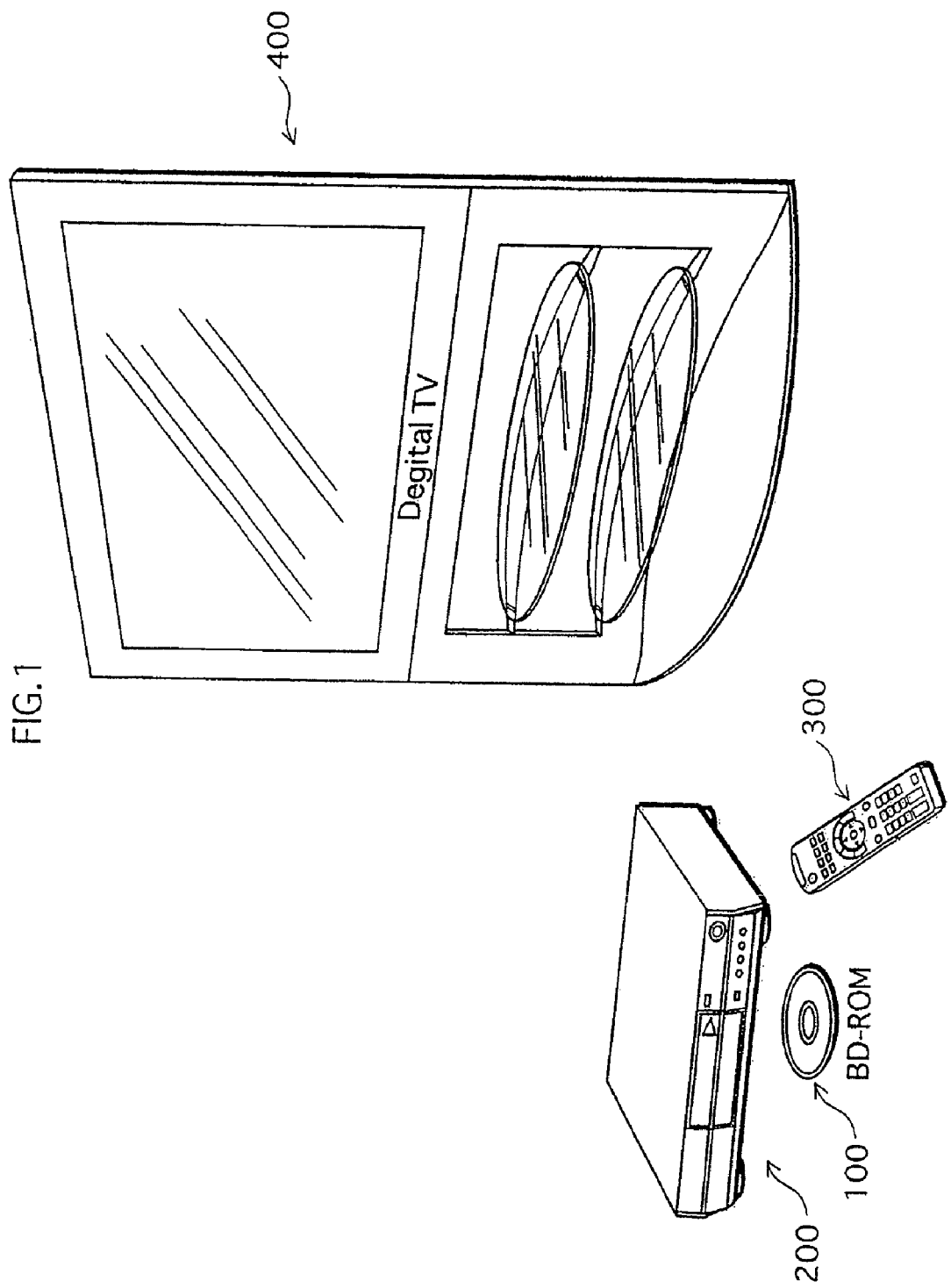
FIG. 1 shows a use form of the playback apparatus of the present invention.

1 BD-ROM drive
2 read buffer
3 demultiplexer
4 video decoder
5 video plane
6 P-graphics decoder
7 presentation graphics plane
8 combining unit
9 font generator
10 I-graphics decoder
11 switch
12 interactive graphics plane
13 combining unit
14 CLUT unit
15 CLUT unit
16 audio decoder
22 user event processing unit
23 PSR set
24 CPU
25 scenario memory
26 local memory
33 HDMV module
34 module manager
35 BD-J module
36 application manager
37 UO controller
38 Java™ virtual machine
41 PLMT processor
42 permission controller 52 user class loader
53 method area
54 work memory
55a, 55b, ... 55n threads
56a, 56b, ... 56n Java™ stacks

BEST MODE FOR CARRYING OUT THE INVENTION

Embodiment 1

The following describes embodiments of the recording medium of the present invention. First, the use form of the recording medium of the present invention will be described. In FIG. 1, the recording medium of the present invention is a BD-ROM 100. The BD-ROM 100 is used for providing contents to a home theater system that is composed of a playback apparatus 200, a remote control 300, and a television 400.

Of these, the remote control 300 is provided with keys such as Play, Stop, Pause On, Pause Off, Still Off, Forward Play (with specification of the speed), Backward Play (with specification of the speed), Audio Change, SubTitle Change, and Angle Change that are used to receive instructions for these functions, Move Up, Move Down, Move Right, and Move Left that are used to receive instructions for moving the focus during a menu operation, Pop Up that is used to receive an instruction for displaying a menu, and Numeric keys that are used to receive numeric inputs.

Up to now, the use form of the recording medium of the present invention has been described.

Figure 2:
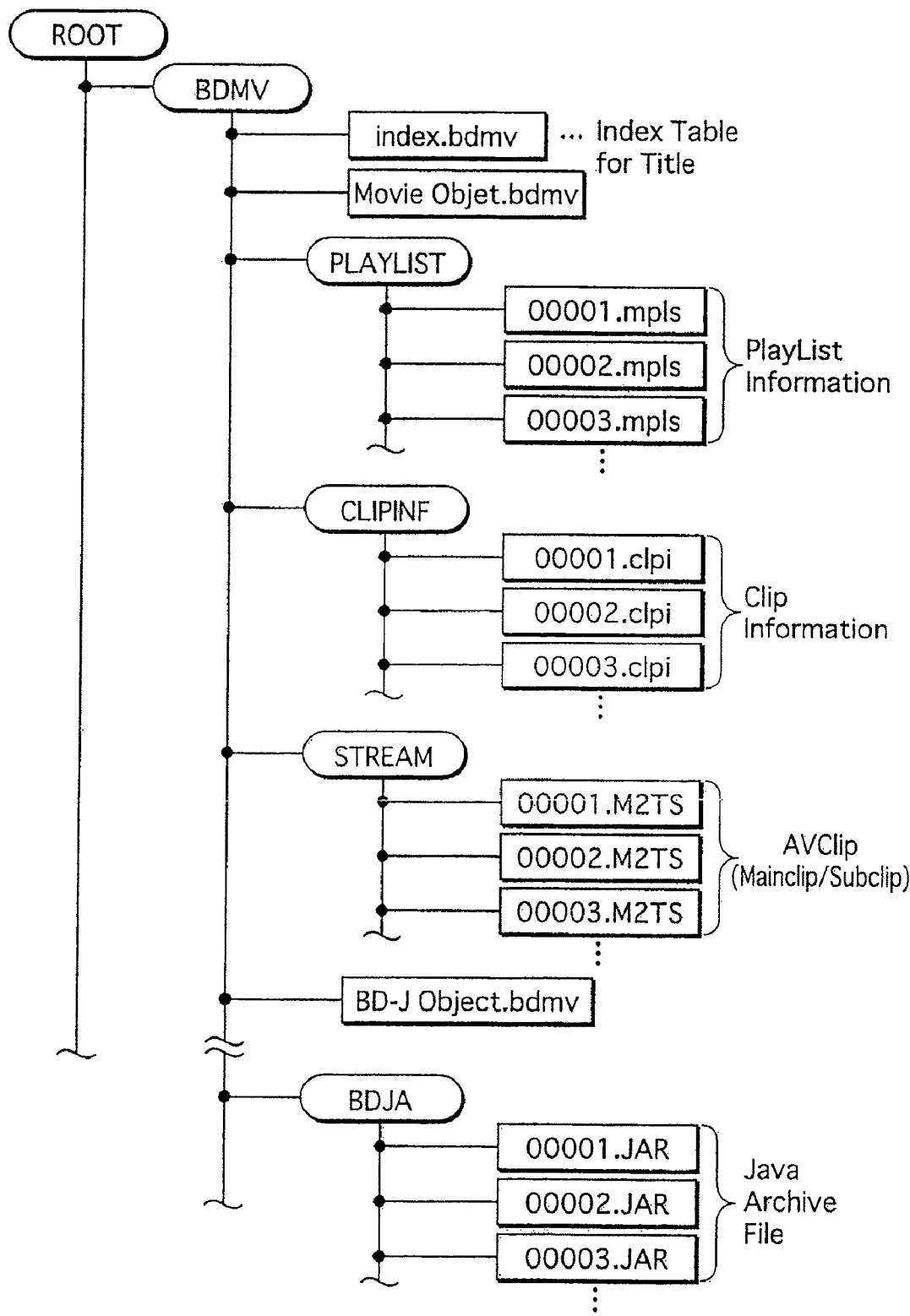
FIG. 2 shows a file/directory structure for BD-ROM.

The following describes the manufacturing of the recording medium of the present invention. The recording medium of the present invention can be achieved as an improvement in a file system on a BD-ROM. FIG. 2 shows a file/directory structure for BD-ROM. As FIG. 2 indicates, for BD-ROM, the BDMV directory is provided under the root directory.

The BDMV directory has files to which extension "bdmv" has been attached ("index.bdmv", "Movie Object.bdmv", "BD-JObject.bdmv"). Under the BDMV directory, there are four sub-directories: PLAYLIST, CLIPNF, STREAM, and BDJA directories. The PLAYLIST directory has files to which extension "mpls" has been attached ("00001 mpls", "00002.mpls", "00003.mpls").

The CLIPNF directory has files to which extension "clpi" has been attached ("00001.clpi", "00002.clpi", "00003.clpi"). The STREAM directory has files to which extension "m2ts" has been attached ("00001.m2ts", "00002.m2ts", "00003.m2ts"). The BDJA directory has files to which extension "jar" has been attached ("00001.jar", "00002.jar", "00003.jar"). As understood from the above description, the directory structure enables different types of files to be recorded on a BD-ROM.

In FIG. 2, the files to which extension "m2ts" has been attached ("00001.m2ts", "00002.m2ts", "00003.m2ts", ... ) contain AVClips that are classified into types such as MainClip and SubClip. A MainClip is a digital stream that is obtained by multiplexing a plurality of elementary streams such as a video stream, an audio stream, a presentation graphics stream (PG stream) that constitutes a subTitle, and an interactive graphics stream (IG stream) that constitutes a menu.

A SubClip is a digital stream that corresponds to one elementary stream such as an audio stream, a graphics stream, and a text subTitle stream (TextSTStream). The files to which extension "clpi" has been attached ("00001.clpi", "00002.clpi", "00003.clpi", ... ) are management information that corresponds to the AVClips on a one-to-one basis.

The Clip information, as the management information, has information regarding the encoding format of the streams in the AVClip, a frame rate, a bit rate, a resolution and the like, and "EP_map" that indicates a starting position of a GOP.

Figure 3:
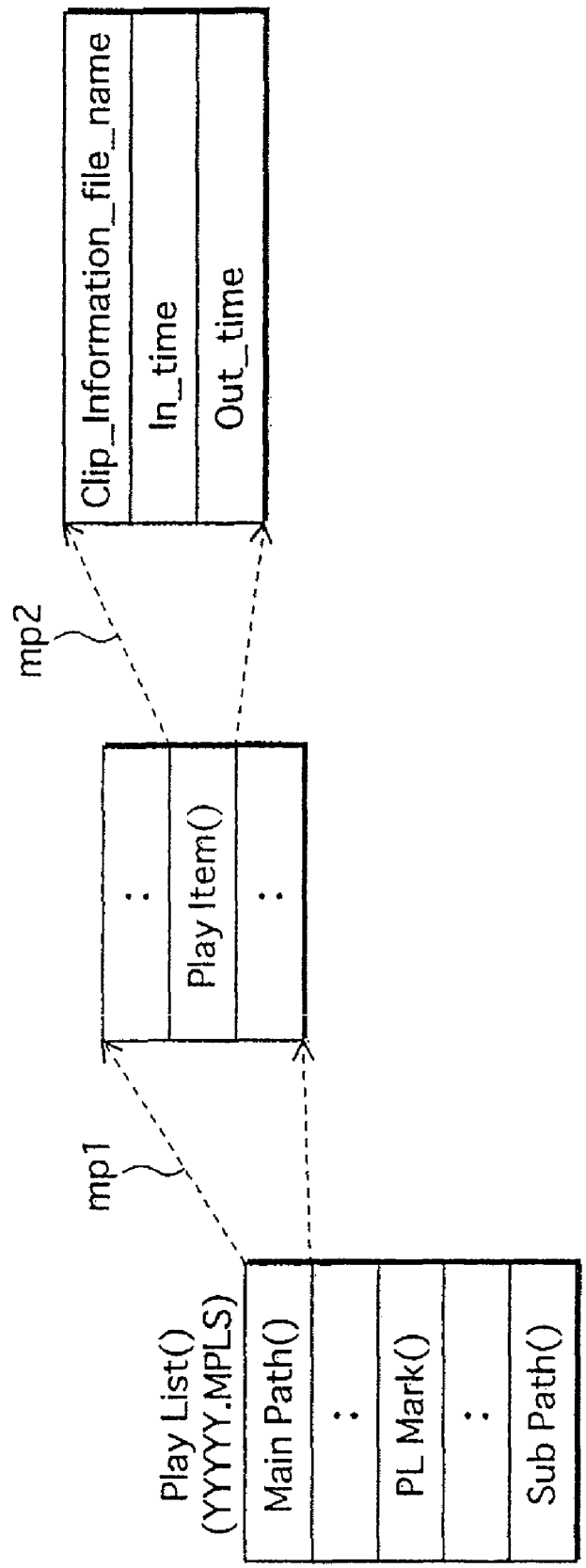
FIG. 3 shows the construction of the PlayList information.

The files to which extension "mpls" has been attached ("00001.mpls", "00002.mpls", "00003.mpls", ... ) are files that contain PlayList information. The PlayList information is information that defines a PlayList by referring to an AVClip. FIG. 3 shows the construction of the PlayList information. As shown on the left-hand side of FIG. 3, the PlayList information is composed of MainPath, PL Mark, and SubPath information.

Figure 4:
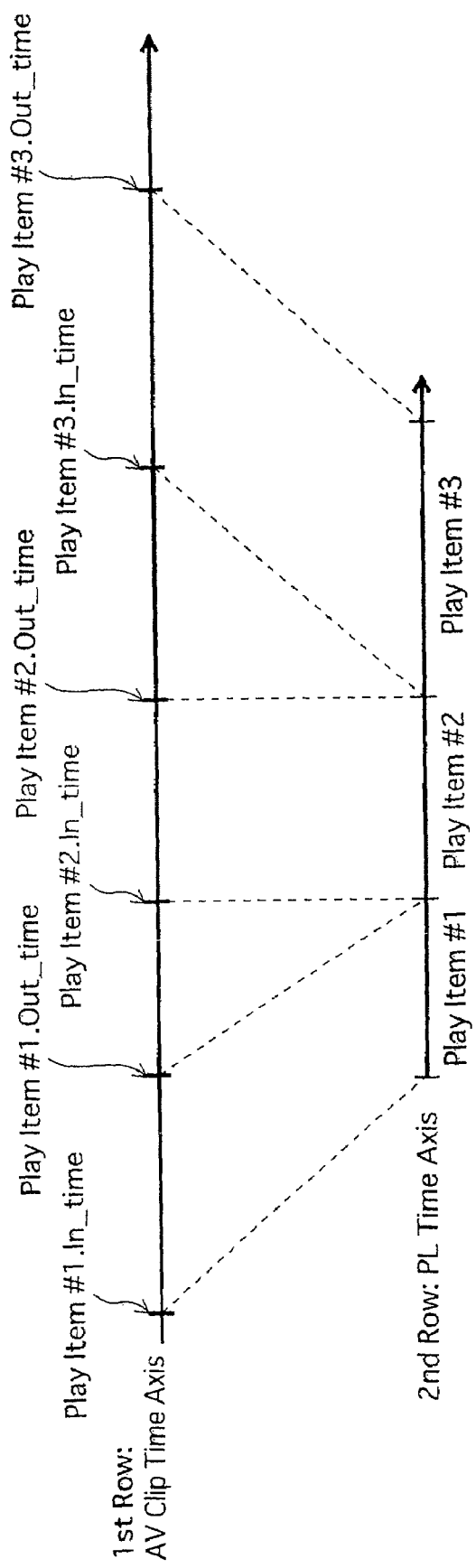
FIG. 4 shows relationships between the AVClip time axis and the PL time axis.

The MainPath information (MainPath( )) contains a plurality of pieces of PlayItem information (PlayItem( )) as indicated by the dotted line arrow "mp1". The PlayItem is a playback period that is defined by specifying "In_time" and "Out_time" on one or more AVClip time axes. An arrangement of a plurality of pieces of PlayItem information defines a PlayList (PL) that is composed of a plurality of playback periods. The dotted line arrow "mp2" in FIG. 3 indicates a closeup of the internal structure of the PlayItem information. As shown in FIG. 3, the PlayItem information is composed of "Clip_information_file_name" that indicates a corresponding AVClip, "In_time", and "Out_time". FIG. 4 shows relationships between an AVClip and a PL. The first row of the figure indicates the time axis of the AVClip, and the second row indicates the time axis of the PL. The PL information includes three pieces of PlayItem information: "PlayItem #1", "PlayItem #2", and "PlayItem #3". The In_times and Out_times of PlayItem #1, #2, and #3 define three playback periods. By arranging the three playback periods, a time axis that is different from the AVClip time axis is defined. That is the PL time axis shown in the second row. As apparent from this, it is possible, by defining the PlayItem information, to define a time axis that is different from an AVClip time axis.

Figure 5:
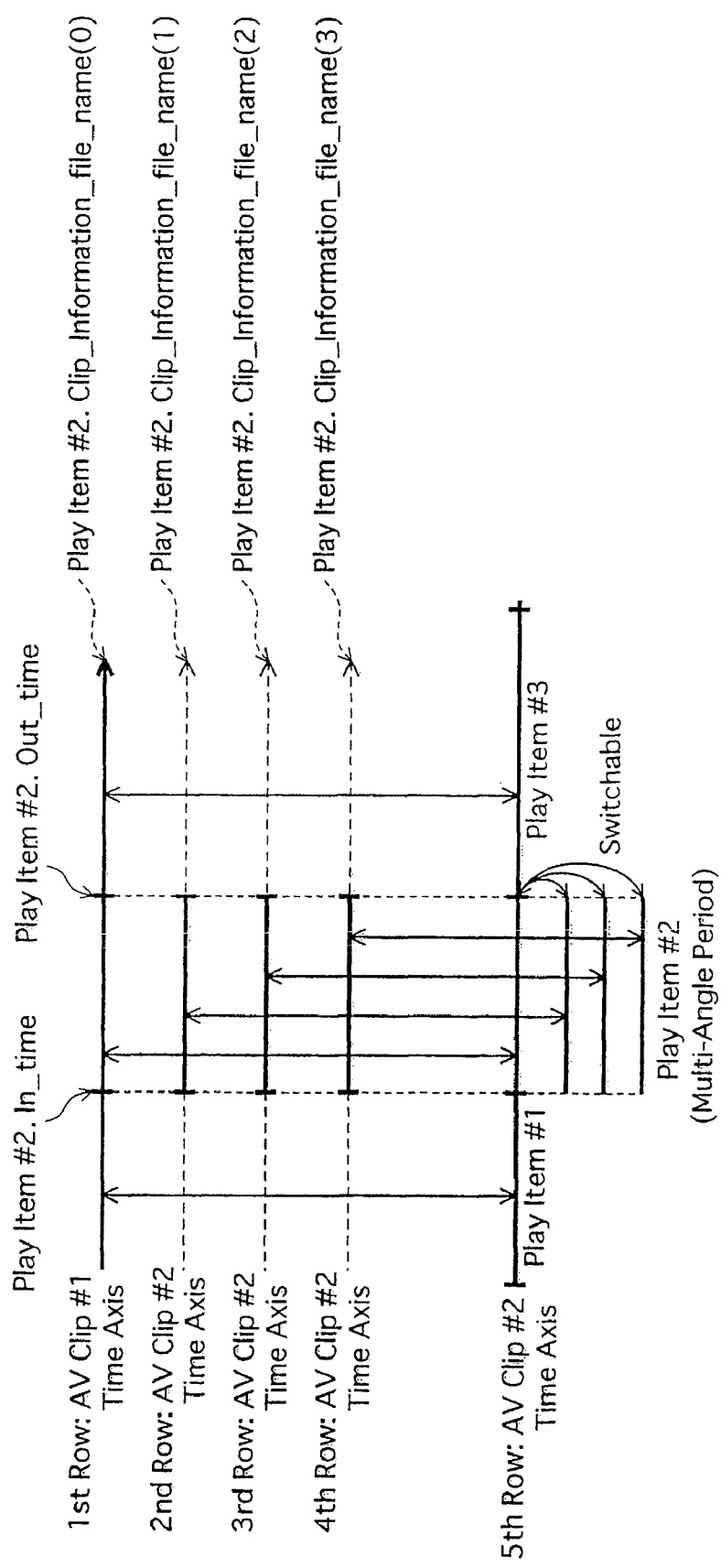
FIG. 5 shows a batch specification achieved by four Clip_information_file_names.

Basically, only one AVClip is specified. However, a plurality of AVClips may be specified by a batch specification. The batch specification is achieved by a plurality of Clip_information_file_names in the PlayItem information. FIG. 5 shows a batch specification achieved by four Clip_information_file_names. In FIG. 5, the first to fourth rows indicate four AVClip time axes (time axes of AVClip #1, #2, #3, and #4), and the fifth row indicates a PL time axis. The four time axes are specified by the four Clip_information_file_names contained in the PlayItem information. With such a construction, four playback periods, which can be selectably played back, are defined by the In_times and Out_times contained in the PlayItems. This enables the PL time axis to define a period (what is called a multi-angle period) in which a plurality of switchable angle images are provided.

Figure 6:
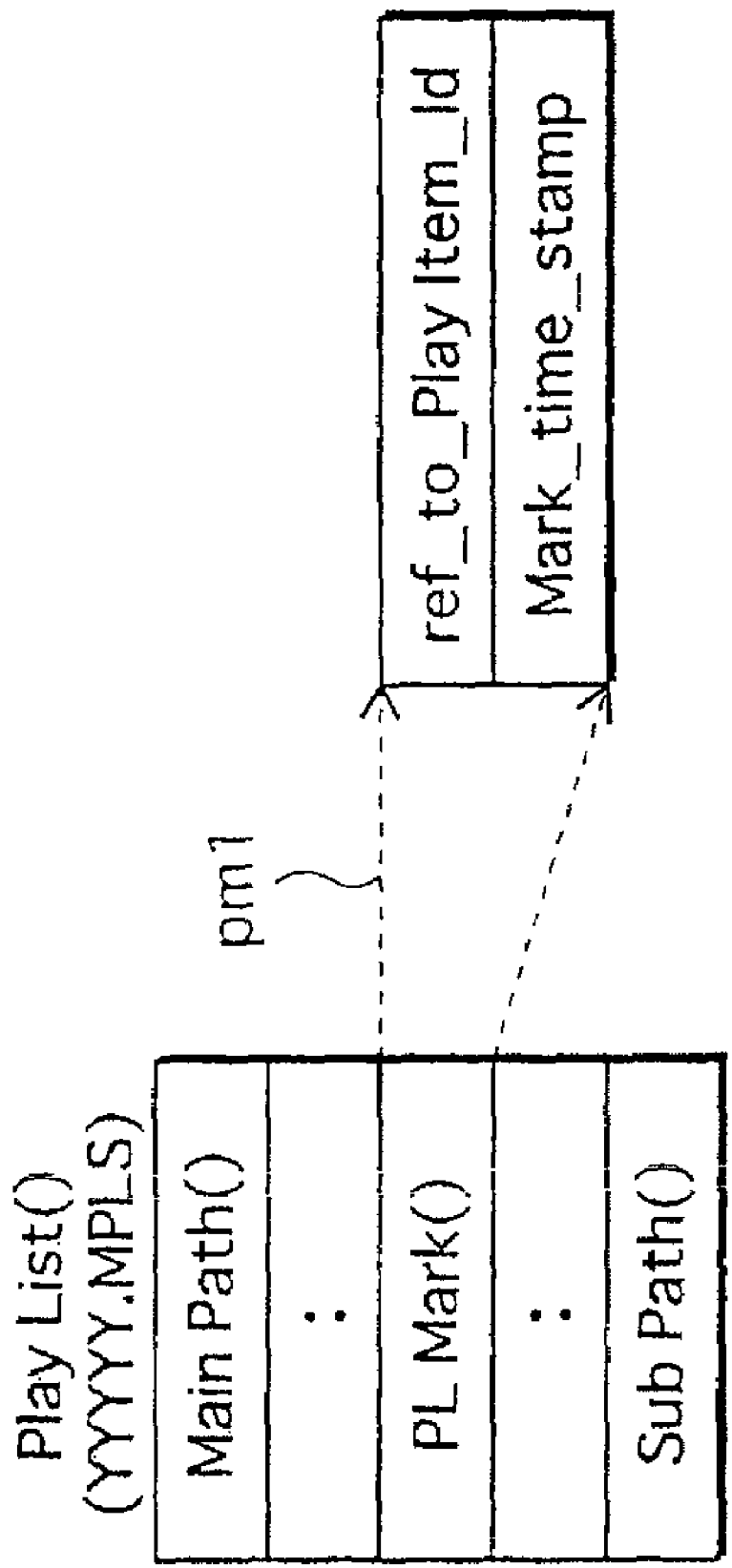
FIG. 6 shows the internal structure of the PL Mark information.
Figure 7:
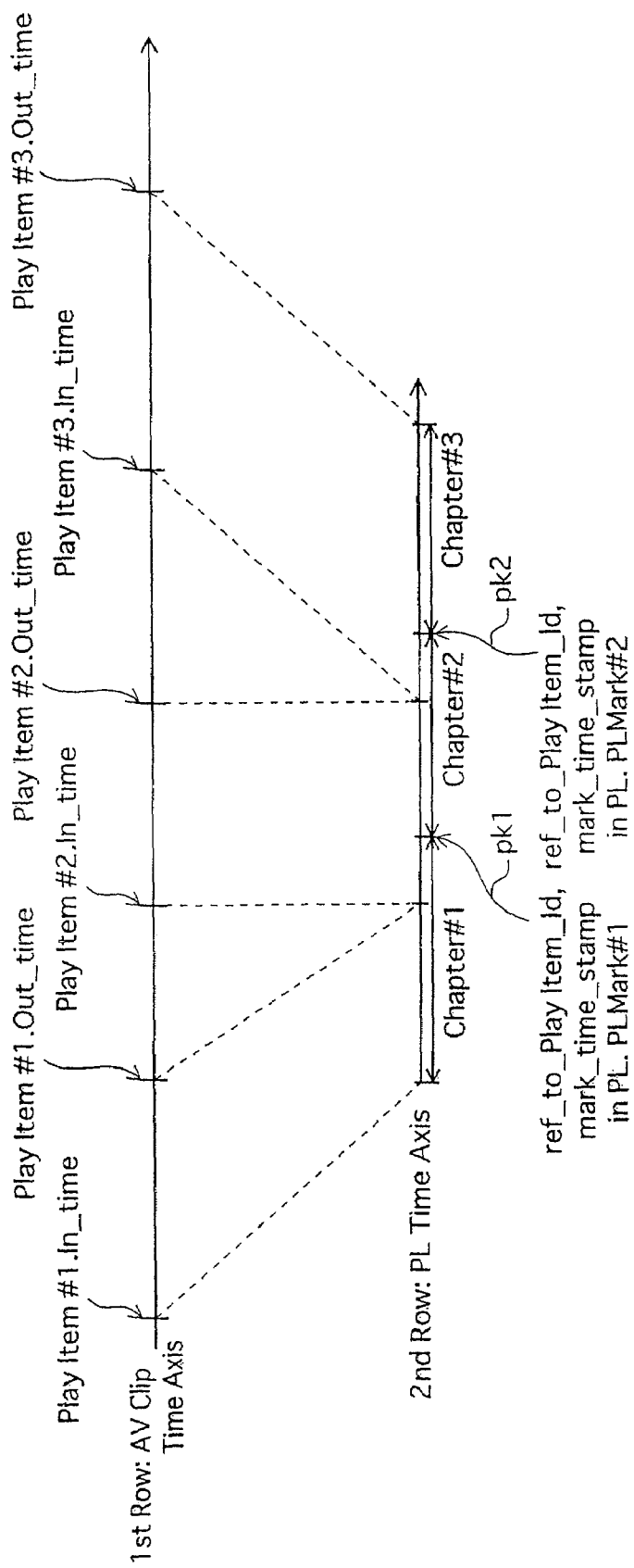
FIG. 7 shows definition of chapters by PL Marks.

The PLMark information (PL Mark( )) is information that specifies, as a chapter, a given period on the PL time axis. FIG. 6 shows the internal structure of the PL Mark information. As the leadline "pm1" in this figure indicates, the PL Mark information contains "ref_to_PlayItem_Id" and "Mark_time_stamp". FIG. 7 shows definition of chapters by PL Marks. In FIG. 7, the first row indicates an AVClip time axis, and the second row indicates a PL time axis. In FIG. 7, arrows "pk1" and "pk2" each indicate a specification of a PlayItem (ref_to_PlayItem_Id) and a specification of a point in time (mark_time_stamp) in a PL Mark. With these specifications, three chapters are defined on the PL time axis. Up to now, the PL Mark has been explained. The following describes the SubPath information.

Figure 8:
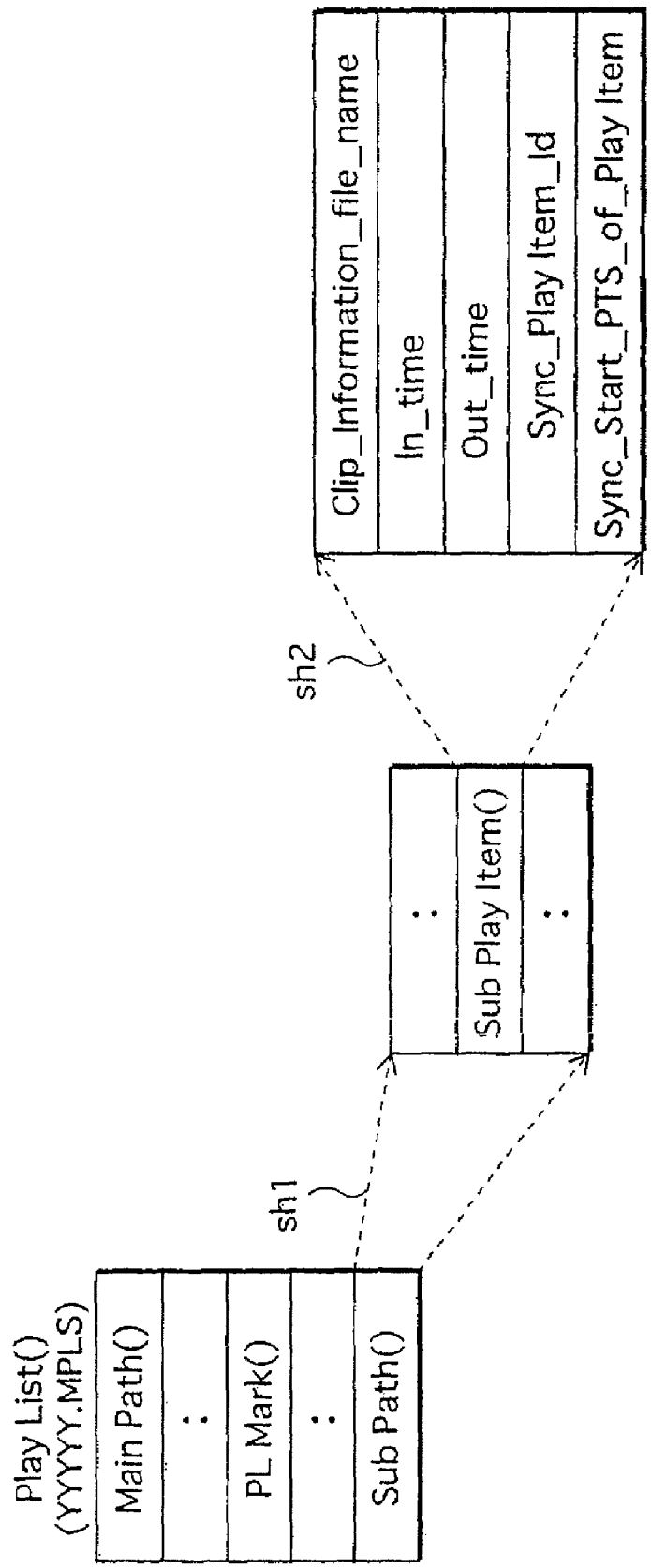
FIG. 8 shows the internal structure of SubPath information.

The SubPath information (SubPath( )) is information that defines one or more playback periods by specifying In_Time and Out_Time on the SubClip time axis. FIG. 8 shows the internal structure. As the dotted lead line "sh1" in FIG. 8 indicates, the SubPath information is composed of a plurality of pieces of SubPlayItem information (SubPlayItem ( )). As the dotted line "sh2" indicates, The SubPlayItem information is composed of "Clip_information_file_name", "In_time", "Out_time", "Sync_PlayItem_Id", and "Sync_start_Pts_of_PlayItem". The In_Time and Out_Time on the SubClip time axis are specified by "Clip_information_file_name", "In_time", and "Out_time". The "Sync_PlayItem_Id" and "Sync_start_Pts_of_PlayItem" are used for a synchronization specification to synchronize a playback period on the SubClip time axis with the PL time axis. With the synchronization specification, the SubClip time axis and the PL time axis proceed in synchronization.

Figure 9:
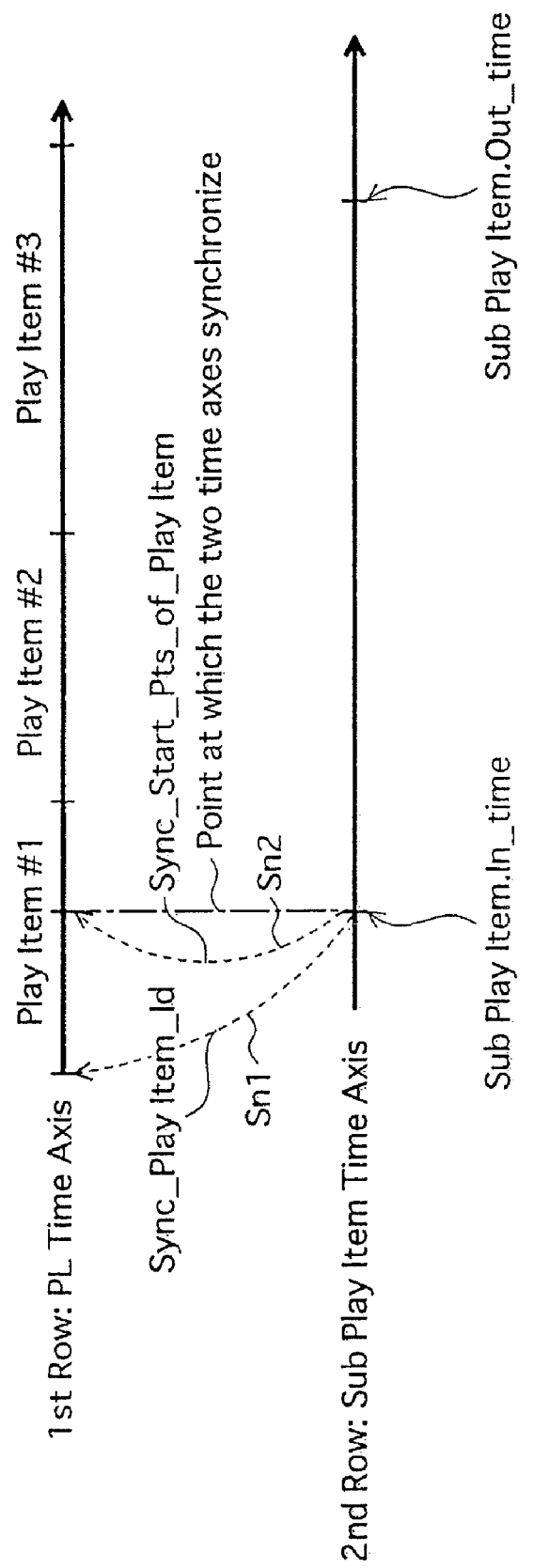
FIG. 9 shows how the synchronization specification and definition of a playback period on the SubPlayItem time axis are done.

FIG. 9 shows how the synchronization specification and definition of a playback period on the SubPlayItem time axis are done. In FIG. 9, the first row indicates the PL time axis, and the second row indicates the SubPlayItem time axis. In FIG. 9, SubPlayItem. In_time and SubPlayItem. Out_time respectively indicate the start point and end point of the playback period. It is understood from this that the playback period is defined also on the SubClip time axis. The Sync_PlayItem_Id corresponding to the arrow Sn1 indicates the synchronization specification for a PlayItem, and Sync_start_Pts_of_PlayItem corresponding to the arrow sn2 indicates specification of a point in time in the PlayItem on the PL time axis.

The PlayList information in BD-ROM is characterized by its ability to define a multi-angle period and a synchronization period, where switching among a plurality of AVClips is possible in the multi-angle period, and having an AVClip synchronized with a SubClip is possible in the synchronization period. The above-described Clip information and PlayList Information are categorized as "static scenario". This is because the Clip information and PlayList Information define a PL that is a static playback unit. This completes the description of the static scenario.

The following describes the "dynamic scenario". The dynamic scenario is scenario data that dynamically defines the playback control of an AVClip. Here, "dynamically" means that the playback control can change in accordance with a status change of the playback apparatus or a key event from the user. BD-ROM presumes two modes as the operation environment for the playback control. The first mode is an operation environment similar to the operation environment of the DVD playback apparatus, and is a command-based execution environment. The second mode is an operation environment of the Java™ Virtual Machine. Of these two operation environments, the first one is called HDMV mode, and the second one is called BD-J mode. Due to the presence of the two operation environments, the dynamic scenario is written by presuming either of the two operation environments. The dynamic scenario presuming the HDMV mode is called Movie Object, and is defined by the management information. On the other hand, the dynamic scenario presuming the BD-J mode is called a BD-J Object.

First, the Movie Object will be explained.
<Movie Object>
The Movie Object is stored in a file "Movie Object.bdmv".

Figure 10:
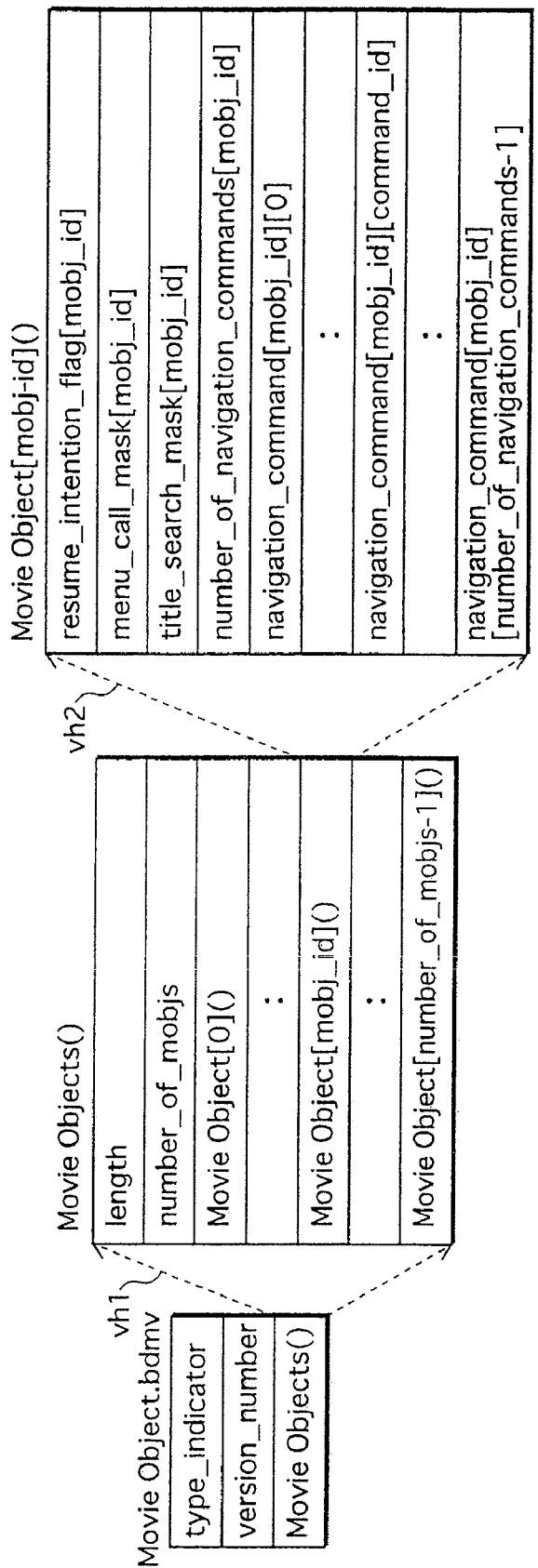
FIG. 10 shows the internal structure of Movie Object.

FIG. 10 shows the internal structure of Movie Object.bdmv. As shown in the leftmost portion of FIG. 10, Movie Object.bdmv is composed of "type_indicator" indicating code sequence "MOBJ", "version_number", and "Movie Objects ( )" that are one or more Movie Objects. The lead line vh1 in FIG. 10 indicates a closeup of the internal structure of the Movie Objects. The "Movie Objects( )" is composed of "length" indicating the data length of its own, "number_of_mobjs" indicating the number of Movie Object contained therein, and as many Movie Objects as indicated by the number_of_mobjs. The Movie Objects whose number is indicated by the number_of_mobjs are identified by the identifier mobj_id. The lead line vh2 in FIG. 10 indicates a closeup of the internal structure of a given Movie Object[mobj_id] ( ) identified by the identifier mobj_id.

As indicated by the lead line, the Movie Object is composed of: "resume_intention_flag" that indicates whether or not the playback should be resumed after a MenuCall is performed; "menu_call_mask" that is information indicating whether or not the MenuCall should be masked; "Title_search_flag" indicating whether or not the Title search function should be masked; "number_of_navigation_command" indicating the number of navigation commands; and as many navigation commands as indicated by the "number_of_navigation_command".

The navigation command sequence is composed of commands that achieve: a conditional branch; setting the status register in the playback apparatus; acquiring a value set in the status register, and so on. The following are the commands that can be written in the Movie Objects.
PlayPL Command
Format: PlayPL ($1^{st}$ argument, $2^{nd}$ argument)
As the $1^{st}$ argument, a PlayList number can be used to indicate a PL to be played back. As the $2^{nd}$ argument, a PlayItem contained in the PL, a given time in the PL, a Chapter, or a Mark can be used to indicate a playback start position.

A PlayPL function that specifies a playback start position on the PL time axis using a PlayItem is called Play PL at PlayItem( ).

A PlayPL function that specifies a playback start position on the PL time axis using a Chapter is called Play PL at Chapter( ).

A PlayPL function that specifies a playback start position on the PL time axis using time information is called Play PL at SpecifiedTime( ).
JMP Command
Format: JMP argument
The JMP command is used for a branch that discards a currently executed dynamic scenario and executes a branch destination dynamic scenario that is specified by the argument. The JMP command has two types: a direct reference type that directly specifies the branch destination dynamic scenario; and an indirect reference type that indirectly refers to the branch destination dynamic scenario.

The description format of the navigation command in the Movie Object resembles that in DVD. For this reason, a transplant of a disc content from a DVD onto a BD-ROM can be done efficiently. The Movie Object is a prior art disclosed in the following International Publication. For details, refer to the International Publication.

International Publication WO 2004/074976.

Up to now, the Movie Object has been described. The following will describe the BD-J. Object.
<BD-J Object>
The BD-J Object is a dynamic scenario in the BD-J mode, written in a Java™ programming environment.

Figure 11:
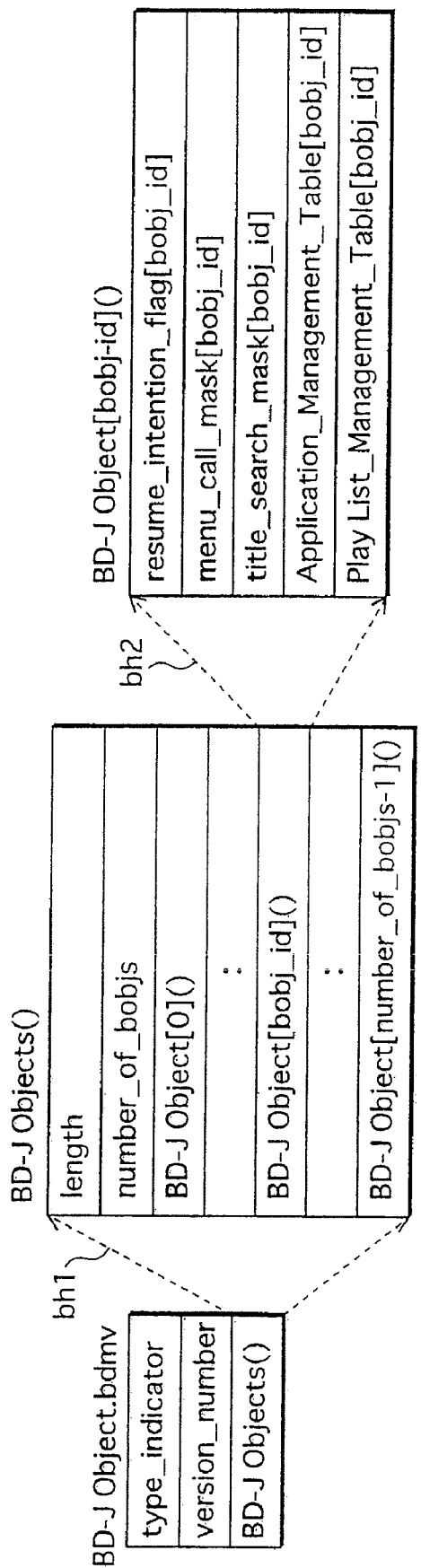
FIG. 11 shows the internal structure of BD-J Object.

FIG. 11 shows the internal structure of BD-J. Object.bdmv. As shown in the leftmost portion of FIG. 11, BD-J. Object.bdmv is composed of "type_indicator" indicating code sequence "BOBJ", "version_number", and "BD-J Objects( )" that are one or more BD-J. Objects. The lead line "bh1" in FIG. 11 indicates a closeup of the internal structure of the BD-J Objects( ). The "BD-J Objects( )" is composed of "length" indicating the data length of its own, "number_of_ bobjs" indicating the number of BD-J Objects contained therein, and as many BD-J Objects as indicated by the number_of_bobjs. The BD-J Objects whose number is indicated by the number_of_bobjs are identified by the identifier bobj_id. The lead line bh2 in FIG. 11 indicates a closeup of the internal structure of a given BD-J Object[bob_id]( ) identified by the identifier bobj_id.

As shown in this figure with the indication by the lead line, the BD-J Object is composed of "resume_intention_flag [bobj_id]", "menu_call_mask[bobj_id]", "Title_search_flag [bobj_id]", "Application_Management_Table[bobj_id]", and "Playlist_Management_Table[bobj_id]". The BD-J Object is approximately the same as the Movie Object in that it includes "resume_intention_flag", "menu_call_mask", and "Title_search_flag".

The difference from the Movie Object is that a command is not written directly in the BD-J. Object. That is to say, in the Movie Object, the control procedure is written directly in the navigation commands. In contrast, the BD-J Object indirectly defines the control procedure by allowing a specification for a Java™ application to be written in "Application_Management_Table[bobj_id]". Such an indirect definition provides an efficient sharing of a common control procedure, allowing a plurality of dynamic scenarios to share a common control procedure.

Also, in the Movie Object, a PL playback is performed in accordance with a navigation command (PlayPl command) written in the Movie Object, instructing to perform the PL playback. In contrast, in the BD-J Object, "Application_Management_Table[bobj_id]", which indicates the PL playback procedure, is incorporated in the BD-J Object, enabling the PL playback procedure to be written. And what is more, the PL playback procedure can be written also by incorporating the PL playback procedure into the application that is referred to from the application management table. That is to say, it is possible to incorporate the PlayList playback procedure either by writing it in the PlayList management table or by writing it in the application.

Here, the Java™ application will be described. A Java™ application includes one or more xlet programs that are loaded in the heap area (also called work memory) of the virtual machine. The Java™ application is composed of the xlet programs and data. Up to now, the construction of the Java™ application has been described.

The substantial body of the Java™ application is Java (™) archive files (00001.jar, 00002.jar) that are stored in the BDJA directory under the BDMV directory shown in FIG. 2. The following describes the Java™ archive files with reference to FIGS. 12A and 12B.

<Java™ Archive Files>

Figure 12A:
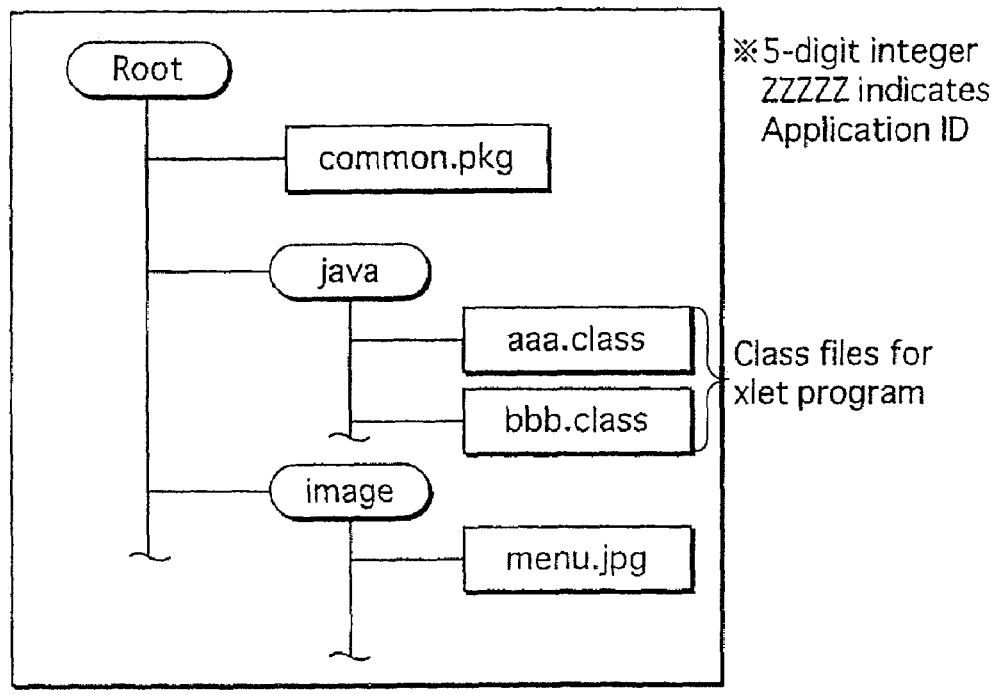
FIG. 12A shows the programs and data stored in the Java™ archive files.

The Java™ archive files (00001.jar, 00002.jar shown in FIG. 2) are each formed by combining one or more class files and one or more data files into one. FIG. 12A shows the programs and data stored in the archive files. The data shown in FIG. 12A has been configured by the Java™ archiver by arranging a plurality of files into the directory structure indicated by the oval frames. The directory structure indicated by the oval frames is composed of the Root, Java™, and image directories. The common.pkg is arranged to be under the Root directory, the class files (aaa.class, bbb.class) are arranged to be under the Java™ directory, and menu.jpg is arranged to be under the image directory. The Java™ archive files are each formed by the Java™ archiver by combining such files into one. Such class files and data are expanded when they are read from the BD-ROM, and are treated as files arranged in the directories. The five-digit number "zzzzz" attached to each Java™ archive file name indicates an application ID. When such a Java (™) archive file has been read to a cache, it is possible to extract programs and data that constitute an arbitrary Java (™) application by referring to the number attached to the file name. The class files (aaa.class, bbb.class shown in FIG. 12A) are class files that correspond to the above-described xlet program. The playback procedure in the BD-J mode is defined by the xlet program that corresponds to the instances of the class files.

The xlet program is a Java™ program that can use an interface conforming to Java™ Media Framework (JMF), and executes processes in correspondence with key events, in accordance with a format such as JMF. Since it can execute JMF-format processes, the xlet program can instruct the playback apparatus to play back a PlayList by generating an instance (JMF player instance) that corresponds to an MPLS file. Also, the xlet program can instruct the BD-ROM playback apparatus to execute processes that are unique to the BD-ROM playback apparatus by writing calls for function APIs.

Furthermore, the xlet program can execute a procedure for accessing a WWW site and downloading a content from the site. This enables some innovative works, which are generated by combining the downloaded contents with the PlayList playback, to be played back.

Figure 12B:
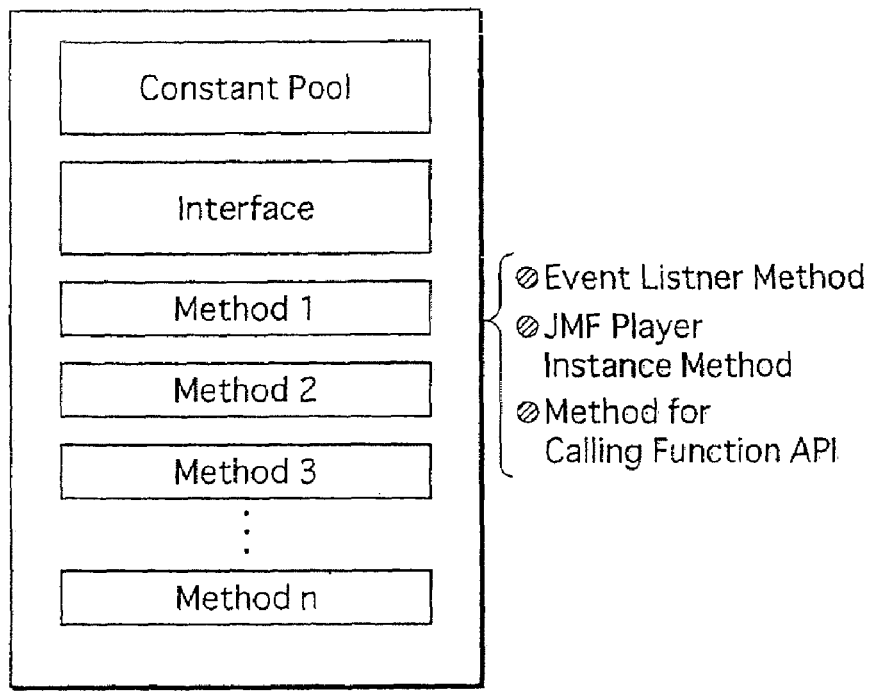
FIG. 12B shows the internal structure of the class file.

The class files of the xlet program will be described. FIG. 12B shows the internal structure of the class file. As shown in FIG. 12B, the class file is composed of "constant pool", "interface", and "method 1, 2, 3, . . . n". The methods in the class files are classified into: a method (Event Listner method) with which a key event that triggers an operation has been registered beforehand; a method (method for a JMF player instance) for instructing a JMF playback procedure; and a method for calling a function API for the BD-ROM playback apparatus. In these methods, procedures for calculations or the like are written using local variables assigned to themselves or arguments for calling themselves. Up to now, the Java™ archive file has been described. It should be noted here that although in the present embodiment, programs and data that constitute the application are stored in Java™ archive files, such programs and data may be stored in LZH files or zip files.

Up to now, dynamic scenario in the BD-J mode has been described.

<Status Change in BD-ROM>

Figure 13:
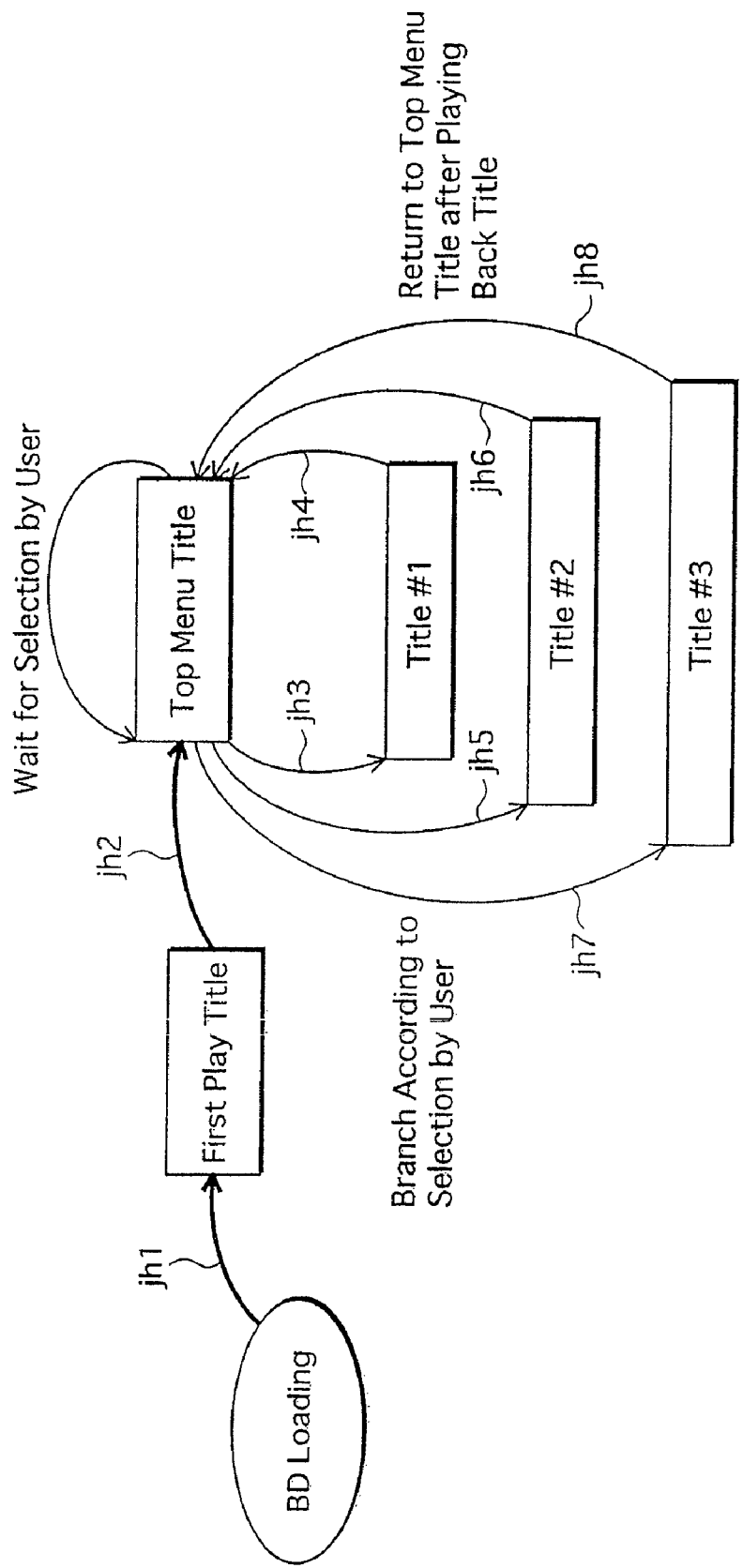
FIG. 13 shows the status change in a disc content.

The disc content provided in a read-only disc such as the DVD-Video has a structure that centers on the top menu. The status change in such a disc content is unique in that the playback branches from the top menu Title to each Title and then returns to the top menu Title. FIG. 13 shows the status change in a disc content. The boxes in FIG. 13 represent Titles. Here, each Title is a playback unit that corresponds to a "status" in the status change unique to the disc content. Titles are classified into: "FirstPlayTitle" that is played back first after the BD-ROM is loaded, "Top_menuTitle" that constitutes the top menu, and "Titles" that are general Titles. The arrows jh1, jh2, jh3, jh4, jh5, jh6, jh7, and jh8 in FIG. 23 symbolically indicate branches between Titles. According to the status change shown in FIG. 13, "FirstPlayTitle" is played back upon loading of a BD-ROM, a branch to "Top_menuTitle" occurs, and then a selection on the top menu is waited for. In the industry of recording media for distributing movies, such as BD-ROM, it is well established that a dynamic trademark is played back upon loading of such a recording medium. The dynamic trademark symbolizes the producer or distributor of the movie. The FirstPlayTitle plays a role to play back the dynamic trademark immediately after the BD-ROM is loaded.

Then if the user selects a Title on the menu, the selected Title is played back. The playback then returns to the Top Menu Title. Such a playback procedure is repeated again and again until the BD-ROM is ejected. This is the status change unique to the disc content.

Figure 14:
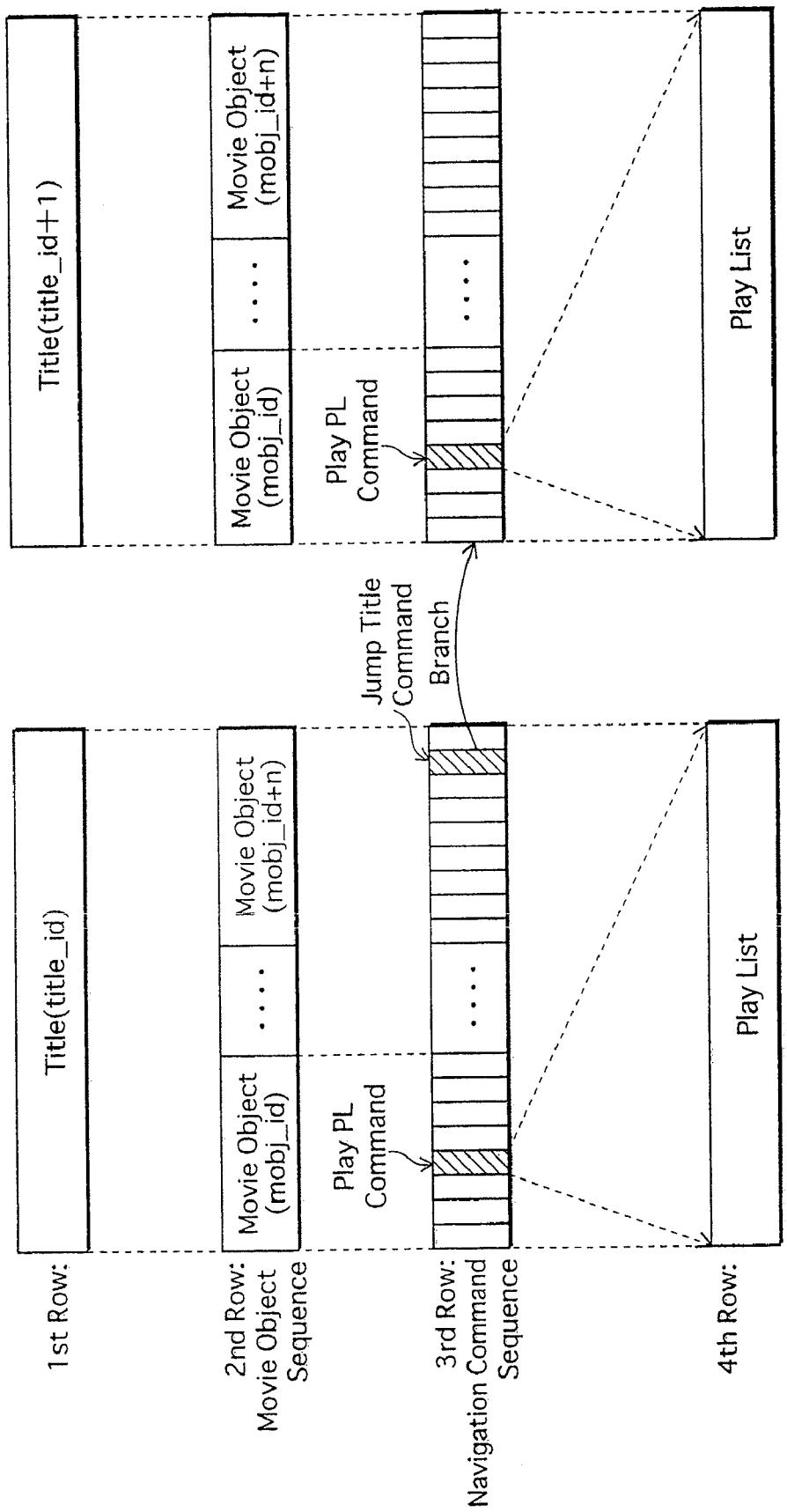
FIG. 14 shows two Titles that are composed of dynamic scenarios in the HDMV mode.

Title having such a status change is composed of dynamic scenarios in the HDMV mode or dynamic scenarios in the BD-J mode. FIG. 14 shows two Titles that are composed of dynamic scenarios in the HDMV mode. The first row of FIG. 14 indicates a Title (Title_id) that is identified by identifier "Title_id". The second row indicates a Movie Object sequence that is composed of one or more Movie Objects that constitute Title. The third row indicates a navigation command sequence that constitutes the Movie Objects.

A branch from a Title to another Title as shown in FIG. 13 is achieved by writing in advance a navigation command (JumpTitle command), which instructs the playback apparatus to jump to another Title, in a Movie Object. Also, the fourth row of FIG. 14 indicates a PlayList that belongs to the Title. This belonging of the PlayList to the Title is achieved by writing in advance a navigation command (PlayPLcommand), which instructs to playback the PlayList, in a Movie Object.

By having a PlayList belong to a Title, it is possible for Title in the HDMV mode to define a movie that is accompanied with a video playback. This is the structure of Title defined by the dynamic scenario in the HDMV mode.

Figure 15:
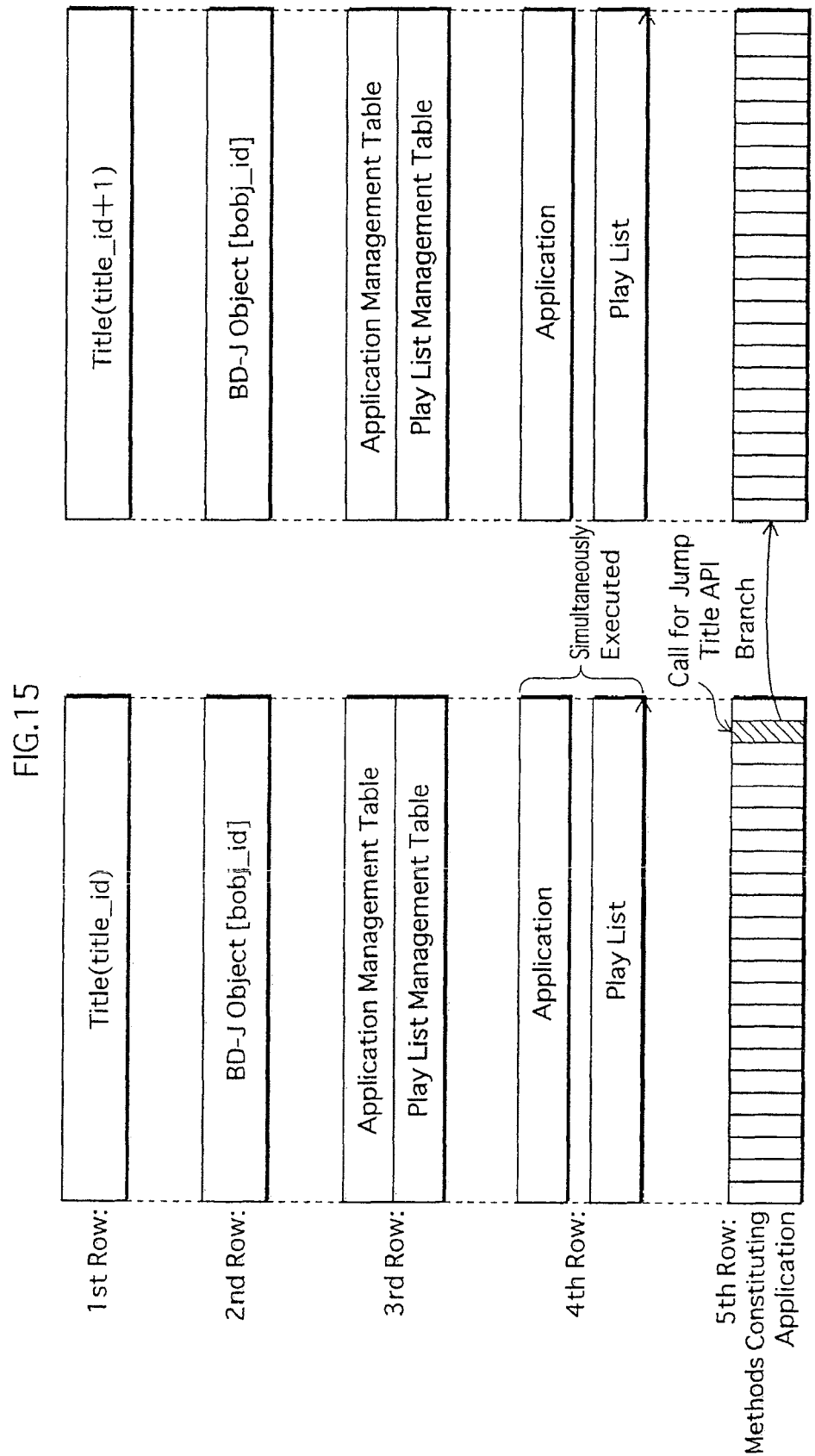
FIG. 15 shows the internal structure of Title composed of the dynamic scenario in the BD-J mode (BD-J Object).

The following describes the internal construction of Title composed of the dynamic scenario in the BD-J mode. FIG. 15 shows the internal structure of Title composed of the dynamic scenario in the BD-J mode (BD-J Object).

The first row indicates a Title that is identified by identifier "Title_id". The second row indicates the only BD-J Object that constitutes the Title. The third row indicates application management table and PlayList Management Table that are provided in the BD-J. Object. The fourth row indicates an application that is to be operated by the application management table in the third row. This application includes a method (a method that calls JumpTitleAPI) that instructs the playback apparatus to jump to another Title, as indicated in the fifth row. As a result, the branch to another Title as shown in FIG. 13 is achieved by the JumpTitleAPI call method. On the other hand, since the PlayList Management Table is written in the third row, a PlayList is played back at the same time as the application is executed, as indicated in the fourth row.

The BD-J Object includes the application management table and PlayList Management Table. This enables the PL playback to be executed simultaneously with the execution of the application as indicated in the fourth row. Such a simultaneous execution of the application and PL playback is a characteristic of Title in the BD-J mode.

Not all BD-J Objects include the PlayList Management Table. The PlayList Management Table is an arbitrary component. Some BD-J Objects include the PlayList Management Table, and others doe not. FIG. 16 shows a Title that does not include the PlayList Management Table. In such a BD-J Object that includes only the application management table but not the PlayList Management Table, only the application operation is defined as indicated in the fourth row. With such a definition of the application operation, a Title, which has only the control procedure and is not accompanied with a PL playback, is defined.

Figure 17:
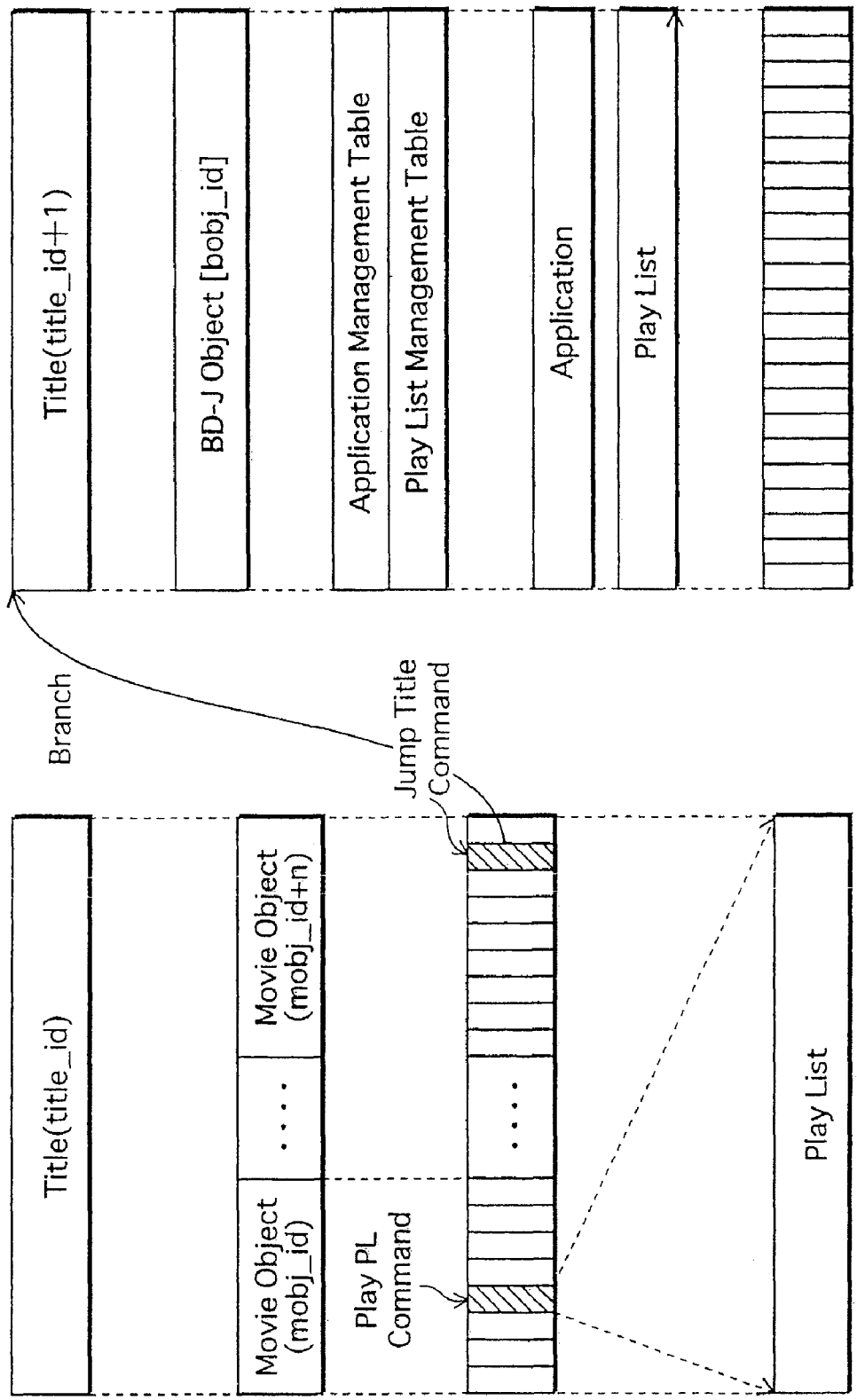
FIG. 17 shows a branch from a Title in the HDMV mode to a Title in the BD-J mode.
Figure 18:
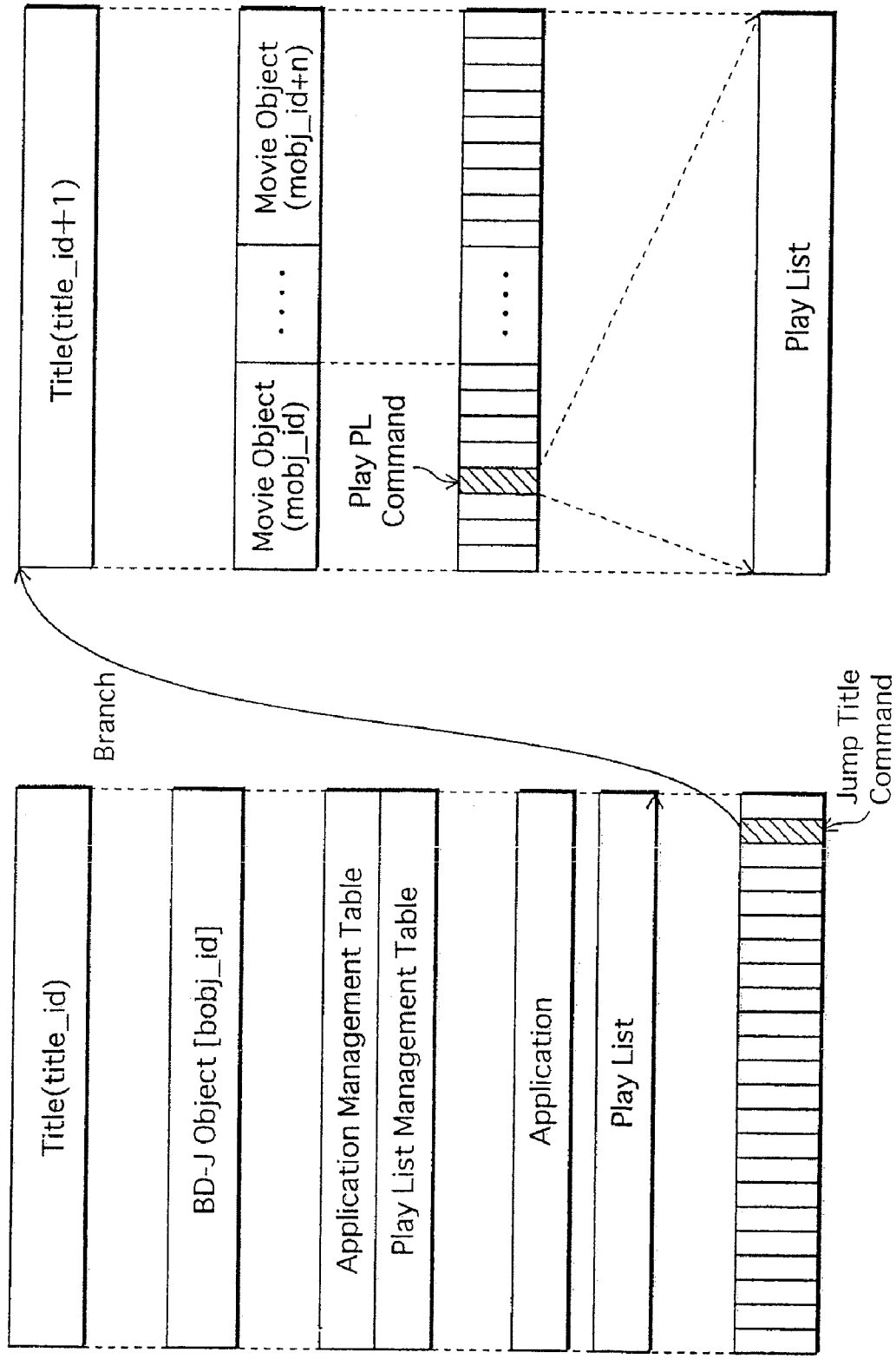
FIG. 18 shows a branch from a Title in the BD-J mode to a Title in the HDMV mode.

FIG. 14 shows a branch from a Title in the HDMV mode to a Title in the HDMV mode. It should be noted however that a branch from a Title in the HDMV mode to a Title in the BD-J mode is also possible as shown in FIG. 17. Similarly, although FIG. 15 shows a branch from a Title in the BD-J mode to a Title in the BD-J mode, a branch from a Title in the BD-J mode to a Title in the HDMV mode is also possible as shown in FIG. 18.

In the above-described internal structure of Title, the Movie Objects or BD-J Objects that constitute a Title are defined by the index.bdmv shown in FIG. 2. The following describes the index.bdmv.

The index.bdmv is a table that indicates the Movie Objects or BD-J Objects that constitute a Title.

Figure 19:
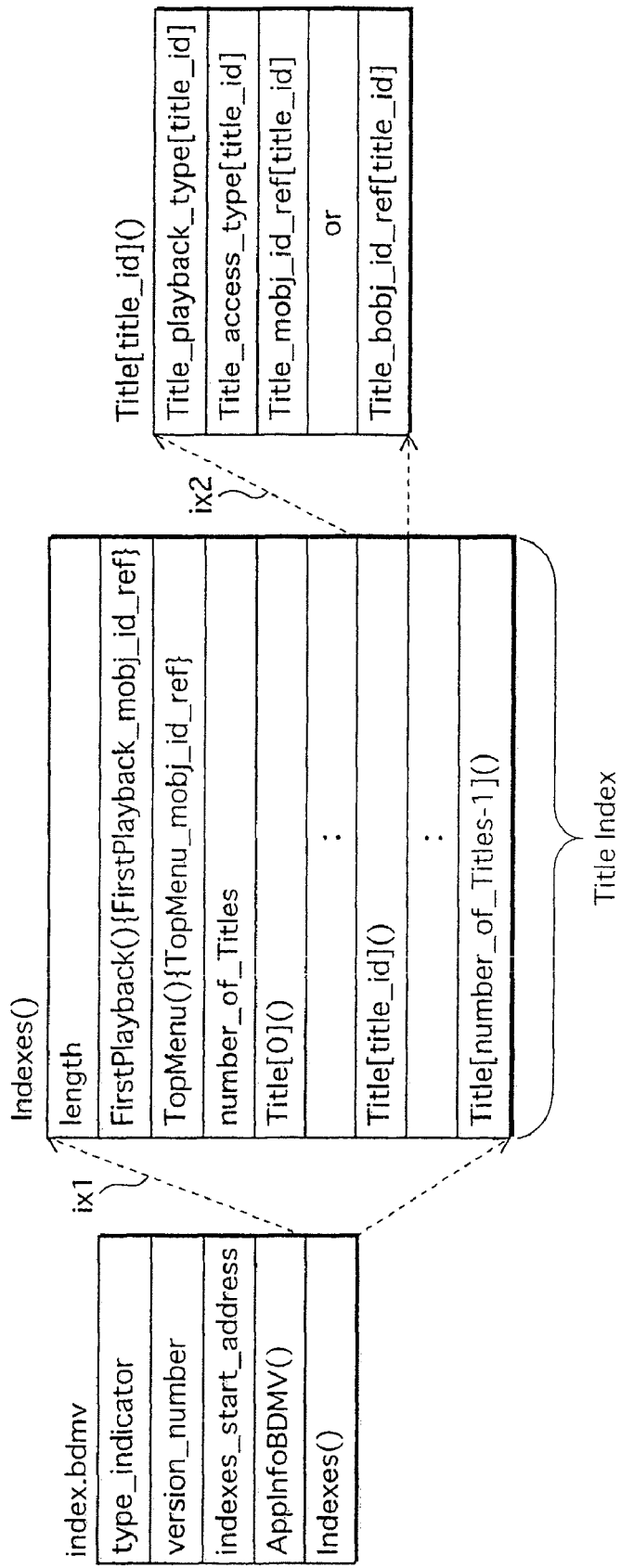
FIG. 19 shows the internal structure of the index.bdmv.

FIG. 19 shows the internal structure of the index.bdmv. As shown in FIG. 19, the index.bdmvis composed of "type_indicator" that has a value "INDX", "version_number", "Indexes_start_address" that indicates a relative address from the start of the file to the Indexes, and "Indexes( )". The "Indexes( )" respectively correspond to Titles. As the dotted line arrow "ix1" in FIG. 19 indicates, the "Indexes( )" is composed of "length", "FirstPlayback( ){FirstPlayback_mobj_id_ref}", "TopMenu( ) {TopMenu_mobj_id_ref}", "number_of_Titles", and "Title[0]( ) . . . Title[number_of_Titles-1]( )".

The "FirstPlayback( ) {FirstPlayback_mobj_id_ref}" is the Index of the FirstPlayTitle, and stores a Movie Object identifier reference value for a Movie Object that constitutes the FirstPlayTitle (FirstPlayback_mobj_id_ref). The "TopMenu( ) {TopMenu_mobj_id_ref}" is the Index of the TopMenuTitle, and stores a Movie Object identifier reference value for a Movie Object that constitutes the TopMenuTitle (TopMenu_mobj_id_ref).

The "Title[0] ( ) . . . Title[number_of_Titles-1] ( )" are the Indexes of Titles other than the FirstPlayTitle and TopMenuTitle, and there are as many of them as indicated by the number_of_Title. The "Title[0] ( ) . . . Title[number_of_Titles-1] ( )" are identified by the identifier Title_id.

An index identified by the identifier Title_id is represented as Title[Title_id] ( ). The lead line ix2 in FIG. 19 indicates a closeup of Title[Title_id]( ).

As shown in FIG. 19, the "Title[Title_id] ( )" is composed of: "Title_Playback_Type[Title_id]" that indicates a Title playback type which is shown by, for example, whether or not the "Title[Title_id]" contains a branch; "Title_access_Flag [Title_id]" that indicates whether or not the execution of a service function for Title is permitted; and "Title_mobj_id_ref[Title_id]" that uniquely indicates Movie Objects that constitute the Title. Here, if the dynamic scenarios that constitute Title are BD-J Objects, "Title_mobj_id_ref[Title_id]" is replaced with "Title_bobj_id_ref[Title_id]". The "Title_bobj_id_ref[Title_id]" uniquely indicates BD-J Objects that constitute the Title.

The Index.bdmv is disclosed in detail in the following International Publication. For details, refer to the International Publication.

International Publication WO 2004/025651 A1.

<Application Management Table>

The application management table and the PlayList management table included in the BD-J Object table are the main elements of the present embodiment. These tables will be described in detail. First, the application management table (AMT) will be described.

FIG. 20A shows the internal structure of the application management table. As shown in FIG. 20A, the application management table is composed of "life_cycle", "apli_id_ref", "run_attribute", and "run_priority".

FIG. 20B shows the meaning of the information elements that constitute the application management table.

The "life_cycle" indicates a "life cycle" of the application.

The "apli_id_ref" indicates, by a reference value written therein in correspondence with the "application identifier", the application that has the above-mentioned life cycle. The application identifier is represented by a five-digit value "zzzzz" that is provided in the Java™ archive file as the file name. The five-digit value is written in the "apli_id_ref".

The "run_attribute" indicates the run attribute of the application during the life cycle. The run attribute is classified into: AutoRun, Present, and Suspend.

The "run_priority" indicates the "run priority" of the application during the life cycle. The BD-J Object controls the operation of the application using these pieces of information.

<Life Cycle>

The life cycle, which is defined in the application management table, will be described.

The life cycle means a cycle during which an application lives on the work memory of the virtual machine, and is represented with the time axis of the entire contents of the BD-ROM. Here, the term "live" refers to the state where the xlet programs constituting the application have been loaded in the work memory such that the application can be executed by the virtual machine.

When an application is run on a Java™ Virtual Machine, it is important to clearly define, on the time axis, the start and end points of a service by the application. These start and end points of a service are defined in the "life_cycle" of the application management table.

Figure 21A:
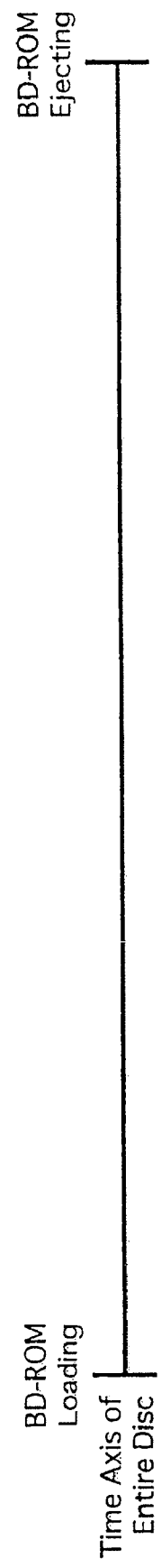
FIG. 21A shows the time axis of the entire disc.
Figure 21B:
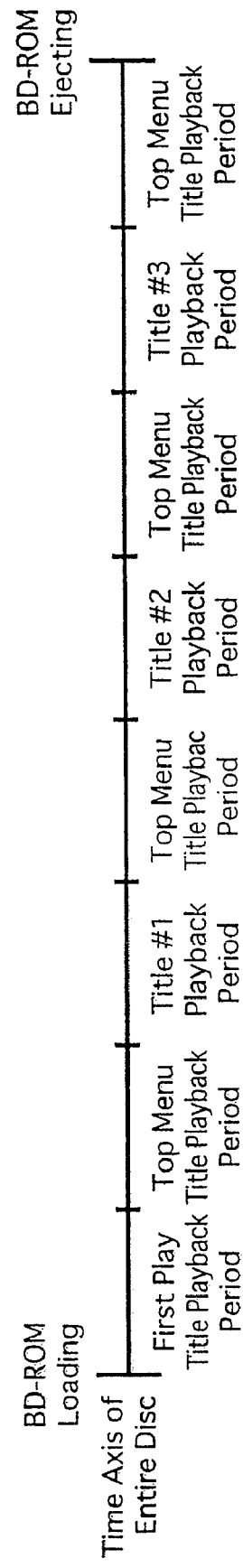
FIG. 21B shows how the time axis is structured.

The following shows how Title life cycle is defined with regards to such disc contents that change the status as shown in FIG. 13. Suppose that after the BD-ROM is loaded, branches are made in the ascending order of the numbers indicated by the arrows jh1, jh2, jh3, jh4, . . . in FIG. 13, and the BD-ROM is ejected. The continuous time band starting with the loading and ending with the ejection of the BD-ROM can be regarded as one time axis. The time axis is defined as the time axis of the entire disc. FIG. 21A shows the time axis of the entire disc. FIG. 21B shows how the time axis is structured. As shown in FIG. 21B, the time axis of the entire disc is composed of: a period during which the FirstPlayTitle is played back; a period during which the FirstPlayTitle is played back; a period during which the TopMenuTitle is played back; a period during which Title #1 is played back; . . . A Title is composed of one or more Movie Objects or one BD-J. Object. Therefore, the playback period of each Title can be defined as a period during which any of the Movie Objects or BD-J Object is activated.

That is to say, the FirstPlayTitle, TopMenuTitle, and other Titles are each composed of dynamic scenarios. Therefore, the playback period of each Title can be defined as a period during which any of the Movie Objects or BD-J Object, which constitute Title, is activated as a current Movie Object or a current BD-J Object, and is decoded and executed within the playback apparatus. FIG. 22A shows, in the time axis of the entire BD-ROM, Title playback periods that are identified by a BD-J Object that is identified by the identifier "bobj_id". Here, if a BD-J Object identified by the identifier "bobj_id" constitutes a Title, a period in the BD-ROM time axis during which the BD-J Object identified by the identifier "bobj_id" is activated can be regarded as the playback period of Title.

Similarly, if a Movie Object identified by the identifier "mobj_id" constitutes a Title, a period in the BD-ROM time axis during which the Movie Object identified by the identifier "mobj_id" is activated can be regarded as the playback period of Title.

The period during which a Movie Object or a BD-J Object is activated lasts until a Title branch (JumpTitle) is performed. That is to say, the dynamic scenario, which is the target of the execution, is treated as a current Movie Object or a current BD-J Object until a Title branch (JumpTitle) is performed. As a result, a period that lasts until a JumpTitle occurs in the Movie Object or BD-J Object is treated as a Title playback period.

The following describes the relationships between Title playback period and the PL time axis. As described above, in the Movie Object or BD-J Object, the PL playback procedure can be written as a processing procedure. If a PL playback procedure has been written, all or part of the above-described PL time axis belongs to Title playback period. Suppose that a PlayList management table is written in the BD-J Object in the example shown in FIG. 22A. Then, as shown in FIG. 22B, the PL time axis belongs to Title playback period that corresponds to the BD-J. Object. Since a plurality of chapters (Chapter #1, #2, #3) can be defined further to the PL time axis, domains "entire BD-ROM-Title-PL-Chapter" exist in the BD-ROM time axis. It is possible to write the life cycle of the application by using these domains. It should be noted here that since the PlayList playback started simultaneously with the execution of the application, a Title branch may happen in the middle of the PlayList playback. In such a case, only part of the PlayList time axis, not the entire PlayList time axis, belongs to one Title playback period. That is to say, whether only part of the PlayList time axis or the entire PlayList time axis belongs to one Title playback period depends on the time at which a Title branch occurs.

Figure 23:
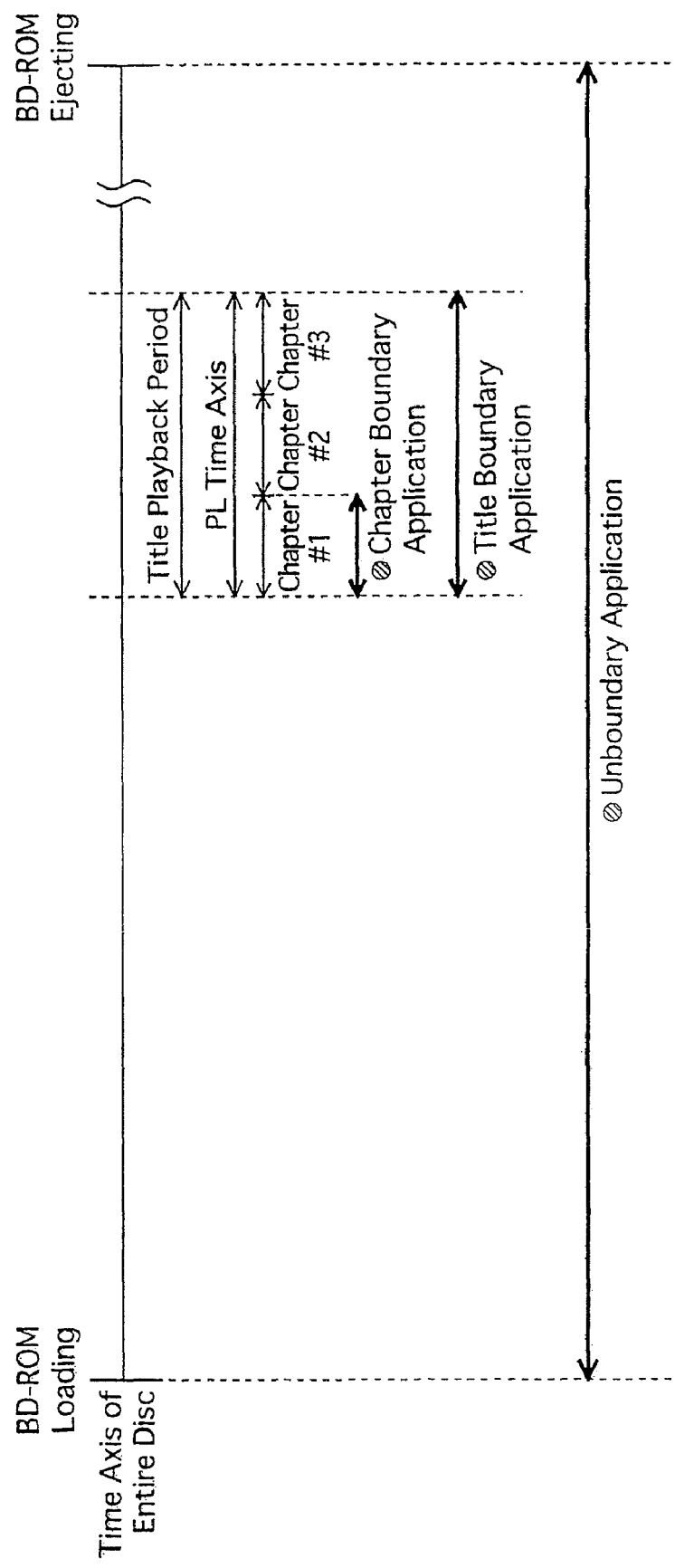
FIG. 23 shows a typical life cycle defined in the time axis shown in FIG. 22B.

FIG. 23 shows a typical life cycle defined in the time axis shown in FIG. 22B. As shown in FIG. 23, there are three typical applications: Title boundary application whose life cycle is a Title; the Chapter boundary application whose life cycle is a Chapter within a Title; and the unboundary application whose life cycle is the time axis of the entire BD-ROM.

Of these, the life cycle of a Title boundary application can be defined using the identifier of Title. Also, the life cycle of a Chapter boundary application can be defined using a combination of: the identifier of Title to which the Chapter belongs; and the identifier of the Chapter.

Even if the platform is operating, it is possible to regain the resource from the application after the life cycle defined as a Title or a Chapter ends. Such a construction assures the chance to regain the resource, and thereby stabilizes the operation of the platform.

Figure 24:
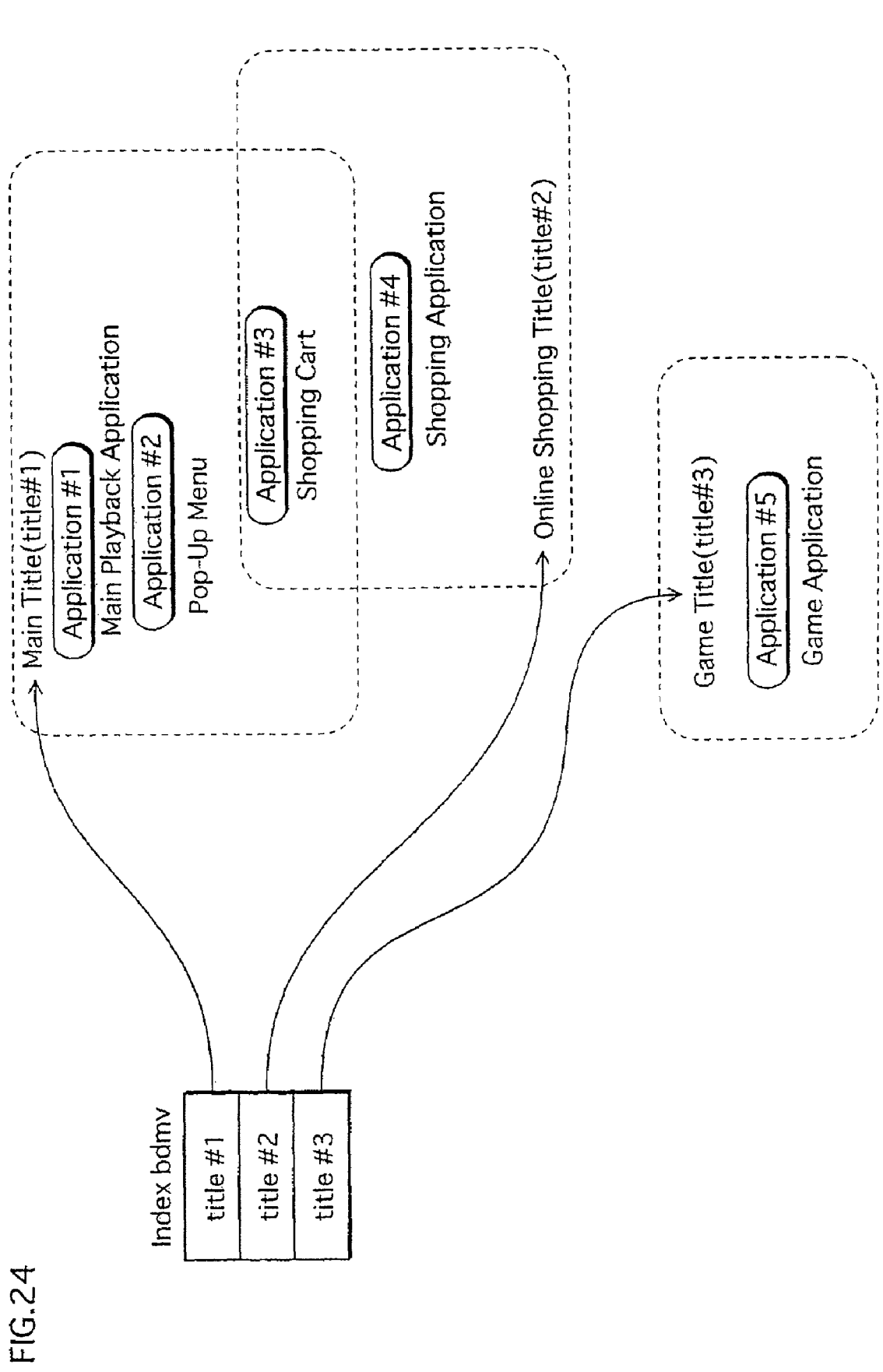
FIG. 24 shows a disc content that includes three Titles: a main Title; an online shopping Title; and a game Title.

The following describes how to write the life cycle in the application management table, using a specific example which includes a disc content that will be achieved in near future, as the material. The disc content used as the material includes three different types of Titles: a main Title (Title #1) that constitutes a main image work; an online shopping Title (Title #2) that constitutes an online shopping; and a game Title (Title #3) that constitutes a game application. FIG. 24 shows a disc content that includes three Titles: a main Title; an online shopping Title; and a game Title. The left-hand side of FIG. 24 shows Index.bdmv, and the right-hand side of FIG. 24 shows the three Titles.

The dotted-line frames on the right-hand side of FIG. 24 show belonging relationships that indicate Titles to which each application belongs. Of the three Titles, Title #1 is composed of application #1, application #2, and application #3. Also, Title #2 is composed of application #3 and application #4, and Title #3 is composed of application #5. In the example shown in FIG. 24, the application #3 is run by both Title #1 and Title #2.

FIG. 25A shows the life cycle of each application, which is drawn based on the belonging relationships shown by the dotted-line frames of FIG. 24. In FIG. 25A, the horizontal axis indicates a Title playback period, and life cycles of applications are arranged in the vertical axis direction. Here, the application #1 and the application #2 belong only to Title #1, and therefore the life cycles of these applications are confined to Title #1. The application #4 belongs only to Title #2, and therefore the life cycle of the application #4 is confined to Title #2. The application #5 belongs only to Title #3, and therefore the life cycle of the application #5 is confined to Title #3. The application #3 belongs to Titles #1 and #2, and therefore the life cycle of the application #3 extends over Titles #1 and #2. FIG. 25B shows the application management tables for Titles #1, #2, and #3 that were written based on the life cycles shown in FIG. 25A. After the application management tables are written in this way, the application #1, application #2, and application #3 are loaded onto the work memory when the playback of Title #1 is started. Then, when the playback of Title #2 is started, the applications #1 and #2 are deleted from the work memory, causing only the application #3 to remain. Similarly, it is possible to perform a control so that the application #4 is loaded onto the work memory when the playback of Title #2 is started, and that the applications #3 and #4 are deleted from the work memory when the playback of Title #3 is started.

Further, it is possible to perform a control so that the application #5 is loaded onto the work memory while Title #3 is played back, and that the application #5 is deleted from the work memory when the playback of Title #3 ends.

With this construction, the number of times the applications are loaded onto the work memory is minimized. This is because if a branch between Titles occurs, applications that live in both the branch source and branch destination may be stored in the work memory, and applications that do not live in the branch source and live in only the branch destination may be loaded onto the work memory. Such a construction that decreases the number of times data is loaded enables an unboundary application, which is such an application that does not make one conscious about a boundary between Titles, to be achieved.

The following describes the run attributes of the application. The run attributes include: AutoRun indicating that the application with this attribute is automatically started to run; Present indicating that the application with this attribute is not the target of the automatic run but may be stored in the work memory of the virtual machine; and Suspend indicating that the application with this attribute is stored in the work memory of the virtual machine but is not assigned the CPU power.

When a corresponding Title branches, an application with the "AutoRun" attribute is loaded onto the work memory and is executed. When a Title branches to another Title, the management body (application manager) that manages the applications loads an application, which lives in the branch destination Title and whose run attribute has been set to AutoRun, onto the work memory of the virtual machine, and executes the application. This means that the application is automatically started to run as Title branches.

The run attribute "Present" is a continuous attribute, and indicates that the status of the application in the branch source Title is maintained. This is also an attribute that indicates that a corresponding application can be executed. An application whose run attribute is set to "Present" can be called from another application. When an application is called from another application that is being run, the management body (application manager) judges whether or not the application ID of the application is written in the application management table and whether or not the run attribute of the application is set to "Present". If it is set to "Present", the management body loads the application onto the work memory. If the application ID of the call destination application is not written in the application management table, the management body does not load the application onto the work memory. Only applications whose run attribute is set to "Present" can be called from another application. "Present" is a default run attribute that is assigned when the run attribute is not clearly specified. As a result, when the run attribute of an application is "--" indicating no specification, it means that the run attribute of the application is "Present".

"Suspend" indicates that the application with this attribute is assigned a resource but is not assigned the CPU power. The attribute "Suspend" is effective, for example, in achieving the process of passing a side path while a game Title is executed.

FIG. 26 shows combinations of the three run attributes (Present, AutoRun, and Suspend) and three possible statuses of the previous Title (Not Run, Running, and Suspend). If the previous status is "Not Run" and the run attribute is "AutoRun", the application is started in the branch destination Title.

If the previous status is "Not Run" and the run attribute is "Present" or "Suspend", no operation is performed, and the status is maintained.

If the previous status is "Running" and the run attribute is "Present" or "AutoRun", no operation is performed, and the status is maintained.

If the run attribute is set to "Suspend", the status of the application is suspended. If the previous status is "Suspend" and the run attribute of the branch destination Title is "Suspend", the "Suspend" is maintained. If the previous status is "Suspend" and the run attribute of the branch destination Title is "Present" or "AutoRun", the application is resumed in the branch destination Title. Defining life cycles and run attributes in the application management table makes it possible to perform a synchronization control to run a Java™ application during a Title playback period. This enables achievement and provision of various applications that cause images to be played back and programs to be executed.

It should be noted here that if the previous status is "Suspend" and the run attribute of the branch destination Title is "Present", the previous status "Suspend" may be maintained.

Lastly, "run priority" for each application will be described.

The run priority takes values 0 to 255. When the memory resource runs short or when the CPU load is high, the application manager can use the run priority to decide which application to terminate forcibly, or which application to regain resource from. The application manager terminates an application with low-level run priority, and keeps the operation of an application with high-level run priority.

The run priority can also be used in arbitration between applications that conflict with each other requesting a PL that is being played back. Suppose here that an application is fast forwarding a PlayList and another application issues a pause request for the same PlayList. Then the run priority levels assigned to these applications are compared with each other. If the fast-forwarding application has a higher run priority level, the fast-forwarding is continued. If the pause-requesting application has a higher run priority level, the PL being fast-forwarded is paused.

With the above-described life cycle, run attribute, and run priority, it is possible during the authoring to limit the number of applications that can operate on the virtual machine to a predetermined number or less. This provides stable operation of applications.

<PlayList Management Table>

Up to now, the application management table has been described. The follows will described the PlayList management table. The PlayList management table shows playback control that should be performed simultaneously with execution of each application during the life cycle of the application. The operation of an application is unstable. There may be a start-up failure or an abnormal termination. In the present embodiment, a PlayList management table is provided for each application life cycle, as a Fail Safe mechanism that functions in case the start-up failure or abnormal termination occurs. The PlayList management table is information that defines a playback control that should be performed when an application life cycle starts. The playback control described here is a playback of an AVClip based on the PlayList information. That is to say, by performing the playback control based on the PlayList information, the execution of an application and the playback of a PlayList are performed simultaneously. It was said earlier that a PlayList management table is provided for each application life cycle. It should be noted here however that the PlayList management table can only be provided in correspondence with Title boundary application. This is because since the life cycle of Title unboundary application extends over all Titles, the control for simultaneous performance of the execution of an application and the playback of a PlayList cannot be applied to Title unboundary application.

There is no need to define the playback of a PlayList in regards with the Chapter boundary application. This is because the life cycle of the Chapter boundary application is defined on the premise that the execution of the application is started from a Chapter within a PlayList. As understood from the above description, the PlayList management table is defined in correspondence with a life cycle that is composed of one or more Titles.

FIG. 27A shows the internal structure of the PlayList management table. As shown in FIG. 27A, the PlayList management table is composed of "PL_id_ref" and "Playback_Attribute".

FIG. 27B shows the meaning of the information elements that constitute the PlayList management table.

The "PL_id_ref" indicates, by a reference value written therein in correspondence with a PL identifier, a PL that can be played back during an application lifecycle. The PL identifier is represented by a five-digit value "YYYYY" that is provided in the file YYYYY.MPLS as the file name. The "PL_id_ref" with the YYYYY written therein indicates a PL that can be played back in a corresponding Title.

The "Playback_Attribute" is an attribute that is similar to the run attribute in the application management table, and is a playback attribute that defines how to play back the PL written in the "PL_id_ref" when Title starts. The playback attributes for PL are classified into "AutoPlay", "Present" or the like.

"AutoPlay" is an attribute indicating that When a corresponding Title branches, a PlayList with the "AutoPlay" attribute is played back. When a Title branches to another Title, the management body (application manager) that manages the applications starts playing back a PlayList which can be played back in the branch destination Title and whose playback attribute has been set to AutoPlay. This means that the PlayList whose playback attribute has been set to AutoPlay is automatically activated as Title branches.

"Present" is, as is the case with the run attribute "Present", a continuous attribute, and indicates that the status of the PL in the branch source Title is maintained. The "Present" is also an attribute that indicates that a corresponding PlayList can be played back. Suppose, for example, that there are two Titles that are to be played back continuously, that in the PlayList management table of the branch source Title, the playback attribute of a PlayList is set to AutoPlay, and in the PlayList management table of the branch destination Title, the playback attribute of the PlayList is set to Present. Here, it is supposed that the PlayList can be played back for two hours, and that a branch occurs after it is played back for one hour. In this case where the playback attribute of the PlayList is set to Present in the branch destination Title, the branch destination Title plays back the PlayList starting with a position immediately after an already-played-back one hour portion. As understood from this, even if a branch occurs between Titles, by setting the playback attribute of a PlayList to Present in the branch destination Title, it is possible to resume the playback of the PlayList in the branch destination Title. This enables a series of branch Titles to continuously play back a common PlayList, thus making it easy to achieve "a common PlayList being played back in a series of Titles". When there are a plurality of branch destination Titles, it is possible, by setting the playback attribute of the PlayList to Present in the branch destination Titles, to continue the playback of a common PlayList through the branch destination Titles.

It should be noted here that since there is no need to assure the seamless playback at a boundary between Titles, it is permitted to interrupt the playback of the PlayList at around a branch in the above-stated case where a common PlayList is played back through a plurality of Titles.

Also, a PlayList whose playback attribute is set to "Present" can be played back upon request from another application. When a playback request is issued from another application that is being run, the management body (application manager) judges whether or not PL_id_ref of the target PlayList is written in the PlayList management table and whether or not the playback attribute of the PlayList is set to "AutoPlay" or "Present". If it is set to "AutoPlay" or "Present", the management body plays back the PlayList. If PL_id_ref of the PlayList is not written in the PlayList management table, the management body does not play back the PlayList. Only PlayLists whose playback attribute is set to "AutoPlay" or "Present" can be played back upon request from another application. "Present" is a default playback attribute that is assigned when the playback attribute is not clearly specified. As a result, when the playback attribute of an application is "--" indicating no specification, it means that the playback attribute of the PlayList is "Present".

FIG. 28 shows six combinations of three possible statuses of the branch destination Title ((i) Not having PlayList management table, (ii) Having PlayList management table and AutoPlay, and (iii) Having PlayList management table and Present) and two possible statuses of the PL in the previous Title (Not being played back, and Being played back).

Of these six combinations shown in FIG. 28, in the combination of "Previous status=Not being played back" and "Branch destination Title has PlayList management table, and Playback attribute is AutoPlay", playback of the PlayList is automatically started in the branch destination Title.

Also, in the combination of "Previous status=Being played back" and "Branch destination Title does not have PlayList management table", playback of the PlayList is stopped in the branch destination Title. In the combinations other than these, the status in the branch source Title is maintained. Based on the PlayList management table, a playback of a PlayList is started only when the PlayList has not been played back in the branch source Title and the playback attribute for the PlayList is set to AutoPlay in the branch destination Title. As a result, there is no need to start playing back a PlayList each time a branch between Titles occurs. Accordingly, the number of starting playback of a PlayList is minimized even if a lot of branches occur between Titles.

Figure 29A:
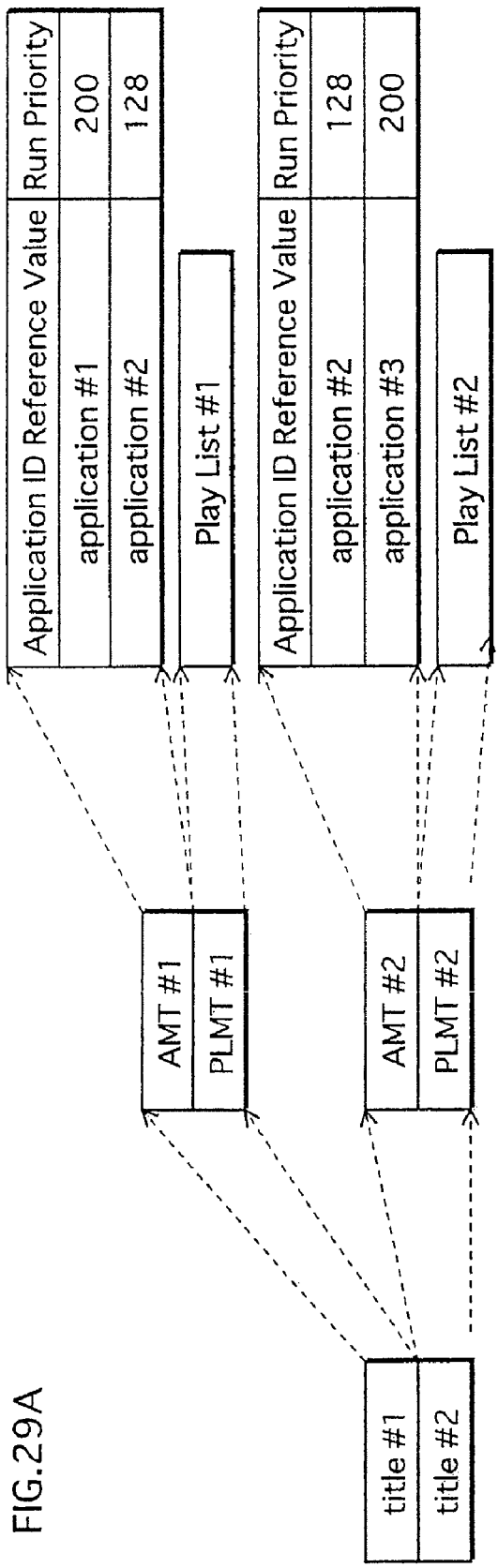
FIG. 29A shows description examples of the PlayList management table and the application management table.
Figure 29B:
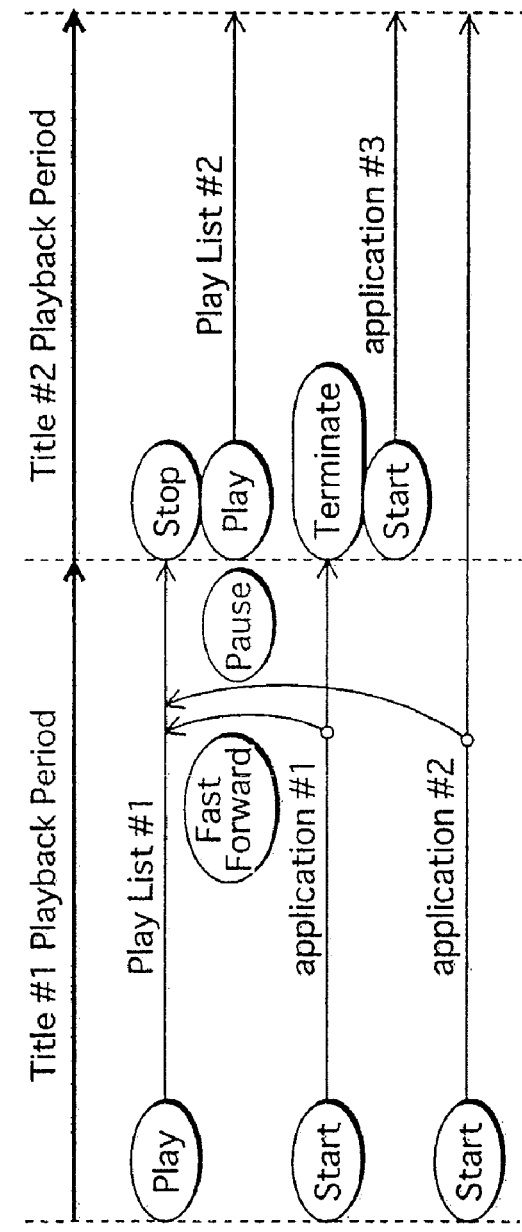
FIG. 29B shows how the PlayLists are played back and the applications are executed based on the PlayList and application management tables that are written as shown in FIG. 29A.

The following describes how to write the PlayList and application management tables, with reference to a specific example shown in FIG. 29A. In this specific example, two continuous Titles (Title #1 Title #2) are used. In the table for Title #1, application #1 and application #2 are written as AutoRun applications. In the table for Title #2, application #2 and application #3 are written as AutoRun applications. It is supposed that in the PlayList management table for Title #1, PlayList #1 is written as an AutoPlay PlayList, and that in the PlayList management table for Title #2, PlayList #2 is written as an AutoPlay PlayList. FIG. 29B shows how the PlayLists are played back and the applications are executed based on the PlayList and application management tables that are written as shown in FIG. 29A.

According to the PlayList and application management tables that are set as described above, at the start of Title #1, the applications #1 and #2 are automatically started, and a playback of PlayList #1 is automatically started.

According to the PlayList and application management tables that are set as described above, in terms of the application #1, there is description in the table for Title #1, but there is no description in the table for Title #2. Therefore, the execution of the application #1 is stopped. Similarly, in terms of PlayList #1, there is description in the table for Title #1, but there is no description in the table for Title #2. Therefore, the playback of PlayList #1 is stopped.

In terms of PlayList #2 and the application #3, there is no description in the tables for Title #1, but there is description in the tables for Title #2. Therefore, a playback of PlayList #2 and an execution of the application #3 are automatically started. A branch can be used as a chance to change a PlayList to be played back to another PlayList. In this way, use of the PlayList and application management tables makes it possible to define, in advance in the authoring stage, a process of changing PlayLists to be played back, at a branch.

Also in the example shown in FIG. 29A, the application #1, application #2, and application #3 are assigned 200, 128, and 200 as the run priority levels, respectively. Such assignment of run priority levels causes an arbitration between applications to be performed when the applications conflict with each other issuing requests to control PlayList #1 or PlayList #2. Suppose here that the application #1 is fast forwarding PlayList #1 and the application #2 issues a pause request for PlayList #1. Then the run priority levels assigned to these applications in the application management table are compared with each other for the arbitration. As a result of this, the control by the application #1 is continued, rejecting the request by the application #2. Such a process can be defined at the authoring stage. Use of the run priority together with the PlayList management table makes it possible for the playback apparatus to perform even an arbitration when a conflict occurs for a PlayList.

Figures 30A, 30B:
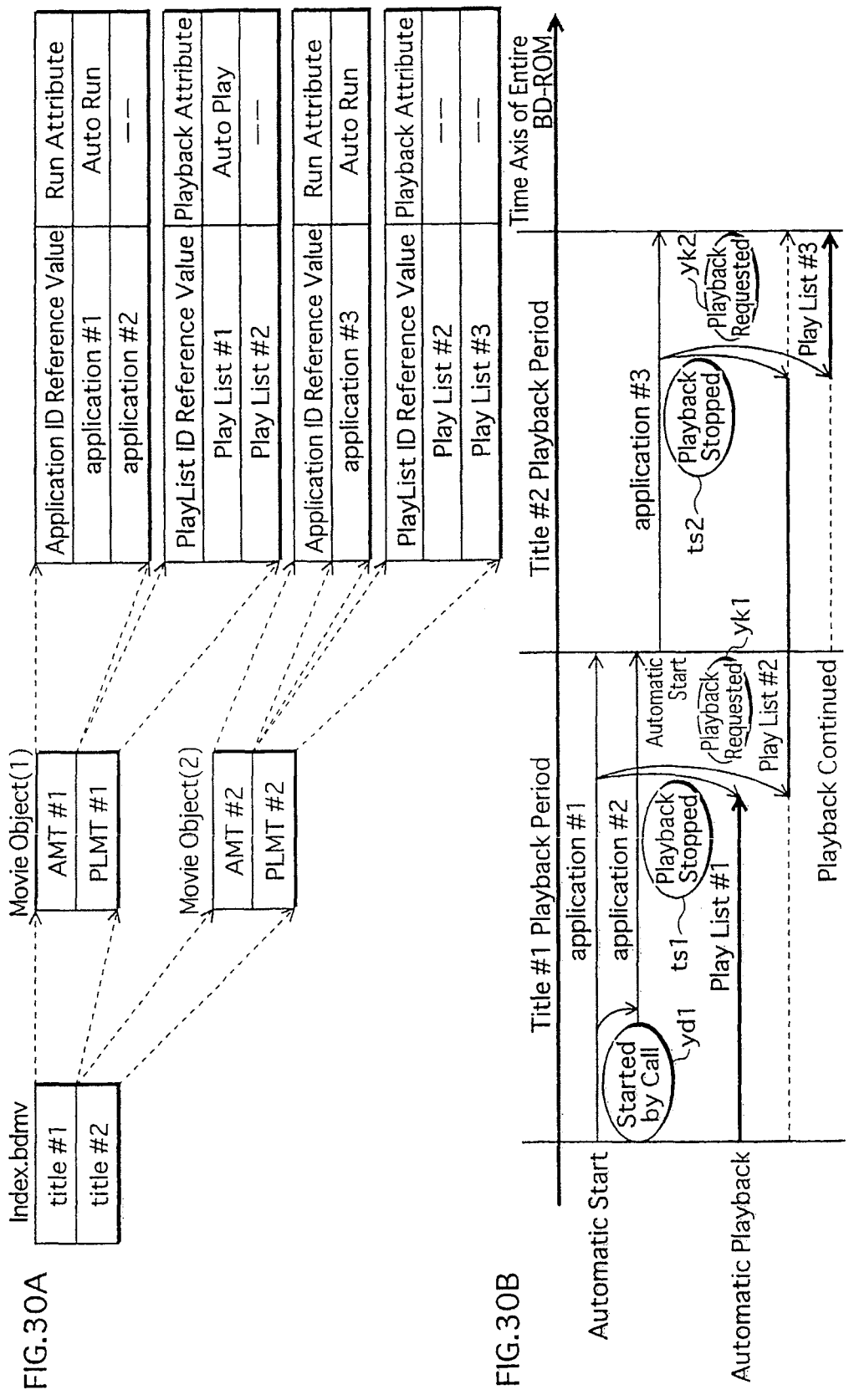
FIG. 30A shows an example of the description of the PlayList management table.
FIG. 30B shows how the PlayLists are played back and the applications are executed based on the case shown in FIG. 30A.

The following describes a specific example of the description of the PlayList management table. FIG. 30A shows an example of the description of the PlayList management table. The tables are written for each of the two continuous Titles (Title #1, Title #2) as follows. In the PlayList management table for Title #1, PlayList #1 is written as an AutoRun PlayList, and PlayList #2 is written as a playable PlayList. In the application management table for Title #1, application #1 is written as an AutoRun application, and application #2 is written as an executable application. In the PlayList management table for Title #2, PlayList #2 and PlayList #3 are written as playable PlayLists. In the application management table for Title #2, application #3 is written as an AutoPlay application. FIG. 30B shows how the PlayLists are played back and the applications are executed based on the PlayList and application management tables that are written as shown in FIG. 30A. According to the PlayList and application management tables that are set as described above, at the start of Title #1, the application #1, which is written as an AutoRun application, is automatically started. Also, since the application #2 is written as an executable application in the application management table for Title #1, the application #2 is started by a call yd1 from the application #1.

In the application management table for Title #2, there is no description of the applications #1 and #2, but the application #3 is written as an AutoRun application. Therefore, at the boundary between Title #1 and Title #2, the execution of the applications #1 and #2 is stopped, and the application #3 is automatically started. In the PlayList management table for Title #1, PlayLists #1 and #2 are written as playable PlayLists. Of these playable PlayLists, PlayList #1 is assigned the AutoPlay attribute. As a result, PlayList #1 is automatically played back at the start of Title #1.

In the PlayList management table for Title #1, PlayList #2 is written as a playable PlayList, as well as PlayList #1. It is therefore possible for the application #1 to stop the playback of PlayList #1 and start a playback of PlayList #2 by requesting the playback of PlayList #2, thus achieving the PlayList change. In the PlayList management table for Title #2, PlayList #2 and PlayList #3 are written as playable PlayLists, and there is no PlayList to which the AutoPlay attribute has been attached. As a result, the playback of PlayList #1, which was automatically started at the start of Title #1, may continue during Title #1, but automatically stops at the start of Title #2.

However, the playback of PlayList #2, if it continues through Title #1, continues also into Title #2. In the PlayList management table for Title #2, PlayList #2 and PlayList #3 are written as playable PlayLists. As a result, it is possible for the application #3, which is run in Title #2, to stop the playback of PlayList #2 and start a playback of PlayList #3 by requesting the playback of PlayList #3, thus achieving the PlayList change.

Next, how the Title playback period is defined by the PlayList management table will be described with reference to FIGS. 31A to 31C.

Figure 31A:
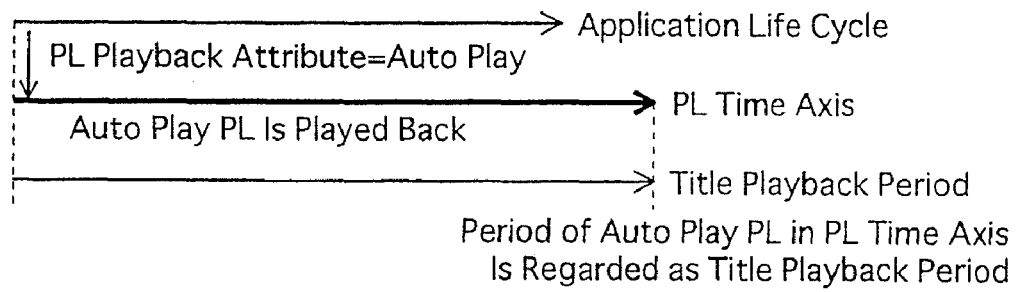
FIGS. 31A to 31C show relationships between the PlayList time axis and the Title playback periods.

FIG. 31A shows the Title playback period of a Title for which the playback attribute is set to AutoPlay. If the playback attribute has been set to AutoPlay, a playback of an AutoPlay PL is started as the playback of the Title is started. Here, the Title playback period is determined based on the PL time axis even if the application runs normally and terminates normally.

Figure 31B:
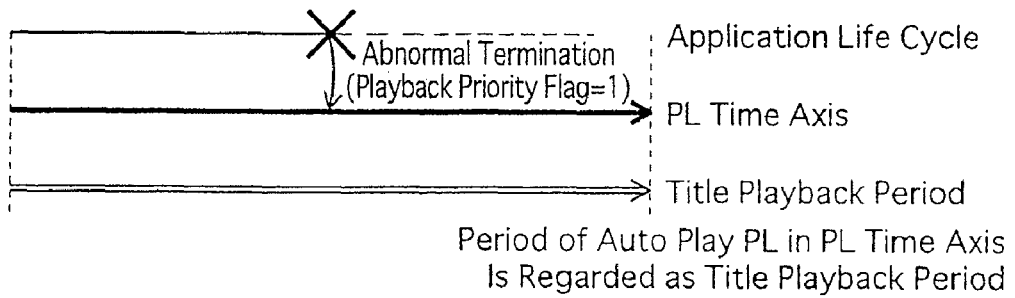

FIG. 31B shows a case where the playback attribute is set to AutoPlay in the PlayList management table, and the application terminates abnormally. After the abnormal termination, no application is run, but the playback of the AutoPlay Pl is continued. In this case also, the Title playback period is determined based on the PL time axis.

Figure 31C:
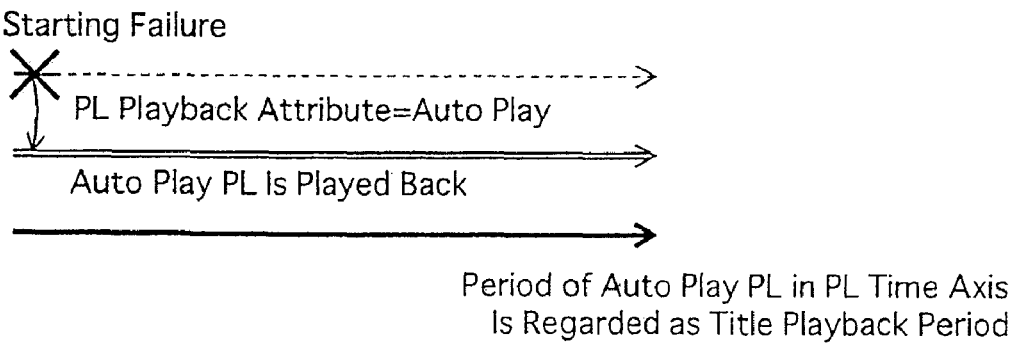

FIG. 31C shows a case where the playback attribute is set to AutoPlay in the PlayList management table, and the main application fails to be started. In this case also, the Title playback period is determined based on the PL time axis since the AutoPlay Pl is played back regardless of the starting failure of an application.

With the above-stated arrangement of setting the playback attribute to AutoPlay in the PlayList management table, even if it takes 5 to 10 seconds to start a Java™ application, something is displayed on the screen during the start-up. That is to say, even if it takes time to start an application, something is displayed on the screen during the start-up. This alleviates the start-up delay which is caused by the time-consuming process of application start-up.

Defining the application and PlayList management tables makes it possible to perform a synchronization control to run a Java™ application during a Title playback period. This enables achievement and provision of various applications that cause images to be played back and programs to be executed. Up to now, the recording medium has been described. The following describes the playback apparatus of the present invention.

FIG. 32 shows the internal structure of the playback apparatus of the present invention. The playback apparatus of the present invention is industrially manufactured based on the internal structure shown in FIG. 32. The playback apparatus of the present invention is mainly composed of two parts: a system LSI; and a drive apparatus. The industrial manufacturing is achieved by loading the parts into the cabinet and the board of the apparatus. The system LSI is an integrated circuit that includes various processing units for performing the functions of the playback apparatus. The playback apparatus manufactured in such a manner includes a BD-ROM drive 1, a read buffer 2, a demultiplexer 3, a video decoder 4, a video plane 5, a P-graphics decoder 6, a presentation graphics plane 7, a combining unit 8, a font generator 9, an I-graphics decoder 10, a switch 11, an interactive graphics plane 12, a combining unit 13, a CLUT unit 14, a CLUT unit 15, an audio decoder 16, a network device 17, a local storage 18, a read buffer 19, a demultiplexer 20, an instruction ROM 21, a user event processing unit 22, a PSR set 23, a CPU 24, a scenario memory 25, a local memory 26, and a switch 27.

First, component elements (the BD-ROM drive 1 to the audio decoder 16) for playing back the AVClips recorded on the RD-ROM will be described.

The BD-ROM drive 1 performs loading/ejecting a BD-ROM, and performs accesses to the BD-ROM.

The read buffer 2 is a FIFO memory in which TS packets read from the BD-ROM are stored in the First-In-First-Out manner.

The demultiplexer (De-mux) 3 extracts TS packets from the read buffer 2, and converts the TS packets into PES packets. The demultiplexer 3 outputs PES packets, out of the PES packets obtained by the conversion, that have PIDs set by the CPU 24, to any of the video decoder 4, the P-graphics decoder 6, the I-graphics decoder 10, and the audio decoder 16.

The video decoder 4 decodes a plurality of PES packets, which are output from the demultiplexer 3, into pictures of a non-compression format, and writes the pictures onto the video plane 5.

The video plane 5 is a plane for storing non-compression format pictures. The plane is a memory area in the playback apparatus for storing pixel data of one screen. The resolution of the video plane 5 is 1920×1080. The picture data stored in the video plane 5 is composed of pixel data that is represent by the audio decoder 16-bit YUV values. In the video plane 5, scaling of playback images for each frame in the video stream is possible. Here, "scaling" is changing the size of playback image per frame to either ¼ (quarter) or ⅕ (full-screen) of the video plane 5. Such a scaling is executed in the BD-J mode in accordance with an instruction by the CPU 24. This enables the screen to be arranged differently by displaying the playback image of the video stream at one corner, in the full scale or the like.

The P-graphics decoder 6 decodes a presentation graphics stream read from the BD-ROM into non-compression graphics, and writes the non-compression graphics onto the presentation graphics plane 7. The decoding of the graphics stream results in a sub-title appearing on the screen.

The presentation graphics plane 7 is a memory area having the size of one screen, and is able to store non-compression graphics of one screen. The resolution of the video plane 5 is 1920×1080. Each pixel of the non-compression graphics stored in the presentation graphics plane 7 is represented by an 8-bit index color. The non-compression graphics stored in the presentation graphics plane 7 are displayed after the index color is converted using a CLUT (Color Lookup Table).

The combining unit 8 combines the non-compression picture data (i) stored in the video plane 5 with the data stored in the presentation graphics plane 7.

The font generator 9 expands the text code, which is contained in the text ST stream, into bit maps using character fonts, and writes the bit maps onto the presentation graphics plane 7.

The I-graphics decoder 10 decodes an IG stream, which is read from the BD-ROM or the local storage 18 in the HDMV mode, into non-compression graphics, and writes the non-compression graphics onto the interactive graphics plane 12.

The switch 11 selectively writes, onto the presentation graphics plane 7, either the font sequence generated by the font generator 9 or the graphics obtained as a result of the decoding by the P-graphics decoder 6.

The interactive graphics plane 12 stores the non-compression graphics that are obtained as a result of the decoding by the I-graphics decoder 10. The interactive graphics plane 12 also stores the characters and graphics that the applications have drawn in the BD-J mode.

The combining unit 13 combines the data stored in the interactive graphics plane 12 with a composite image (combination of the non-compression picture data and the data stored in the presentation graphics plane 7) output from the combining unit 8. This combination enables the characters and/or graphics written on the I-graphics decoder 10 by applications to be overlaid on the non-compression picture data.

The CLUT unit 14 converts the index color of the non-compression graphics stored in the video plane 5, into the Y, Cr, and Cb values.

The CLUT unit 15 converts the index color of the non-compression graphics stored in the interactive graphics plane 12, into the Y, Cr, and Cb values.

The audio decoder 16 decodes PES packets output from the demultiplexer 3, and outputs audio data in the non-compression format.

Up to now, the component elements for playing back the AVClips have been described. The following describes the component elements (the network device 17 to the demultiplexer 20) that relate to operations in the BD-J mode.

The network device 17 is for achieving the communication function in the playback apparatus. When a URL is specified by a Java™ application in the BD-J mode, the network device 17 establishes the TCP connection, FTP connection or the like with the web site having the URL. Such establishment of the connection allows the Java™ application to download data from the web site.

The local storage 18 is a hard disk for storing, together with metadata, contents that are provided from a recording medium or a communication medium other than the BD-ROM, such as the contents downloaded from the web site through a connection established by the network device 17. The metadata is used for managing the downloaded contents by bounding them to the local storage 18. An application in the BD-J mode can, by accessing the local storage 18, perform various processes using the length of the downloaded contents.

The read buffer 19 is a FIFO memory. If a downloaded content stored in the local storage 18 contains a SubClip, the read buffer 19 stored TS packets that constitute the SubClip in the First-In-First-Out manner.

The demultiplexer (De-mux) 20 extracts TS packets from the read buffer 19, and converts the TS packets into PES packets. The demultiplexer 3 outputs PES packets, out of the PES packets obtained by the conversion, that have desired PIDs, to the font generator 9, the I-graphics decoder 10, and the audio decoder 16.

With the above-described operations of the network device 17 to the demultiplexer 20, a content that a Java™ application downloaded through a network can be played back in the same manner as a content recorded on the BD-ROM. The following describes component elements (the instruction ROM 21 to the switch 27) for achieving the integration control in the playback apparatus.

The instruction ROM 21 stores software that defines the control by the playback apparatus.

The user event processing unit 22 outputs, to the CPU 24, user events that are instructed through key operations on the remote control or the front panel of the playback apparatus.

The PSR set 23 is a register embedded in the playback apparatus, and is composed of 64 Player Status Registers (PSR) and 4,096 General Purpose Registers (GPR). Among the values set in the Player Status Registers (the set values are referred to as PSRs), PSR4 to PSR8 are used to represent a current playback position.

PSR4 is set to a value ranging from 1 to 100 to indicate a Title to which the current playback position belongs, and is set to a value 0 to indicate that the current playback position belongs to the top menu.

PSR5 is set to a value ranging from 1 to 999 to indicate a Chapter number of a Chapter to which the current playback position belongs, and is set to a value 0xFFFF to indicate that Chapter numbers are invalid in the playback apparatus.

PSR6 is set to a value ranging from 0 to 999 to indicate a PL number of a PL (current PL) to which the current playback position belongs.

PSR7 is set to a value ranging from 0 to 255 to indicate a PlayItem number of a PlayItem (current PlayItem) to which the current playback position belongs.

PSR8 is set to a value ranging from 0 to 0xFFFFFFFF to indicate the current playback position (current PTM (Presentation TiMe)) using the temporal accuracy of 45 KHz. With the above-described PSR4 to PSR8, it is possible to identify the current playback position in the time axis of the entire BD-ROM shown in FIG. 21A.

The CPU 24 runs the software stored in the instruction ROM 21 and controls the entire playback apparatus. The contents of the control dynamically change depending on the user events output from the user event processing unit 22 and depending on the values set in PSRs in the PSR set 23.

The scenario memory 25 stores the current PL information and the current Clip information. The current PL information is a piece of PL information that is a current target of processing, among a plurality of pieces of PL information recorded on the BD-ROM. The current Clip information is a piece of Clip information that is a current target of processing, among a plurality of pieces of Clip information recorded on the BD-ROM.

The local memory 26 is a cache memory for temporarily storing the data recorded on the BD-ROM so as to cover the slowness in reading data from the BD-ROM. Due to the presence of the local memory 26, applications are executed efficiently in the BD-J mode.

The switch 27 is used to selectively enter data, which has been read from the BD-ROM or the local storage 18, into any of the read buffer 2, the read buffer 19, the scenario memory 25, and the local memory 26.

Figure 33:
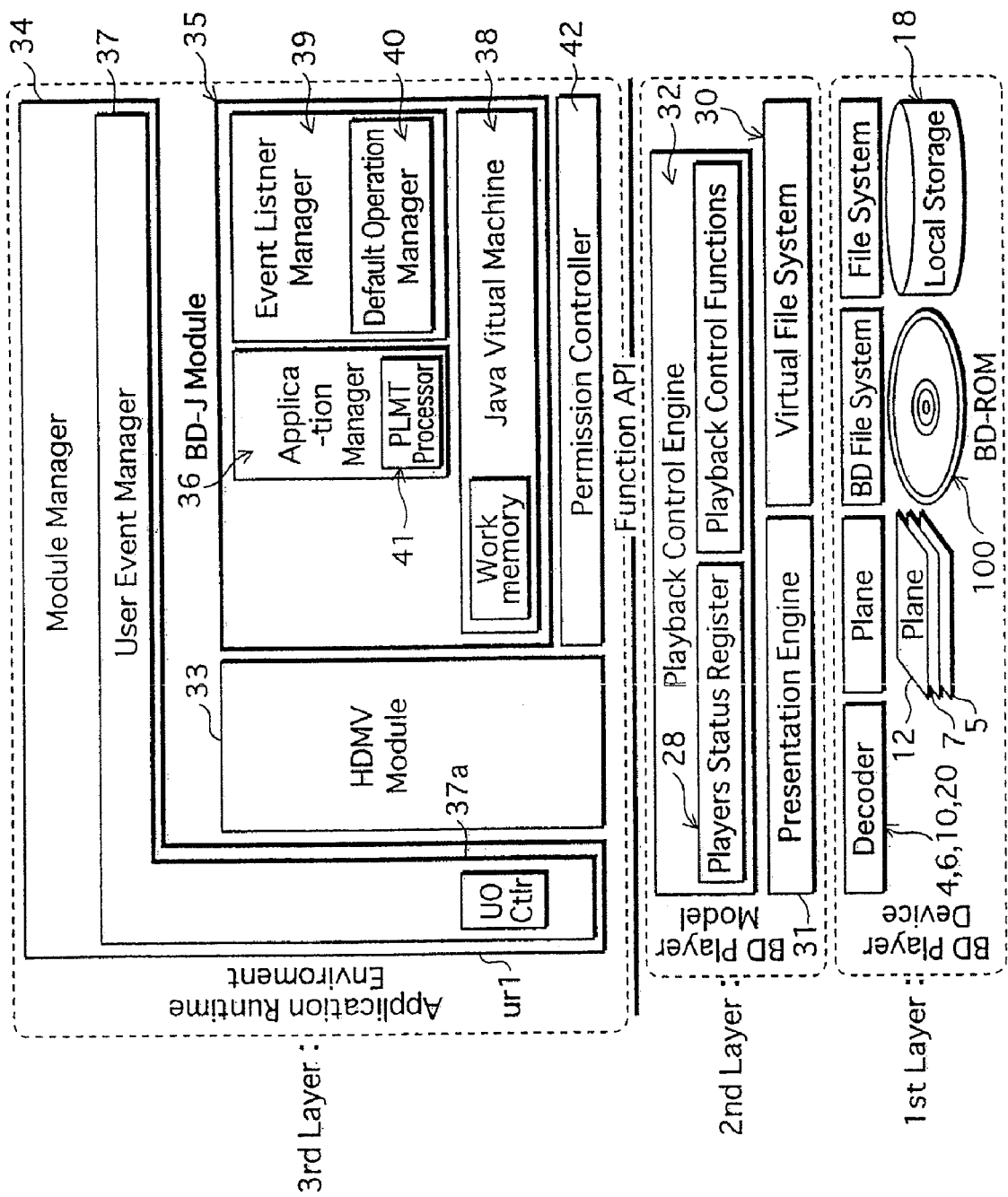
FIG. 33 shows, in the layer structure, the hardware and the software stored in the CPU 24.

Up to now, the hardware structure of the playback apparatus of the present embodiment has been described. The following describes the software structure of the playback apparatus of the present embodiment FIG. 33 shows, in the layer structure, the hardware and the software stored in the CPU 24. As shown in FIG. 33, the layer structure of the playback apparatus is composed of:
a) The first layer as the BD Player Device;
b) The second layer as the BD Player Model; and
c) The third layer as the Application Runtime Environment.

The hardware structure of the playback apparatus shown in FIG. 32 belongs to the first layer. The first layer as the BD Player Device includes: a "decoder" that is composed of the video decoder 4, the P-graphics decoder 6, the I-graphics decoder 10, and the audio decoder 16; a "plane" that is composed of the video plane 5, the presentation graphics plane 7, and the interactive graphics plane 12; the BD-ROM, a file system of the BD-ROM; the local storage 18; and a file system of the local storage 18.

The second layer as the BD Player Model is composed of:
b2) a layer composed of a playback control engine 32; and
b1) a layer composed of a virtual file system 30 and a presentation engine 31, and
provides the function API to layers that are higher than itself.

The third layer as the Application Runtime Environment is composed of:
c1) a layer in which a module manager 34 is present; and
c2) a layer in which an HDMV module 33 and a BD-J module 35 are present.

In the layer model shown in FIG. 33, the module manager 34 is located in the uppermost layer. The module manager 34 has a bypass url that goes directly to the playback control engine 32 bypassing the HDMV module 33 and the BD-J module 35. Due to this bypass, the module manager 34 is in a shape of an inverted character "L", embedding a user event manager 37 in itself, in the layer model shown in FIG. 33.

The BD-J module 35 is what is called a Java™ platform, having a construction centering on a Java™ virtual machine 38. Various system programs and applications operate in a work memory that is included in the Java™ virtual machine 38. An application manager 36 and an event listner manager 39 (default operation manager 40) that are located upper than the Java™ virtual machine 38 are such system programs. The application manager 36 includes a PLMT processor 41. Also, a permission controller 42 is provided between the BD-J module 35 and the playback control engine 32.

Figure 34:
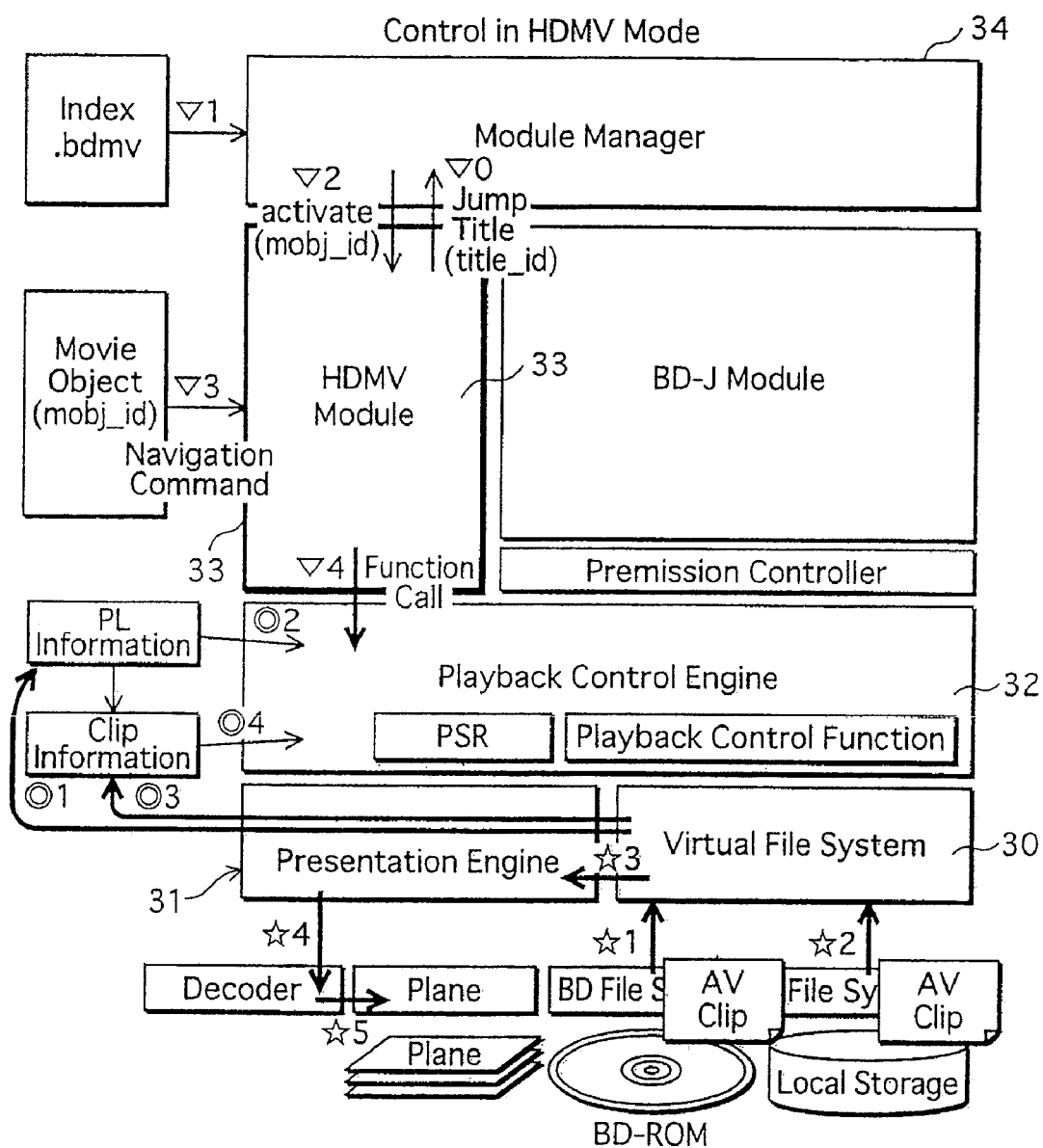
FIG. 34 is an illustration of the processes performed by the presentation engine 31 to the module manager 34.

First, the virtual file system 30 to the module manager 34 that belong to the second layer will be described. FIG. 34 is an illustration of the processes performed by the virtual file system 30 to the module manager 34.

The virtual file system 30 is a virtual file system for treating the downloaded contents stored in the local storage 18 as one unit with the disc contents of the BD-ROM. The downloaded contents stored in the local storage 18 contain the SubClip, Clip information, and PlayList information. The PlayList information in the downloaded contents differ from the PlayList information recorded on the BD-ROM in that it can specify Clip information whether the Clip information is stored in the BD-ROM or the local storage 18. And for this specification, the PlayList information in the virtual file system 30 need not specify a file on the BD-ROM or the local storage 18 by a full path. This is because a file system on the BD-ROM or the local storage 18 is recognized as one virtual file system (virtual file system 30). Therefore, with a five-digit value, which is a file body of a file storing Clip information, specified therein, the Clip_Information_file_name in the PlayItem information and the Clip_Information_file_ name in the SubPlayItem information are used to specify an AVClip on the virtual file system 30 or the BD-ROM. The data reading via the virtual file system 30 from the local storage 18, when combined dynamically with the data stored in the BD-ROM, can produce various patterns of playbacks. In the present embodiment, since the disc contents of a combination of the local storage 18 and the BD-ROM are treated on an equality with the disc contents of the BD-ROM, it is presumed that the "BD-ROM" also refers to a virtual recording medium that is a combination of the local storage 18 and the BD-ROM.

The presentation engine 31 executes AV playback functions. The AV playback functions in the playback apparatus are a group of traditional functions succeeded from CD and DVD players. The AV playback functions include: Play, Stop, Pause On, Pause Off, Still Off, Forward Play (with specification of the speed), Backward Play (with specification of the speed), Audio Change, SubTitle Change, and Angle Change. To realize the AV playback functions, the presentation engine 31 controls the video decoder 4, the P-graphics decoder 6, the I-graphics decoder 10, and the audio decoder 16 so as to decode a portion of the AVClip, which has been read into the read buffer 2, corresponding to a desired time. Here, the desired time may be the time specified by PSR8 (current PTM). With this construction, it is possible to play back a portion of an AVClip that corresponds to an arbitrary time.

The playback control engine (PCE) 32 performs functions that include: (i) PlayList playback control function; and (ii) status obtaining/setting function for obtaining and setting statuses with the PSR set 23. The PlayList playback control function is, among the AV playback functions performed by the presentation engine 31, a playback start, a playback stop or the like that are performed based on the current PL information and Clip information. The functions (i) and (ii) are performed in response to the function calls that are issued by the HDMV module 33, the module manager 34, and the BD-J module 35.

That is to say, if it receives a function call that instructs to play back a PL, the playback control engine 32 reads a piece of PlayList information corresponding to the PL specified in the function call, via the virtual file system 30 from the BD-ROM or the local storage 18. The playback control engine 32 then refers to the PlayItem Information contained in the piece of PlayList information, and reads, via the virtual file system 30 from the BD-ROM or the local storage 18, Clip information recited in the Clip_Information_file_name of the PlayItem Information. The signs ⊚1, ⊚2, ⊚3, and ⊚4 in FIG. 34 respectively indicate the following: read PlayList information via the virtual file system 30 (⊚1); decode PlayItem information that constitutes the PlayList information (⊚2); read Clip information via the virtual file system 30 (⊚3); decode Clip information (⊚4). After the Clip information and the PlayList information are decoded as described above, the TS packets that constitute the AVClips are transferred to the presentation engine 31 via the virtual file system 30. After the TS packets are transferred to the presentation engine 31, the presentation engine 31 outputs the TS packets that constitute the AVClips to the decoder so that they are displayed on the plane. The signs ☆1, ☆2, ☆3, ☆4, and ☆5 in FIG. 34 respectively indicate the following: read the TS packets that constitute the AVClips (☆1, ☆2); transfer the TS packets from the virtual file system 30 to the presentation engine 31 (☆3); output the TS packets to the decoder (☆4); and output decoding results from the decoder to the planes (☆5).

The HDMV module 33 is a main body in performing the HDMV mode. If an activate request (activate(mobj_id) in which the mobj_id specifies a branch destination MovieObject) is received from the module manager 34, the HDMV module 33 stores MovieObject (mobj_id) into the local memory 26, decodes the navigation command written in the Movie Object, and issues, based on the decoding results, a function call to the playback control engine 32. In FIG. 34, the arrows with signs ∇72, ∇73, and ∇4 respectively indicate the following: receive "activate (mobj_id)" from the module manager 34 (∇2); decode the navigation command written in the Movie Object (∇3); and issue a function call to the playback control engine 32 (∇4).

The module manager 34 holds Index.bdmv that is read from the BD-ROM, and performs a branch control. The branch control includes issuing a terminate event to a dynamic scenario constituting a current Title, and issuing an activate event to a dynamic scenario constituting a branch destination Title. If a Movie Object executes a JumpTitle command that specifies title_id (JumpTitle (title_id)), the module manager 34 issues a terminate event to a Movie Object that constitutes a current Title, and issues an activate (mobj_id) event to activate a Movie Object that constitutes a Title corresponding to title_id. In FIG. 34, the arrows with signs ∇0, ∇1, and ∇2 respectively indicate the following: execute a JumpTitle command (∇0); the module manager 34 referring to Index.bdmv (∇1); and sends a notification to activate a Movie Object that constitutes the branch destination Title (∇2). These procedures also apply to the case where a BD-J Object calls JumpTitleAPI (JumpTitle (title_id)). In this case, a terminate event is issued to a BD-J Object that constitutes a current Title, and an activate (bobj_id) is issued to the BD-J module 35 to activate a BD-J Object that constitutes a Title corresponding to title_id.

Figure 35:
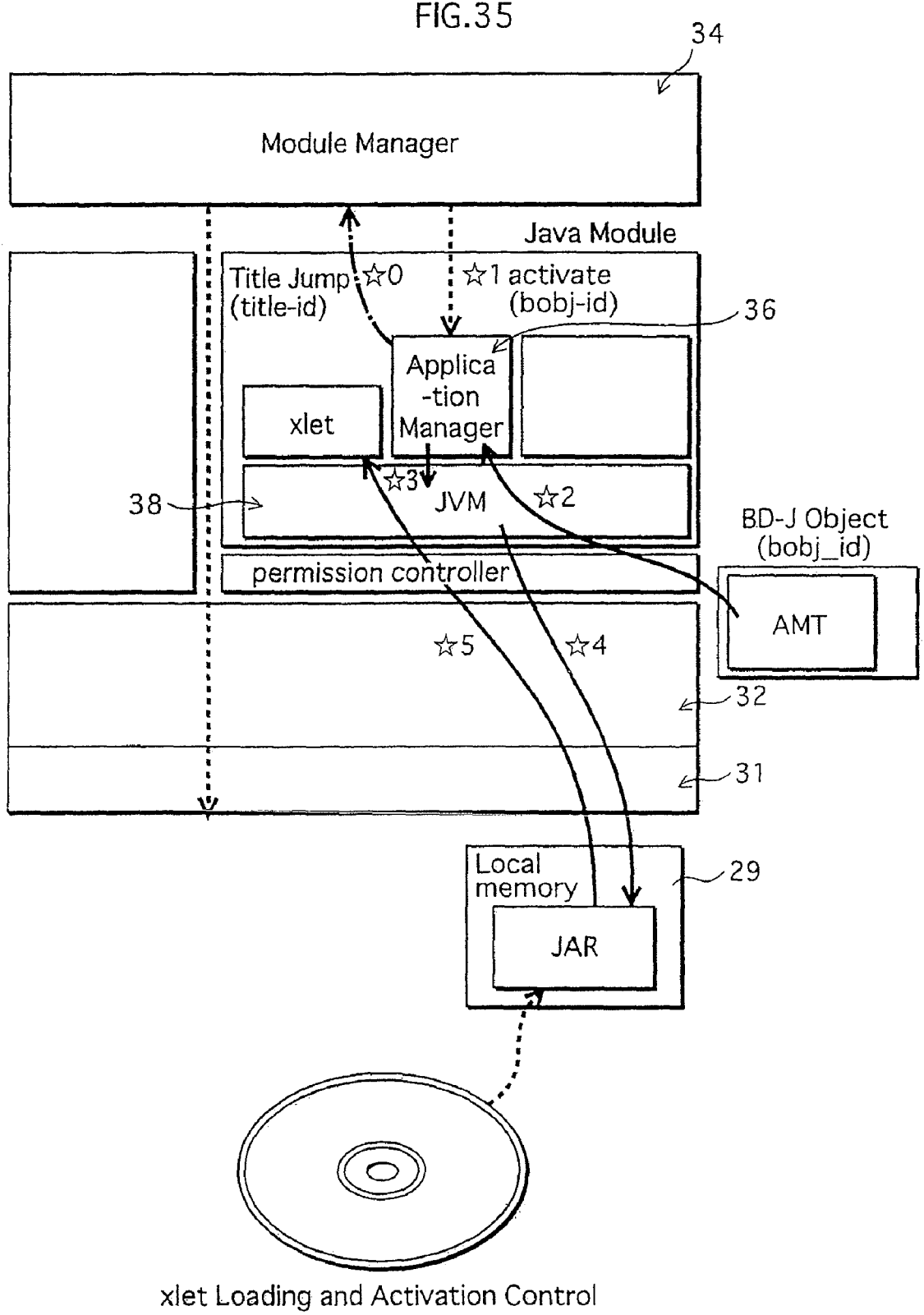
FIG. 35 shows the process performed by the application manager 36.

Up to now, the presentation engine 31 to the module manager 34 have been explained. The following describes the application manager 36 with reference to FIG. 35. FIG. 35 shows the application manager 36.

The application manager 36, each time a branch between Titles occurs, instructs the Java™ virtual machine 38 to start an application that is not run in the branch source Title, but has the run attribute "AutoRun" for the branch destination Title. At the same time, the application manager 36 terminates an application that is run in the branch source Title, but has no life cycle in the branch destination Title. Such start-up control and termination control are performed by referring to the application management table for the current BD-J. Object. If a branch between Titles occurs here, activate (bobj_id) is notified from the module manager 34. Upon receiving the notification, the application manager 36 sets the current BD-J Object to a BD-J Object that corresponds to bobj_id, and refers to the application management table for the current BD-J. Object. This enables the application manager 36 to identify the application to be automatically started and the application to be automatically terminated. In FIG. 35, the signs ☆0, ☆1, ☆2, and ☆3 respectively indicate the following: a TitleJump occurs (☆0); notify activate (bobj_id) (☆1); refer to the application management table (☆2); and instruct the Java™ virtual machine 38 to start an application (☆3). With this instruction to start an application, the Java™ virtual machine 38 reads the xlet program from the local memory 26 onto the work memory (☆4, ☆5).

Up to now, the application manager 36 has been described. The following describes the user event manager 37 to the default operation manager 40 with reference to FIG. 36.

The user event manager 37 divides the user events received by the user event processing unit 22 into (i) user events for playback control and (ii) key events. The user events for playback control are user events for instructing: Play, Stop, Pause On, Pause Off, Still Off, Forward Play (with specification of the speed), Backward Play (with specification of the speed), Audio Change, SubTitle Change, and Angle Change.

Figure 36:
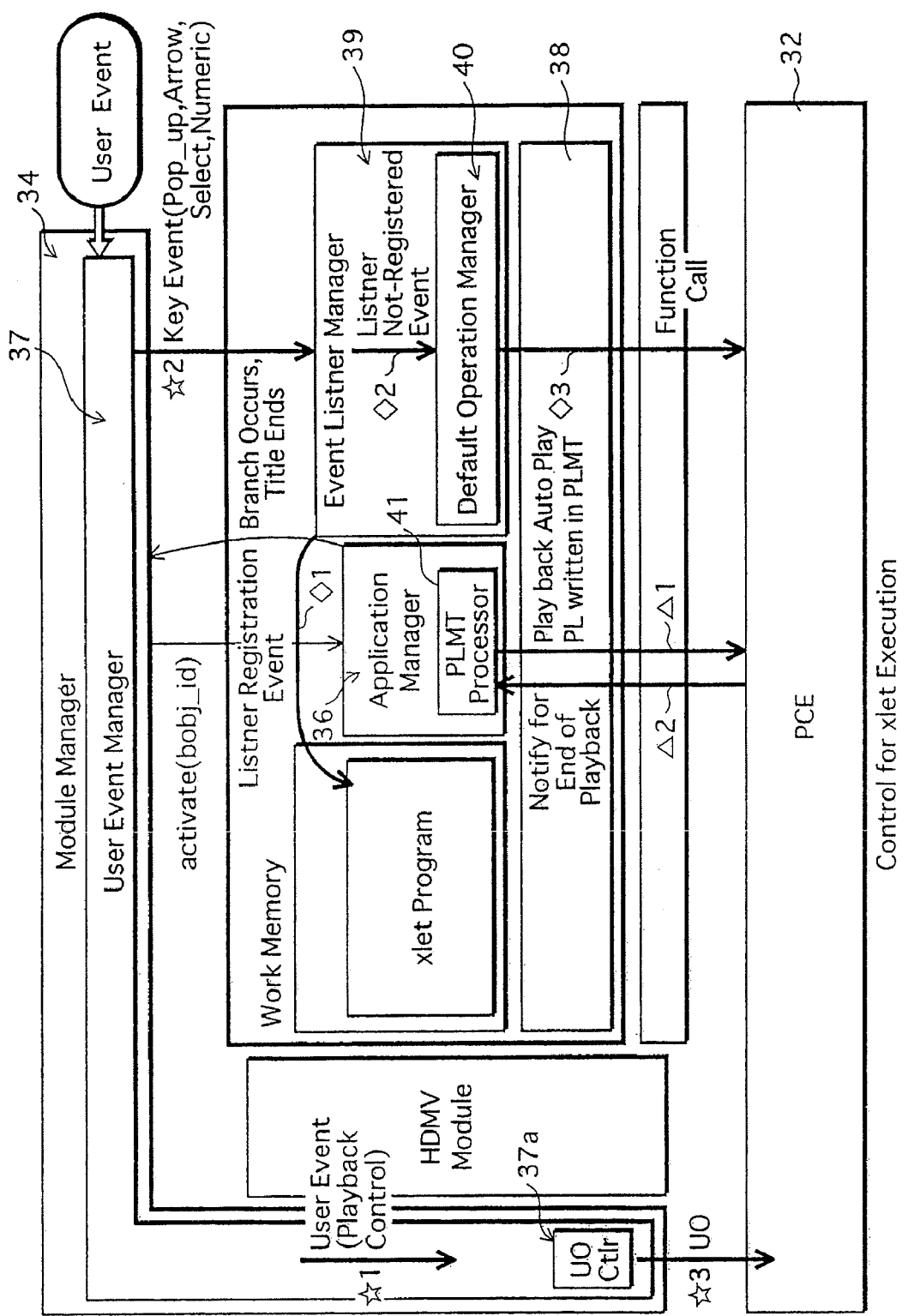
FIG. 36 shows the user event manager 37 to the default operation manager 40.

The key events are user events that indicate depression of the Move Up, Move Down, Move Right, Move Left, and Numeric keys. The user event manager 37 issues a function call to cause the playback control engine 32 to perform the playback control function based on a user event for playback control. This function call is referred to as UO (User Operation), and is issued to the playback control engine 32 by a UO controller 37a that is provided in the bypass in the module manager 34, without passing through the HDMV module 33 and the BD-J module 35. This enables playback control for Play, Stop, Pause On, Pause Off or the like to be performed without delay. In FIG. 36, the signs ☆1, ☆2, and ☆3 respectively indicate the following: the user event manager 37 divides the user events into (i) user events for playback control and (ii) key events (☆1, ☆2); and function calls issued to the playback control engine 32 based on the user events for playback control (☆3).

The Java™ virtual machine 38 loads the xlet program that constitutes an application onto the work memory, decodes the xlet program, and controls the lower layers based on the decoding results. More specifically, in the control of the lower layers, the Java™ virtual machine 38 issues a JMF method to a BD middleware (not illustrated) so that a function call corresponding to the BD playback apparatus replaces the existent function call, and issues the function call after replacement to the playback control engine 32.

The event listner manager 39 analyzes the key events and distributes the events. The solid line arrows ◇1 and ◇2 in FIG. 36 indicate the distribution of events by the event listner manager 39. If the event to be distributed is a key event that has been registered with the Event Listner in the xlet program, the event listner manager 39 distributes the event to a xlet program that is being indirectly referred to by the BD-J. Object. The Event Listner in the xlet program has key events corresponding to JMF that are registered therewith. Therefore, the xlet program can be activated by such a registered key event. If the event to be distributed is a key event that has not been registered with the Event Listner, the event listner manager 39 distributes the event to the default operation manager 40. Since various key events including key events that are not registered with Event Listner may occur in the BD-ROM playback apparatus, the above-described arrangement is made to process each key event properly without fail.

When a key event that is not registered with Event Listner in the xlet program is distributed to the default operation manager 40 by the event listner manager 39, the default operation manager 40 issues to the playback control engine 32 a function call that corresponds to the event that is not registered with Event Listner. The arrow ◇3 in FIG. 36 indicates the function call issued by the default operation manager 40.

The PLMT processor 41 is a component element of the application manager 36, and if activate (bobj_id) is received from the module manager 34, refers to the PlayList management table for a BD-J Object that is identified by the bobj_id. And if a PL having the playback attribute AutoPlay is written in the PlayList management table for the BD-J Object, the PLMT processor 41 outputs to the playback control engine 32 to play back the AutoPlay PL. On the other hand, if the playback control engine 32 issues a notify event that indicates an end of a playback of a PL, the PLMT processor 41 recognizes the point in time, at which the notify event was issued, as the Title end point. The arrows Δ1 and Δ2 in 36 respectively indicate the following: issue a function call PlayPL to the playback control engine 32 (Δ1); a notify event is output from the playback control engine 32 (Δ2).

This completes the description of the layer structure in the BD-J module 35. It should be noted here that description of the permission controller 42 is omitted in the present embodiment and will be provided in detail in Embodiment 3.

<Internal Structure of Java™ Virtual Machine 38>

Figure 37:
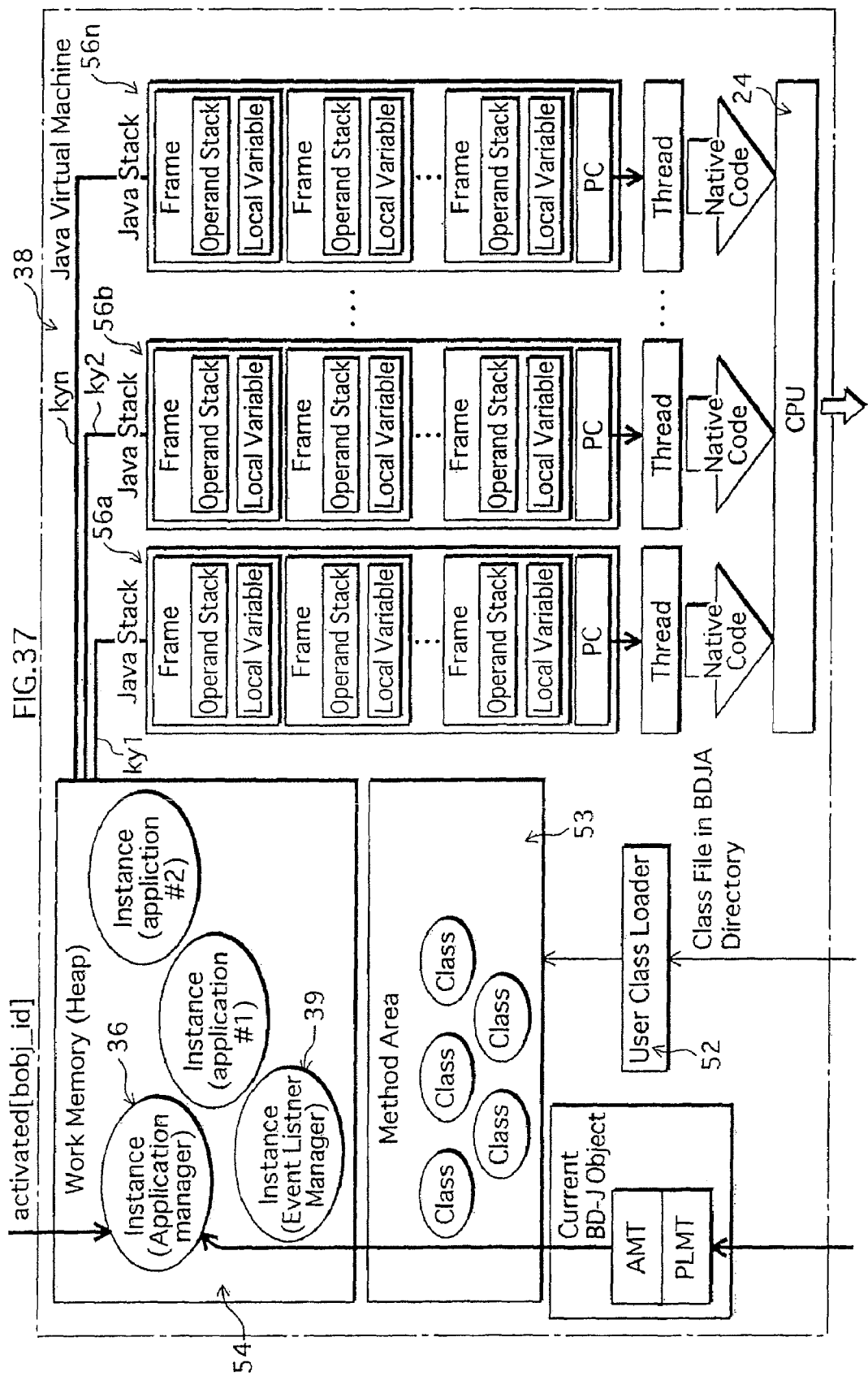
FIG. 37 shows the internal structure of the Java™ virtual machine 39.

The internal structure of the Java™ virtual machine 38 will be described. FIG. 37 shows the internal structure of the Java™ virtual machine 38. As shown in FIG. 37, the Java™ virtual machine 38 includes the CPU 24, which is shown in 32, a user class loader 52, a method area 53, a work memory 54, threads 55a, 55b, . . . 55n, and Java™ stacks 56a, 56b, 56n.

The user class loader 52 reads, from the local memory 26 or the like, class files in Java™ archive files that belong to the BDJA directory, and stores the read class files into the method area 53. The class file reading by the user class loader 52 is achieved as the application manager 36 instructs the user class loader 52 to read the class file by specifying a file path. If the file path indicates the local memory 26, the user class loader 52 reads a class file in a Java™ archive file that constitutes an application, from the local memory 26 onto the work memory. If the file path indicates a directory in the virtual file system 30, the user class loader 52 reads a class file in a Java™ archive file that constitutes an application, from the BD-ROM or the local storage 18 onto the work memory. The application activation control (☆3, ☆4, and ☆5) shown in FIG. 35 is achieved by the class file reading by the user class loader 52. If a class file specified to be read is not stored in the local memory 26, the user class loader 52 notifies the application manager 36 of a reading failure.

The method area 53 stores the class files read by the user class loader 52 from the local memory 26.

The work memory 54 is what is called a heap area for storing instances of various class files. The application manager 36 and the event listner manager 39 shown in FIG. 33 are resident applications that are resident in the work memory 54. The work memory 54 also stores instances that correspond to the class files stored in the method area 53, as well as the resident-type instances. The instances are the xlet programs that constitute the application. After such xlet programs are stored in the work memory 54, the application is ready to run. In the layer models shown in FIGS. 33, 35, and 36, the work memory 54 is located in a layer that is higher than the Java™ virtual machine 38. However, this is an arrangement made to describe the application manager 36 and the event listner manager 39 on the work memory 54 to be easy to understand. In reality, the application manager 36 and the event listner manager 39 are executed as instances by the threads 55a, 55b, . . . 55n.

The threads 55a, 55b, . . . 55n are a logical execution body for executing the methods stored in the work memory 54. The threads 55a, 55b, . . . 55n perform calculations using, as the operands, the arguments stored in the local variables or the operand stacks, and stores the calculation results into the local variables or the operand stacks. The arrows ky1, ky2, and kyn symbolically indicate the methods supplied from the work memory 54 to the threads 55a, 55b, . . . 55n. While the physical execution body is only one, namely the CPU, up to 64 threads may be provided in the Java (™) virtual machine 38, as the logical execution bodies. In so far as the number does not exceed 64, new threads may be created or existent threads may be deleted. The number of operating threads may be increased or decreased during the operation of the Java™ virtual machine 38. Since the threads may be increased as necessary, it is possible to allow a plurality of threads to execute one instance in parallel, thereby speeding up the instance. In FIG. 37, the relationship between the CPU 24 and the threads is "one-to-many". However, this relation may be "many-to-many" where there are a plurality of CPUs. The execution of the methods by the threads 55a, 55b, ... 55n is achieved by converting byte codes that constitute the methods into native codes for the CPU 24, and issuing the native codes to the CPU 24. Description of the conversion into native codes is omitted here since it diverges away from the subject of the present application.

The Java™ stacks 56a, 56b, ... 56n are provided in correspondence with the threads 55a, 55b, ... 55n on a one-to-one basis, and each have a program counter (PC in FIG. 37) and one or more frames. The "program counter" indicates a portion of an instance that is currently executed. The "frame" is an stack-system area that is assigned one-to-one to a call for a method. Each frame is composed of: "operand stack" for storing an argument used at the one-time call; and "local variable stack (Local Variable in FIG. 37)" used by the called method. Since a frame is stacked on the Java™ stacks 56a, 56b, ... 56n each time a call is performed, a frame is also stacked when a method calls for itself recursively. When a JMF player instance playback method is called for, or when a JumpTitle API call is called for, a frame corresponding to the call is stacked on the Java™ stacks 56a, 56b, ... 56n. Information that is stored in the operand stacks of these frames as the arguments includes: (i) file names of MPLS files to be played back by the playback methods; (ii) title_ids that indicate the jump destinations of the JumpTitle API calls; and the like.

The following describes in detail how the application manager 36 and its component element, the PLMT processor 41, process in the above-described internal structure of the Java™ virtual machine 38.

After the module manager 34 outputs an event (activatred [bobj_id]) that requests to activate a BD-J Object identified by bobj_id, the application manager 36, which is one instance in the work memory 54, sets the BD-J Object having the bobj_id to the current BD-J. Object. The application manager 36 then checks the execution status in the branch source Title and the run attribute of the application in the current BD-J Object, and determines (i) the application to be automatically started and (ii) the application to be automatically terminated.

The determination of (i) the application to be automatically started is achieved by searching the application management table of the current BD-J Object for apli_id_ref of an application that is not run in the branch source Title but has the attribute AutoRun in the current BD-J. Object. Upon finding such apli_id_ref, the application manager 36 instructs the user class loader 52 to read class files belonging to the Java™ archive files of the application identified by apli_id_ref, allowing instances corresponding to the class files to be generated in the work memory 54. This makes the application whose life cycle is in the current Title ready to be started. The application is then started when the threads 55a, 55b, ... 55n are caused to execute the methods of the application.

The determination of (ii) the application to be automatically terminated is achieved by searching the application management table of the current BD-J Object for apli_id_ref of an application that is run in the branch source Title but does not have a life cycle in the current Title. Upon finding such apli_id_ref, the application manager 36 terminates the xlet program that constitutes the application with the apli_id_ref. This makes it possible to regain such resources as (i) an area in the work memory 54 that has been occupied by the application, or (ii) frames in the Java™ stacks 56a, 56b, ... 56n that have been used to execute the methods of the application.

The PLMT processor 41, which is a component element of the application manager 36, checks the playback status in the branch source Title and the playback attribute of the PlayList in the current Title, and determines (i) the PlayList to be automatically played back and (ii) the PlayList to be automatically terminated.

The determination of (i) the PlayList to be automatically played back is achieved by searching the PlayList management table for a PlayList that is not played back in the branch source Title but has the attribute AutoPlay in the current Title. Upon finding such a PlayList, the PLMT processor 41 executes a function call for a PlayList playback using, as an argument, Pl_id_ref of the PlayList to be played back. With the execution of the call, frames with the Pl_id_ref stored in the operand stacks are generated in the Java™ stacks 56a, 56b, ... 56n. And the threads 55a, 55b, ... 55n execute the function call for playback of the PlayList. With the execution of the function call, the presentation engine 31 starts playing back the PlayList.

The determination of (ii) the PlayList to be automatically terminated is achieved by searching the PlayList management table for a PlayList that is being played back in the branch source Title but is not written in the PlayList management table of the current Title. Upon finding such a PlayList, the PLMT processor 41 executes a function call for stopping the playback of the PlayList, and deletes the frames corresponding to a function call for playing back the PlayList, from the Java™ stacks 56a, 56b, ... 56n.

Figure 38:
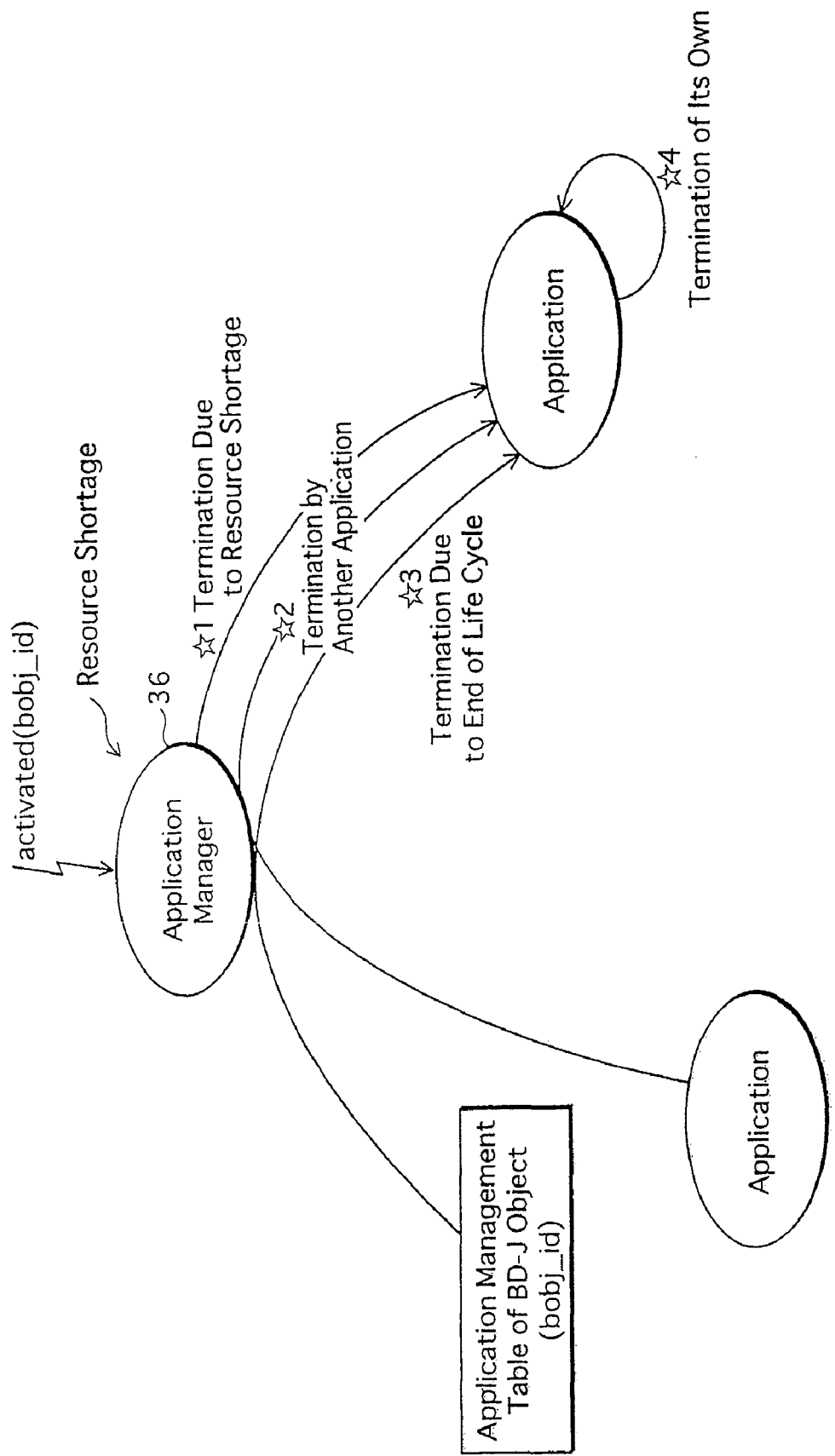
FIG. 38 shows the four modes of application termination.

There four modes in which an application terminates in the work memory 54. FIG. 38 shows the four modes of application termination. In the first mode, the application terminates as shortage of the resource occurs and the application manager 36 issues a terminate event (☆1). In the second mode, the application terminates as it receives a terminate event from another application via the application manager 36 (☆2). In the third mode, the application terminates as the life cycle written in the application management table ends and the application manager 36 issues a terminate event (☆3). In the fourth mode, the application terminates as the application itself activates the termination process (☆4). In three out of the four modes, the application manager 36 terminates the application. It is understood from this that the application manager 36 plays a central role in controlling the operation of the application. If the application does not terminate by an issuance of a terminate event, the application manager 36 can forcibly terminate the application to regain the resource. The authority to forcibly regain the resource is one characteristic of the application manager 36.

Up to now, the component elements of the BD-J module 35 have been described.

(Description of Flowcharts)

The above description of the application manager 36 is only an outline thereof. The processes of the application manager 36 are shown in detail in FIGS. 39 and 40. The following describes the processing procedures of the application manager 36 in more detail with reference to the flowcharts.

Figure 39:
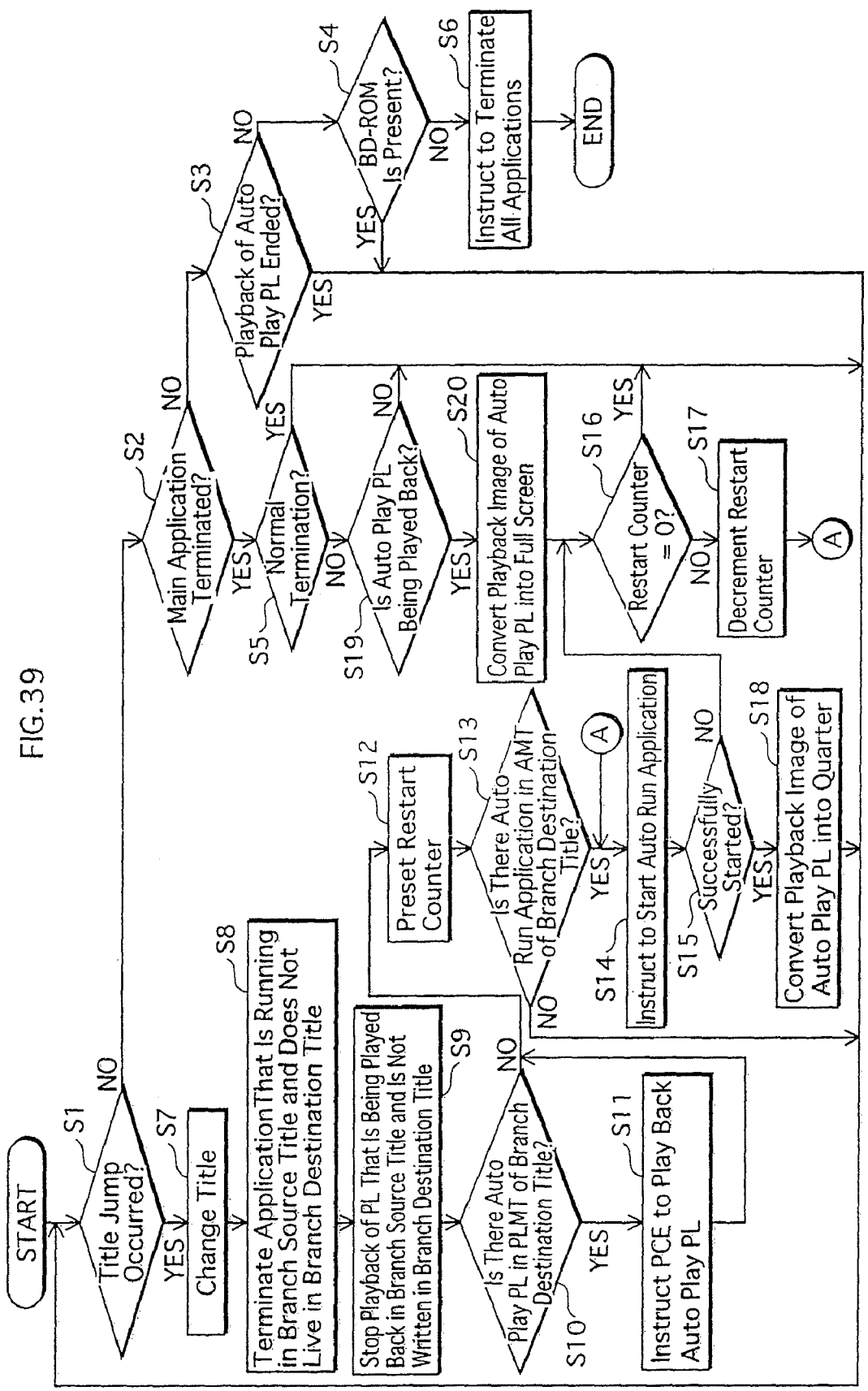
FIG. 39 is a flowchart showing procedures of the application manager 36.

FIG. 39 is a flowchart showing procedures of the application manager 36. The procedures shown in FIG. 39 include a main loop that is composed of steps S1, S2, S3, and S4. In step S1, it is judged whether or not a Title jump occurred. If it is judged that a Title jump occurred, the application manager 36 changes the Titles (step S7), refers to the application management table for the branch destination Title, and terminates an application that is run in the branch source Title and does not live in the branch destination Title (step S8). The application manager 36 then refers to the PlayList management table for the branch destination Title, and terminates a PlayList that is being played back in the branch source Title and does not live in the branch destination Title (step S9).

The application manager 36 then instructs the PLMT processor 41 to judge whether or not there is a PL that is not played back in the branch source Title and has the attribute AutoPlay in the branch destination Title (step S10). If it judges that there is such a PL, the PLMT processor 41 instructs the playback control engine 32 to play back the AutoPlay PL (step S11). If there is no such PL, no AutoPlay PL is played back.

A succeeding procedure composed of steps S12 to S18 achieves an activation of an application that has the life cycle in the branch destination Title. In this procedure, the application manager 36 instructs to start an AutoRun application (step S14), and if the AutoRun application is successfully started (YES in step S15), converts the playback image of AutoPlay Pl into quarter (¼) (step S18).

If it is judged as NO in step S15, a loop composed of steps S14 to S17 is executed. The control variable in this loop process is a restart counter. The restart counter is a counter that defines the number of restarts of an application. The restart counter is reset in step S12, and it is judged in step S16 whether or not the restart counter is 0. If it is judged in step S16 that the restart counter is not 0, the restart counter is decremented in step S17. The AutoRun application is repeatedly started in the loop process composed of steps S14 to S17 in so far as the restart counter is not 0. Such a repetition assures the activation of the application.

In step S2, it is judged whether or not a main application is terminated. If it is judged that the main application is terminated, the control moves to step S5 to judge whether or not the main application has terminated normally. If it is judged that the main application has terminated abnormally, steps S19 and S20 are executed. If it is judged that the main application has terminated normally, the control returns to the main loop composed of steps S1 to S4, not executing steps S19 and S20.

In step S19, it is judged whether or not an AutoPlay PL is being played back. If it is judged that an AutoPlay PL is being played back, the application manager 36 instructs the playback control engine 32 to convert the playback image of AutoPlay Pl into full-screen (step S20). Then the control moves to step S16. With this movement of the control to step S16, the loop process composed of steps S14 to S17 is executed even if the application has terminated abnormally. This enables the application to be repeatedly started until the restart counter that is set in step S12 becomes 0.

In step S4, it is judged whether or not a BD-ROM is present in the BD drive 1. If no BD-ROM is present, the application manager 36 instructs to terminate all the applications (step S6).

Figure 40:
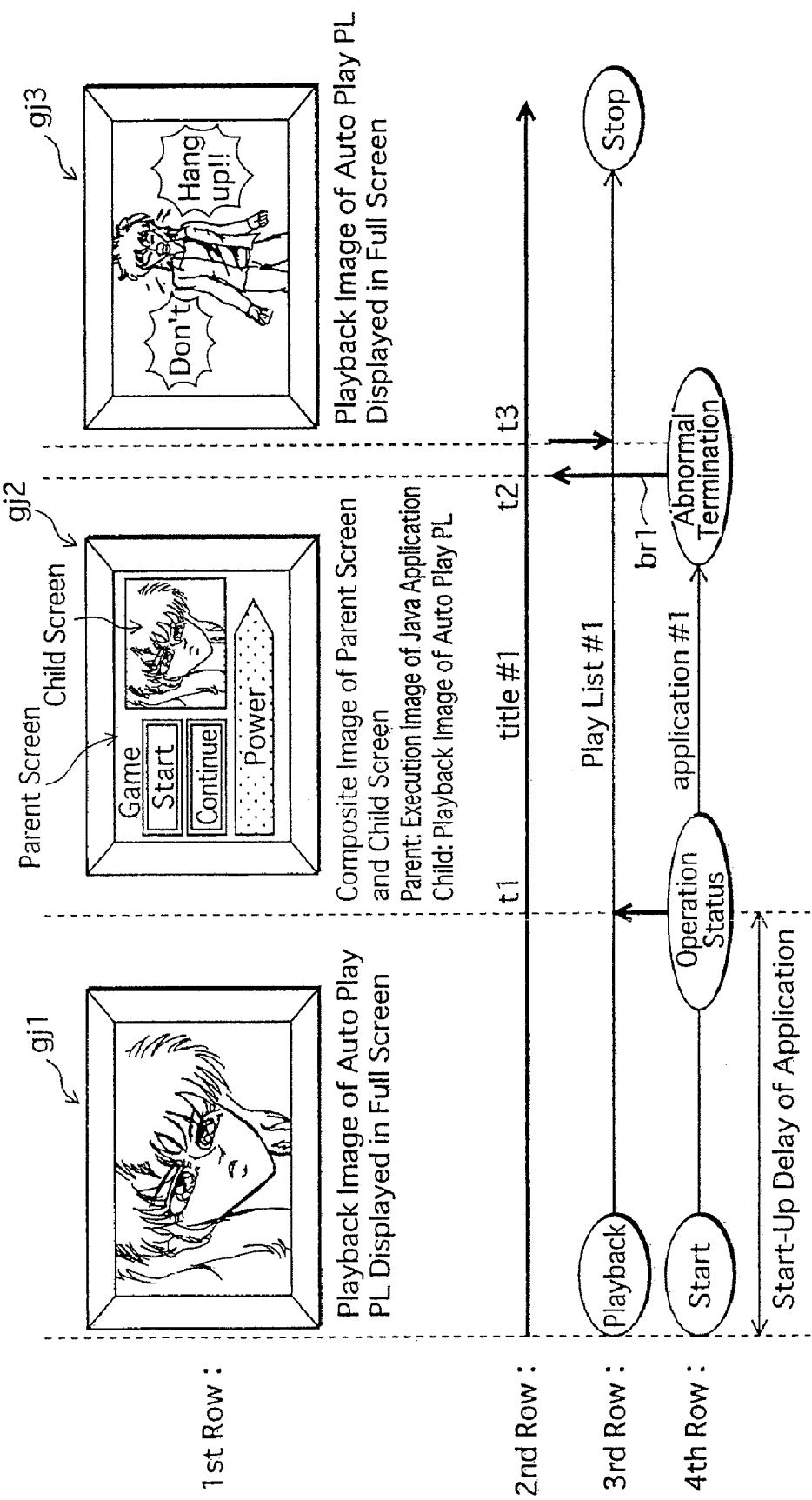
FIG. 40 shows specific examples of the PlayList management table and the application management table.

FIG. 40 shows specific examples of the PlayList management table and the application management table. In FIG. 40, the first row shows playback images of a Title, the second row shows the time axis of the Title, the third row shows the progress of playback of a PL, and the fourth row shows the execution of an application. The fourth row indicates that the application #1 is started at the start of the Title, and then gets into the operation status at time t1. On the other hand, PlayList #1 starts to be played back at the start of the Title. As a result, as shown on the left-hand side of the first row, a playback image gj1 of PlayList #1 is displayed with a full-screen image during the start-up delay of the application, namely during a period between immediately after the start of the Title and immediately before the application gets into the operation status. When the application #1 gets into the operation status at time t1, a composite image gj2 is displayed, where the composite image gj2 is composed of: the playback image of the PL as a child screen; and the execution image of the application as a parent screen. The execution image of the application in this example is a screen for a game in which a Start button, a Continue button, and a Power indicator are arranged. And the execution image of the application is displayed as a Java™ application executes a process of drawing an image on the interactive graphics plane 12. To execute the process of drawing, the Java™ application requires a library for drawing graphics and character. Thereafter, the parent-child screen is displayed in so far as the execution of the application and the playback of the PL are performed at the same time.

In this example, the application #1 then terminates abnormally, and the application manager 36 detects this abnormal termination at time t2. The arrow br1 symbolically indicates the detection. When this happens, the application manager 36 converts the playback image of the PL into full-screen in step S20. In FIG. 40, this conversion into full-screen is performed at time t3. As shown on the right-hand side of the first row, a playback image gj3 is displayed with a full-screen image.

As described above, according to the present embodiment, with the arrangement of setting the playback attribute to AutoPlay in the PlayList management table, even if it takes 5 to 10 seconds for a started Java™ application to get into the operation status, something is displayed on the screen during the start-up. This status, in which "something is displayed on the screen", alleviates the start-up delay that occurs when a Title is started to be executed.

Also, if an application start-up failure occurs, or if an application terminates abnormally, the playback of a PlayList that is defined in the PlayList management table is continued, which provides the status in which "something is displayed on the screen". With such an arrangement, the worst case scenario that the apparatus blacks out can be avoided. This gives a minimum sense of assurance to the maker of the apparatus.

Embodiment 2

Embodiment 2 relates to an improvement in which the recovery process for an error termination is defined during the authoring. To define such a recovery process, in the recording medium of the present embodiment, an error management table is provided in one BD-J. Object. FIG. 41A shows the internal structure of the BD-J. Object. As shown in FIG. 41A, the BD-J Object contains an error management table (Error Management Table[bobj_id]) in addition to the application and PlayList management tables. FIG. 41B shows the internal structure of the error management table. As shown in FIG. 41B, the error management table is composed of as many pieces of recovery information (recovery( )) as indicated by Number_of_recovery. The lead line "em1" in FIG. 41B indicates a closeup of the internal structure of a given piece of recovery information that is identified by an identifier "recovery_id". The given piece of recovery information indicated by the lead line "em1" is composed of: a reference value "Apli_i-d_ref" that identifies uniquely an identifier of an application that corresponds to the piece of recovery information; and five flags "Restart_Application_flag", "Continuous_Playback_flag", "Select_Title_flag", "Notify_Event_flag", and "Reboot_flag". FIG. 42 shows the meaning of the five flags. The following describes the meaning of the five flags in the error management table.

The "Restart_Application_flag", when set to "0", indicates that the application is not restarted when it terminates abnormally, and when set to an integer "n" other than "0", indicates that the restart is repeated n times. The default value of this flag is "0".

The "Continuous_Playback_flag", when set to "0", indicates that a playback of a PlayList is not continued when the application terminates abnormally, and when set to an integer "1", indicates that a playback of a PlayList is continued when the application terminates abnormally, and when set to an integer "2", indicates that a playback of a PlayList is continued with a full-screen image at a normal speed when the application terminates abnormally. The default value of this flag is "0".

The "Select_Title_flag", when set to "0", indicates that no branch between Titles is performed when the application terminates abnormally, and when set to an integer "n" other than "0", indicates that the current Title jumps to a Title identified by "n" as the Title number. The default value of this flag is "0".

The "Notify_Event_flag", when set to "0", indicates that no event is output when the application terminates abnormally, and when set to an integer "n" other than "0', indicates that an event with an event number "n" is output. The default value of this flag is "1".

The Reboot_flag", when set to "0", indicates that a bootstrap of the playback apparatus is not performed when the application terminates abnormally, and when set to an integer "1", indicates that a bootstrap of the playback apparatus is performed.

Figure 43A:
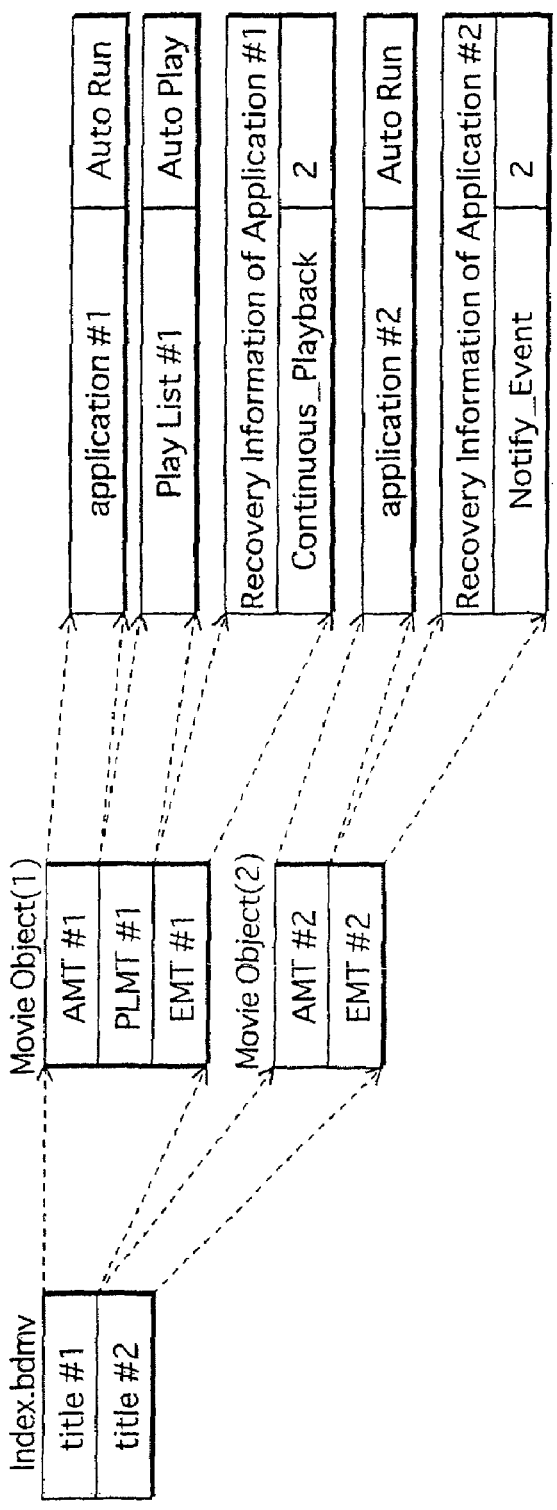
FIG. 43A shows two Titles (Title #1, Title #2) in which the error management table is written.

It is possible to define, by the above-described flags during the authoring in advance, the recovery process that is to be executed when an application terminates abnormally. Now, a specific example of the description of the error management table will be provided. FIG. 43A shows two Titles (Title #1, Title #2) in which the error management table is written. In the application management table for Title #1, application #1 is written as an AutoRun application. And in the error management table for Title #1, a piece of recovery information, which is used when the application #1 terminates abnormally, is written. In the PlayList management table for Title #1, PlayList #1 is written as an AutoPlay PlayList.

In the application management table for Title #2, application #2 is written as an AutoRun application. And in the error management table for Title #2, a piece of recovery information for the application #2 is written.

Figure 43B:
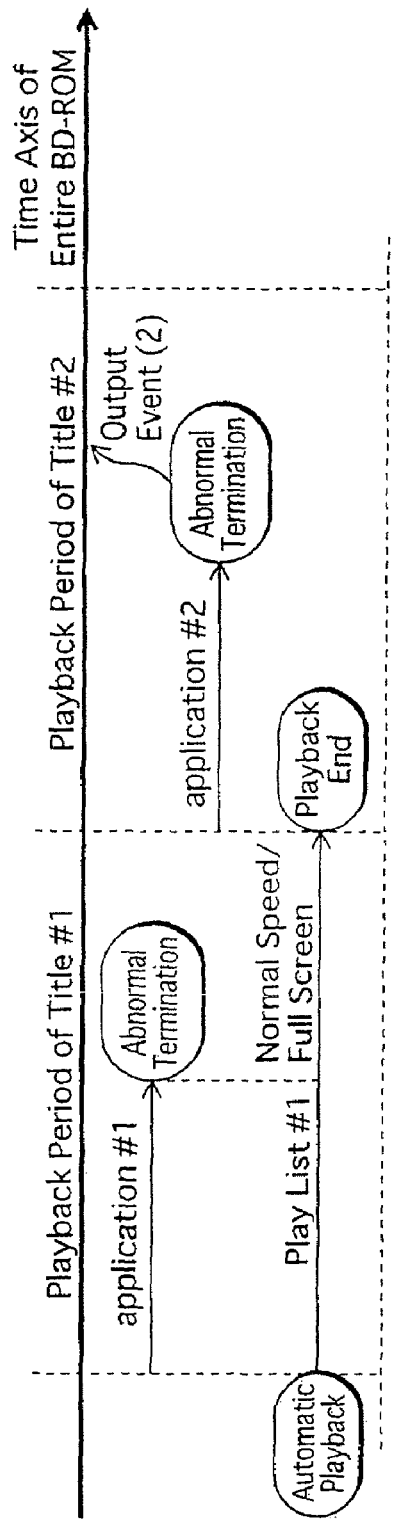
FIG. 43B shows the progress of an execution of an application and a playback of a PlayList that are performed in accordance with the application and error management tables shown in FIG. 43A.

FIG. 43B shows the progress of an execution of an application and a playback of a PlayList that are performed in accordance with the application and error management tables shown in FIG. 43A. Since the recovery information of the application #1 indicates Continuous_Playback_Flag=2, the playback of a PlayList is continued with a full-screen image at a normal speed when the application #1 terminates abnormally.

On the other hand, the recovery information of the application #2 indicates Notify_Event_Flag=2, an event with number "2" is output when the application #2 terminates abnormally.

With such description of the recovery information, the process that is performed when an application terminates abnormally can be defined for each Title and for each application.

Figure 44:
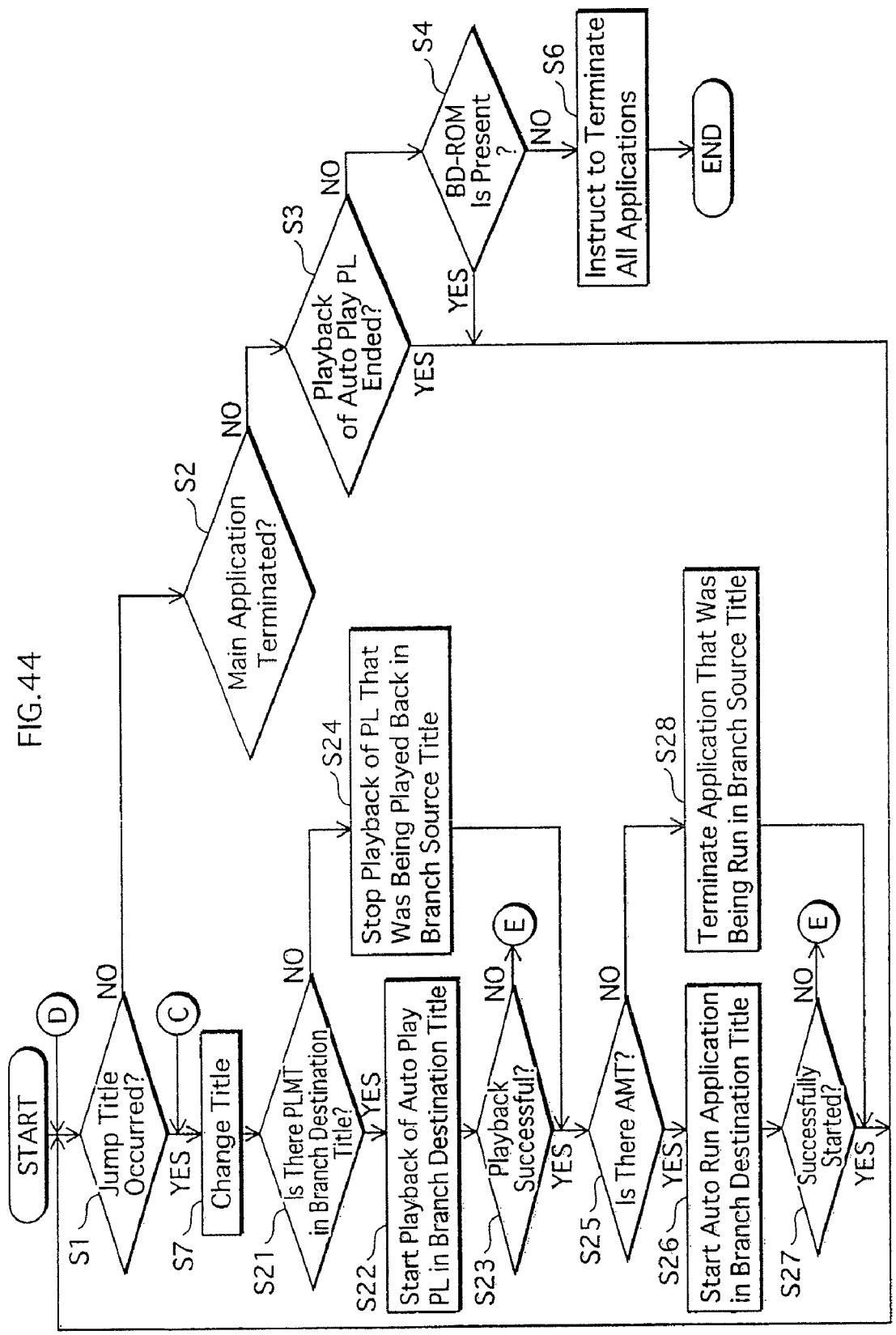
FIG. 44 is a flowchart that shows the procedures of the application manager 36 in Embodiment 2.
Figure 45:
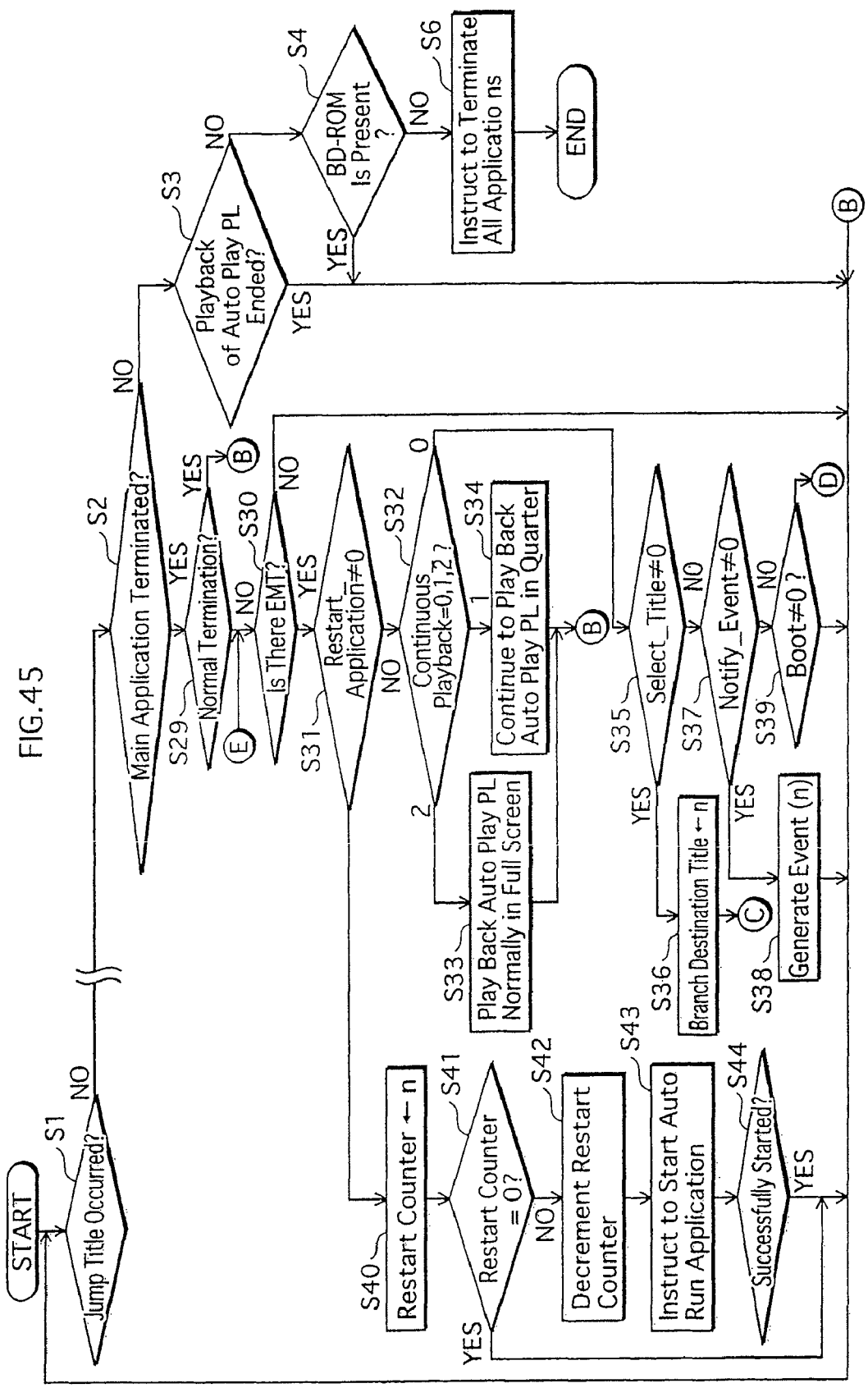
FIG. 45 is a flowchart that shows the procedures of the application manager 36 in Embodiment 2.

With the addition of the error management table to the BD-J Object, the application manager 36 of the present embodiment performs the processes in accordance with the flowcharts shown in FIGS. 44 and 45. FIG. 44 is a flowchart that shows the procedures of the application manager 36 in Embodiment 2. This flowchart includes, as is the case with FIG. 39, a main loop that is composed of steps S1, S2, S3, and S4. When a Title is selected in the main loop, the processes of the steps S21 to S27 are performed.

In step S21, the application manager 36 causes the PLMT Processor 41 to judge whether or not there is the PlayList management table in the branch destination Title. If there is the PlayList management table in the branch destination Title, the application manager 36 causes the playback control engine 32 to start a playback of a PL that is not played back in the branch source Title and has the AutoPlay attribute in the branch destination Title (step S22), and then judges whether or not the playback is successful (step S23). If it is judged that the playback is successful in step s23, the processes of steps S25 to S28 are performed. If it is judged that the playback is not successful in step s23, the control moves to the flowchart shown in FIG. 45.

If there is no PlayList management table in the branch destination Title, the application manager 36 causes the playback control engine 32 to stop a playback of a PL that is being performed in the branch source Title (step S24), and performs the processes of steps S25 to S28.

In step S25, it is judged whether or not there is the application management table in the branch destination Title. If there is the application management table in the branch destination Title, the application manager 36 starts an AutoRun application in the branch destination Title (step S26), and in step S27, judges whether or not the application was successfully started. If it is judged that the application was successfully started in step s27, the control returns to the loop composed of steps S1 to S4. If it is judged that the application was not successfully started in step s27, the control moves to the flowchart shown in FIG. 45.

The flowchart of FIG. 45 shows the procedure that is performed when an application terminates abnormally. In step S30, it is judged whether or not there is the error management table in the Title to which the application that has terminated abnormally belongs. If it is judged that there is no error management table in the Title in step S30, the control returns to the loop composed of steps S1 to S4.

If it is judged that there is the error management table in the Title in step S30, the control moves to step S44 and then returns to the loop composed of steps S1 to S4. In step S31, it is judged whether the Restart_Application_flag in the error management table is not "0". If it is judged that the Restart_Application_flag in the error management table is not "0", a loop process composed of steps S40 to S44 is executed. In this loop process, the restart counter is set to a value "n" written in the Restart_Application_flag (step S40), and then the loop process composed of steps S41 to S44 is executed. The control variable in this loop process is the restart counter. When the restart counter becomes "0" (YES in step S41) of when the application is started successfully (YES in step S44), this loop process ends. In this loop process, the restart counter is repeatedly decremented (step S42) and the AutoRun application is repeatedly started in so far as it is judged as No in step S41 or S44. Through this repetition, the application that terminated abnormally is restarted. If it is judged that the Restart_Application_flag is "0", step S32 is executed.

In step S32, it is judged whether the Continuous_Playback_ flag is "0", "1", or "2". If it is judged that the Continuous_Playback_flag is "2", the playback image of the AutoPlay PL is displayed in full screen (step S33), and the control returns to the main loop composed of steps S1 to S4.

If it is judged that the Continuous_Playback_flag is "1", the playback image of the AutoPlay PL is continued in quarter (step S34), and the control returns to the main loop composed of steps S1 to S4.

If it is judged that the Continuous_Playback_flag is "0", the control moves to step S35.

In step S35, it is judged whether the select_title_flag in the error management table is not "0". If it is judged that the select_title_flag is "0", the control moves to step S37. If it is judged that the select_title_flag is not "0", the branch destination Title is set to a value "n" written in the select_title_flag (step S36), and the control moves to step S7 shown in FIG. 44.

In step S37, it is judged whether the Notify_Event_flag in the error management table is not "0". If it is judged that the Notify_Event_flag is "0", the control moves to step S39. If it is judged that the Notify_Event_flag is not "0", an event "n" that is identified by the value "n" of the Notify_Event_flag is generated (step S38), and the control moves to the main loop composed of steps S1 to S4 shown in FIG. 44. In step S39, it is judged whether the Boot_flag in the error management table is not "0". If it is judged that the Boot_flag is "0", the control moves to the main loop composed of steps S1 to S4. If it is judged that the Boot_flag is not "0", the control moves to the start of FIG. 44 and the bootstrap of the playback apparatus is executed.

As described above, according to the present embodiment, it is possible for a person in charge of authoring, not a manufacturer of the apparatus, to define how the playback apparatus should perform when an application terminates abnormally.

It should be noted here that a program, which performs a recovery process when an application terminates abnormally during a playback of a Title that does not have the error management table, may be embedded into the playback apparatus.

Also, an argument that specifies any of Restart_Application_Flag to Reboot_Flag may be provided in the Title Jump API so that the application manager 36 can execute a recovery process that corresponds to the argument provided in the Title Jump API.

Embodiment 3

It is described in Embodiment 1 that the PlayList management table in the BD-J Object can be used to define the playback of a PL in the Java™ virtual machine. The present embodiment centers on the playback of a PL by the JMF method for application. A problem with this is the PlayList management table. That is to say, since whether or not a PL can be played back is described in the PlayList management table, a PL may be playable in some Titles, but not in other Titles. Also, there is a case where a playback of a PL, which is defined to be playable, from a certain type of application is desired to be prohibited from the viewpoint of the copyright protection. To achieve such restrictions on the playback of PLs, in Embodiment 3, the permission controller 42 and the application manager 36 perform the following processes.

If an application request a playback of a PL, the permission controller 42 performs a mutual authentication with the application, and judges whether or not the application that requested the playback of the PL is authorized to play back the PL. If the application is authorized to play back the PL, the permission controller 42 requests the playback control engine 32 to play back the PL. If the application is not authorized to playback the PL, the permission controller 42 outputs a response event that indicates that the request is not permitted to the application that requested the playback of the PL. With such judgment by the permission controller 42 on whether or not the request from the application can be permitted, if a PL that is distributed by a distributor is requested to be played back from an application that is distributed by another distributor, the request can be rejected. This enables a PL from being played back by a not-authorized application. The judgment by the permission controller 42 is based on the combinations of PLs to be permitted and applications and the combinations of PLs not to be permitted and applications, the combinations being defined in the Permission file that is recorded in the BD-ROM. Description of details of such a file is omitted here since it diverges away from the subject of the present application.

Figure 46:
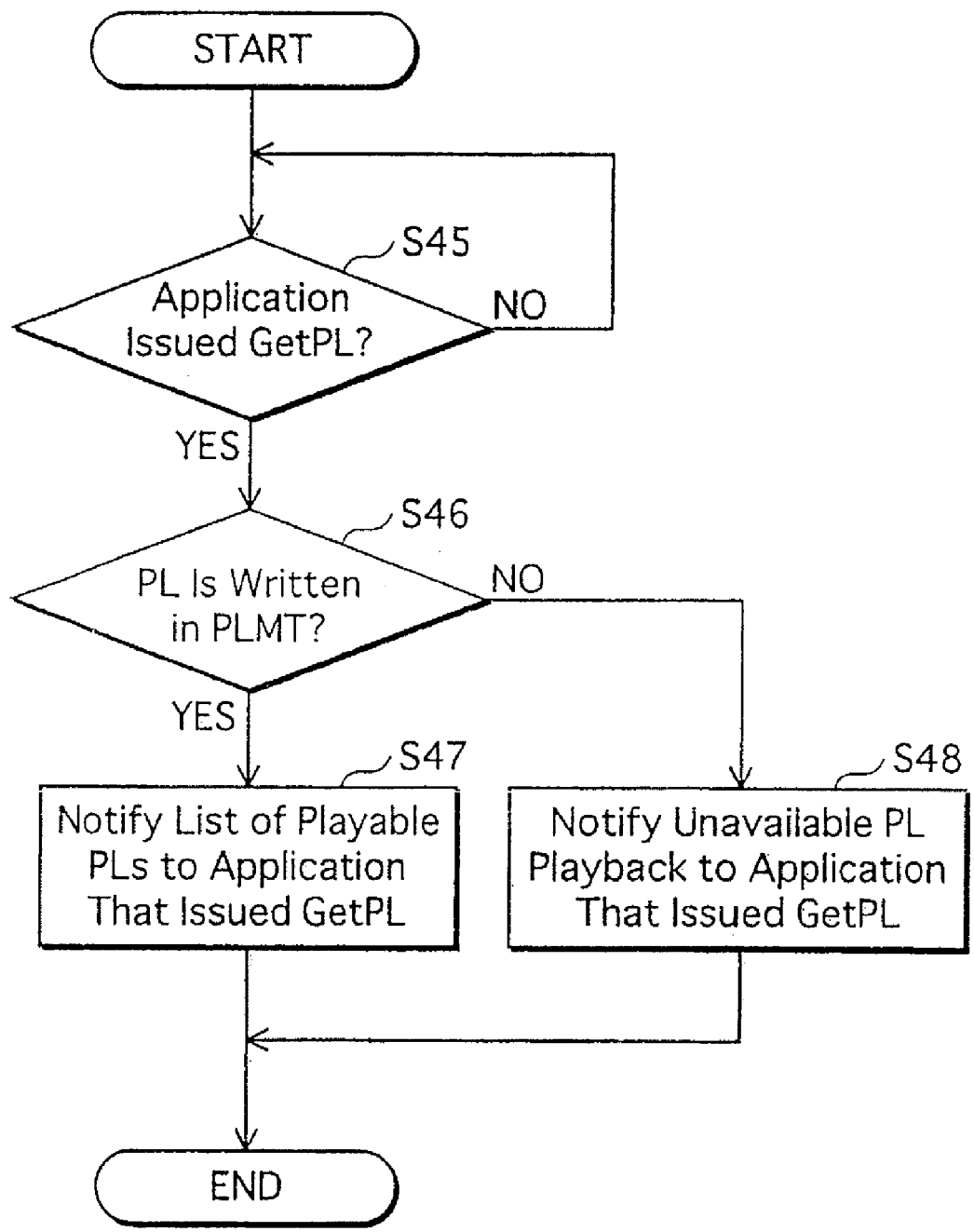
FIG. 46 is a flowchart that shows the procedures of the notification by the application manager 36.

In Embodiment 3, the application manager 36 notifies a PL that can be played back at the current playback point in time, in response to a request from an application. FIG. 46 is a flowchart that shows the procedures of the notification by the application manager 36. In this flowchart, it is monitored whether or not an application issued a request (Get PL) to notify a playable PL during the start-up of the application (step S45). If it is judged that the application issued such a request, it is judged whether or not there is the PlayList management table in the BD-J Object that constitutes the Title to which the current playback point belongs (step S46). If it is judged that the application issued such a request, it is judged whether or not there is the PlayList management table in the BD-J Object that constitutes the Title to which the current playback point belongs (step S46). If a PL is written in the PlayList management table, the PL written in the PlayList management table is notified, as a playable PL, to the application that requested the playback (step S47).

If a PL is not written in the PlayList management table, a notification that the playback of the PL is unavailable is sent to the application that requested the playback (step S48). Up to now, the procedure performed by the application manager 36 in Embodiment 3 has been described.

The following describes the procedure performed by the application manager 36 when a playback of a PL is requested. The application manager 36 performs the processes in accordance with the flowchart shown in FIG. 47, in Embodiment 3.

Figure 47:
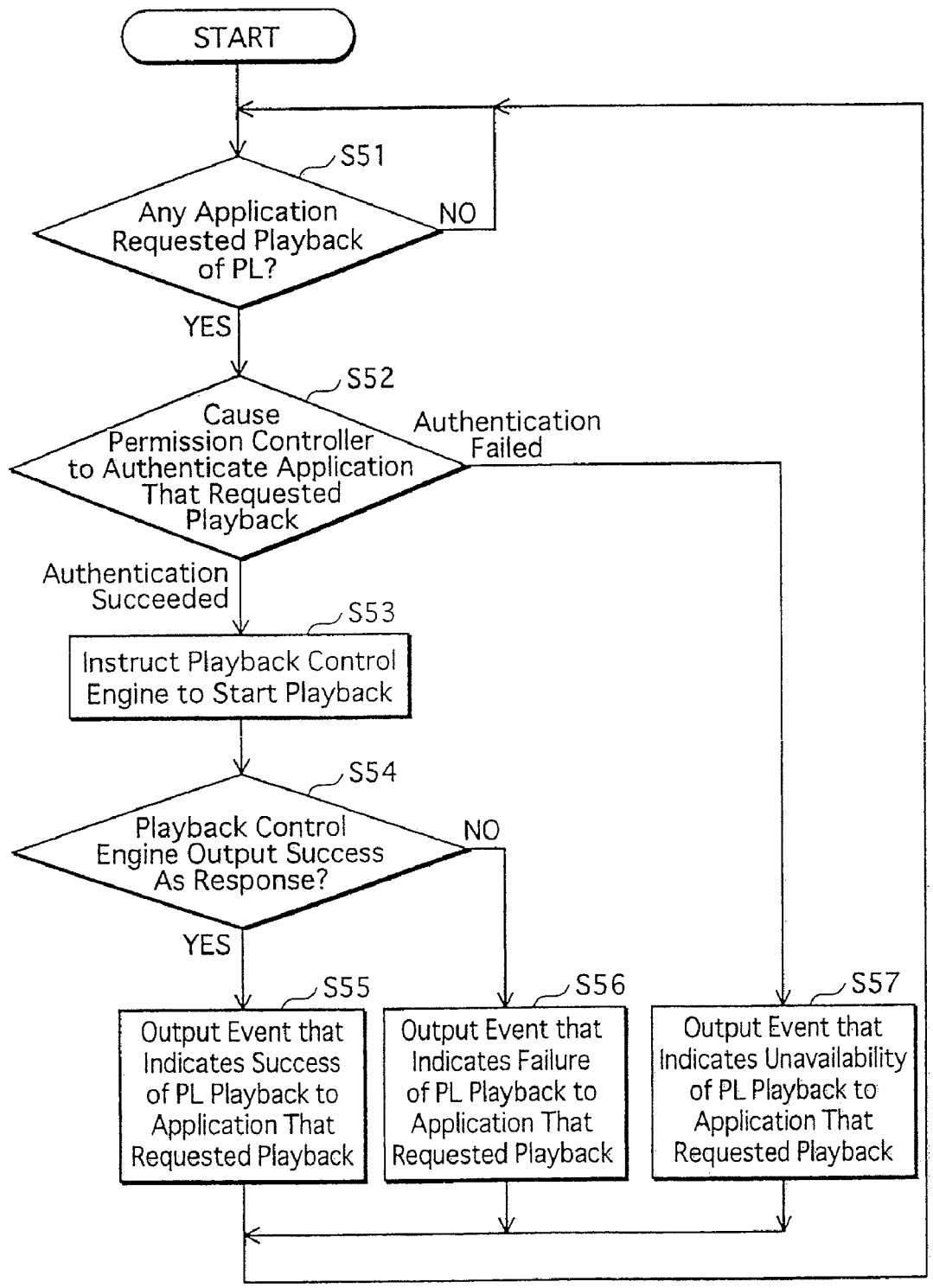
FIG. 47 is a flowchart that shows the procedures of the application manager 36 in Embodiment 3.

In FIG. 47, the application manager 36 judges whether or not there is an application that requested a playback of a PL (step S51). If any application requests a playback of a PL, the application manager 36 causes the permission controller 42 to perform an authentication to judge whether the application that requested the playback is authorized to play back the PL (step S52). If the application is authorized to play back the PL, the application manager 36 instructs the playback control engine 32 to start the playback (step S53), and waits for a response from the playback control engine 32 that indicates a success (step S54).

Upon receiving such a playback request, the playback control engine 32 checks the authenticity of the PlayList information. The check includes: a check on whether the BD-ROM and the local storage 18 in which the PlayList information, Clip information, and AVClips are stored constitute a proper PlayList; and the Clip information and an AvClip that are specified by the clip_Information_file_name in the PlayList information are stored in the BD-ROM and the local storage 18. In the case where a proper file is not referred to by the clip_Information_file_name or in the case where there is a contradiction in a virtual package that is composed of the BD-ROM and the local storage 18, and a proper PlayList cannot be constructed, the playback control engine 32 returns a response that indicates "false".

If a response "success" is returned after the above-described procedure, an event that indicates the success of the playback of the PL is output to the application that requested the playback (step S55). If a response "success" is not returned, an event that indicates the failure of the playback of the PL is output to the application that requested the playback (step S56). On the other hand, if it is judged in step S52 that the application that requested the playback is not authorized to play back the PL, an event that indicates the unavailability of the playback of the PL is output to the application that requested the playback (step S57).

As described above, the present embodiment enables a playback of a PlayList to be performed properly in response to a request from an application if whether or not a PlayList can be played back is defined differently for each Title, and if some applications have authority to playback a PlayList and others do not have the authority. This enables a variety of contents representation to be provided by combining the execution of the application and the playback of the PlayList.

Embodiment 4

It is described in Embodiment 1 that it is possible to instruct the playback apparatus to play back an AutoPlay PL at the start of a Title, by attaching a playback attribute "AutoPlay" to a PlayList desired to be played back. In contrast, the present embodiment relates to an improvement in which an unboundary application is recorded in the BD-ROM, and at the start of Title, the unboundary application is caused to select a Title to be automatically started.

Unboundary applications are applications that are on an equality with the resident applications, such as the playback control engine 32, in the playback apparatus, and execute, in response to a request from the playback control engine 32, a process of selecting a piece of PlayList information that matches the PSR set value on the playback apparatus side, from a plurality of pieces of PlayList information written in the PlayList management table, and notifying the selected piece of PlayList information.

To cause an unboundary application to select a PL, all the playback attributes in the PlayList management table are set to "no specification" in regards with a Title that requires such a selection. This is because "All attributes no specification" is used as a trigger to let the playback control engine 32 to request the unboundary application to select a PL.

The selection by the unboundary application is based on the selection algorithm that is defined during the authoring. FIGS. 48A to 48C show, in the form of table, the contents of the selection algorithm that is embedded in the unboundary application. The tables indicate the ranges of the PSR value in correspondence with PLs that are to be played back when the PSR takes the values. Of these, FIG. 48A shows the contents of the selection algorithm based on the parental level. The parental level is set to PSR(13) in the playback apparatus. More specifically, an integer that indicates the age of the user is set in the PSR(13), and the playback apparatus regards the integer as the parental level. In FIG. 48A, the values that the PSR(13) can take are divided into three ranges: under 14; 14 and above and under 18; and 18 and above. Also, a PlayList to be played back is indicated for each of these ranges. Accordingly, based on such a selection algorithm, the unboundary application selects PlayList #1 if the PSR set value is under 14, selects PlayList #2 if the PSR set value is 14 and above and under 18, and selects PlayList #3 if the PSR set value is 18 and above.

FIG. 48B shows the contents of the selection algorithm based on Language for Audio. The Language for Audio is set to PSR(16) in the playback apparatus. More specifically, an integer is set in the PSR(16), and the playback apparatus regards the integer that specifies a language for audio playback. In FIG. 48B, the values that the PSR(16) can take are divided into three ranges: English; Japanese; and others. Also, a PlayList to be played back is indicated for each of these ranges. Accordingly, based on such a selection algorithm, the unboundary application selects PlayList #1 if the PSR(16) set value indicates English, selects PlayList #2 if the PSR(16) set value indicates Japanese, and selects PlayList #3 if the PSR (16) set value indicates a language other than English and Japanese.

FIG. 48C shows the contents of the selection algorithm based on Player Configuration for Video. The Player Configuration for Video is set to PSR(14) in the playback apparatus. More specifically, an integer is set in the PSR(14), and the playback apparatus regards the integer that specifies an environment for video playback. In FIG. 48C, the values that the PSR(14) can take are divided into three ranges: resolution 525×600 TVsystem LetterBox; resolution 525×600 TVsystem; and resolution 1920×1080 TV system. Also, a PlayList to be played back is indicated for each of these ranges. Accordingly, based on such a selection algorithm, the unboundary application selects PlayList #1 if the PSR(14) set value indicates resolution 525×600 Tvsystem LetterBox, selects PlayList #2 if the PSR(14) set value indicates resolution 525×600 TVsystem, and selects PlayList #3 if the PSR (14) set value indicates resolution 1920×1080 TVsystem. The selection algorithms such as those shown in FIGS. 48A to 48C can be created by describing conditional branches as shown in FIGS. 48A to 48C in a computer description language.

Up to now, an improvement on a recording medium in the present embodiment has been described. The following describes an improvement on a playback apparatus in the present embodiment. This improvement is mainly composed of improvement on the application manager 36 and the playback control engine 32.

Upon an occurrence of a branch between Titles, the application manager 36 refers to the PlayList management table and judges whether or not there is an AutoPlay PL in the PlayList management table. If there is no AutoPlay PL, the application manager 36 transfers the PlayList management table to the playback control engine 32, and requests the playback control engine 32 to automatically play back a PL that is written in the PlayList management table.

The playback control engine 32, upon receiving the PlayList management table, requests the unboundary application to select PLs. Upon receiving from the unboundary application a list of playable PLs that is sent in response to the request, the playback control engine 32 judges whether or not there is a PL among those in the list that is written in the PlayList management table transferred from the PlayItem. And if there is a PL, among those selected by the unboundary application, that is written in the PlayList management table, the playback control engine 32 automatically plays back the PL.

Figure 49:
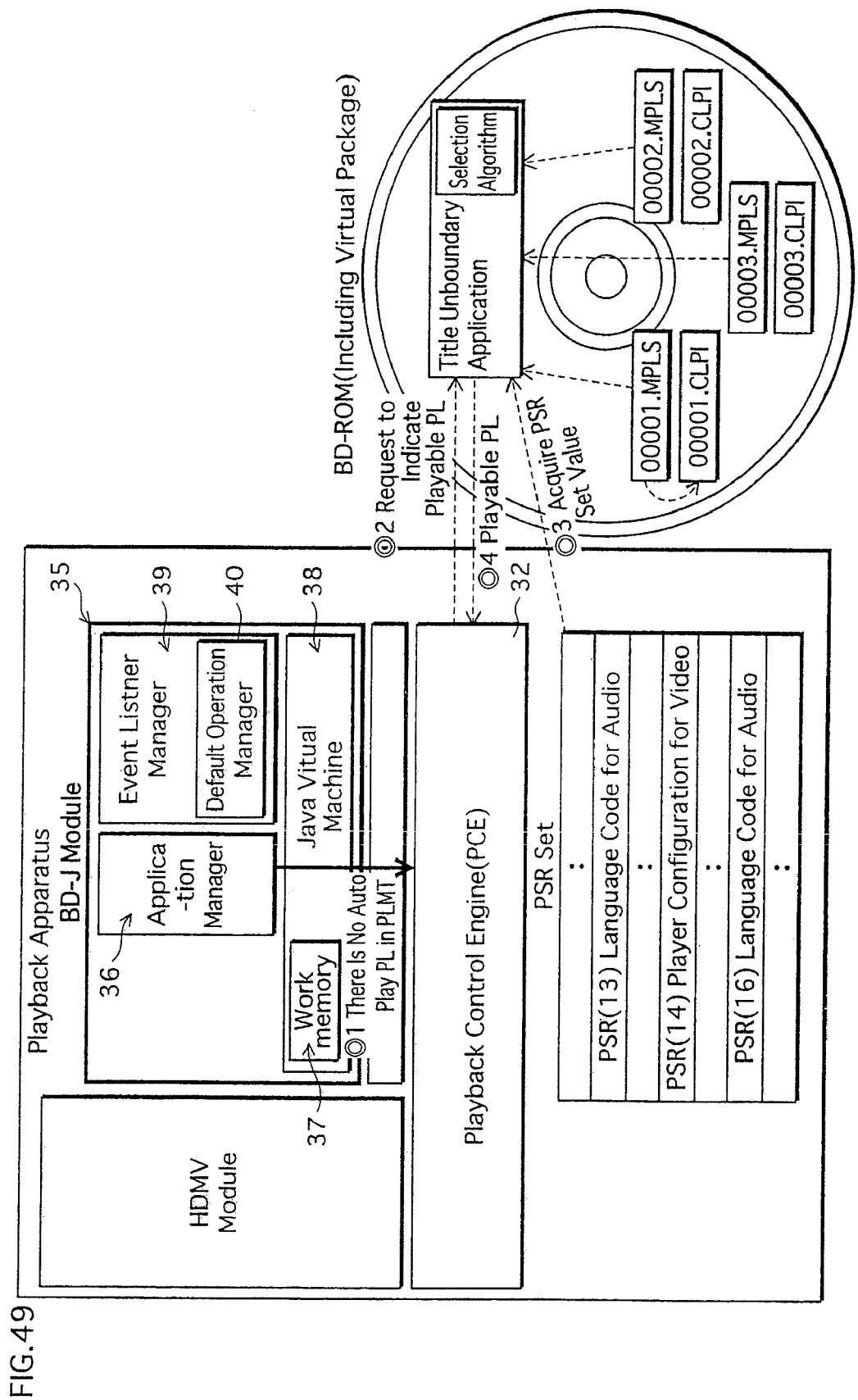
FIG. 49 is an illustration of the process in which the Title unboundary application selects PLs.

FIG. 49 is an illustration of the process in which the Title unboundary application selects PLs. On the left-hand side of FIG. 49, the layer structure of software in the playback apparatus is shown. On the right-hand side of FIG. 49, the contents of the BD-ROM are shown. In FIG. 49, the signs ⊙1, ⊙2, ⊙3, ⊙4 represent the following: a notification from the application manager 36 that there is no AutoPlay in the PlayList management table (⊙1); a request by the playback control engine 32 to indicate playable PLs (⊙2); acquisition of PSR set values by the Title unboundary application (⊙3); and notification of playable PLs from the Title unboundary application to the playback control engine 32 (⊙4).

It should be noted here that in FIG. 49, the Title unboundary application is written on the BD-ROM for the sake of convenience. Since the Title unboundary application is a Java™ application, the description that is closer to reality would be that the Title unboundary application is executed as an instance by the threads 55 in the work memory 54 in the Java™ virtual machine 38.

According to the present embodiment as described above, such an application that lives at a boundary between Titles is caused to make the above-described judgment. This enables the playback control engine 32 in the playback apparatus to recognize, at an early stage after a Title is started, a PL that satisfies conditions set in the playback apparatus, among a plurality of PLs recorded on the BD-ROM. This makes it possible to determine a PL that is to be played back at the start of the Title, even without determining an application having the playback attribute "AutoPlay" in advance. It is possible to achieve, even in the BD-J mode, playback controls such as the language credit and the parental lock.

It should be noted here that although in the present embodiment, the selection algorithms correlate PSR values with PlayLists, a PlayList that is to be played back when a PSR set value in the playback apparatus is beyond the scope of assumption may be defined in advance.

Embodiment 5

In Embodiment 4, the Title unboundary application has a selection algorithm for selecting a PL to be played back in accordance with a PSR set value. The present embodiment relates to an improvement in which when a PL has a multi-angle period, the Title unboundary application is caused to select an angle among a plurality of angles that are available in the multi-angle period. The Title unboundary application in the present embodiment correlates a plurality of ranges of PSR values with angles to be played back. In the present embodiment, when the current playback point in time is in a multi-angle period, the playback control engine 32 requests the Title unboundary application to select an angle to be played back. Upon receiving such a request, the Title unboundary application acquires a PSR value that is currently set, executes a selection algorithm, and selects an angle that corresponds to the acquired set value. The Title unboundary application notifies the playback control engine 32 of the result of the selection, so that the playback control engine 32 plays back the selected angle.

As described above, according to the present embodiment, it is possible for a person in charge of authoring to define an algorithm that is used to select an angle in correspondence with a PSR value. This enables the person in charge of authoring to create various applications using the angles.

Embodiment 6

Embodiment 6 relates to an improvement on the achievement of a synchronization with the playback of a PL in the BD-J mode. The playback control engine 32, when the PlayPLAPI function is called, executes the procedure based on the PL information. If the PL has a playback period of two hours, the above-described procedure is continued for these two hours. A problem with this is a gap between the time at which the Java™ virtual machine 38 returns a response "success" and the time at which the playback control engine 32 actually ends the process. The Java™ virtual machine 38, which mainly performs event-driven processes, returns a response that indicates a success or failure, immediately after a call. However, since the playback control engine 32 actually ends the process after two hours, the end of the process cannot be confirmed by the response "success" that is returned immediately after a call. If a Fast Forward, Backward, or Skip is performed during the playback of a PL, the period changes from two hours to less than or more than two hours. When this happens, it becomes more difficult to recognize the end of the process.

The playback control engine 32 operates stand alone, independent of the applications. As a result, the application manager 36 cannot accurately determine the time at which a playback of a PL ends. For this reason, in the present embodiment, whether the application has terminated or not, in so far as there is a JMF player instance in the work memory, that is to say, in so far as the BD-J module 35 is authorized to control the presentation engine 31, a notify event from the playback control engine 32 is waited for. If a notify event is received from the playback control engine 32, it is determined that the Title has terminated, and the module manager 34 is instructed to branch to the next Title. With such an arrangement, the time at which the playback control engine 32 ends a playback of a PL is recognized as the time at which a Title terminates.

The following specifically describes the control procedures performed by the playback control engine 32 with reference to the flowcharts shown in FIGS. 50 to 54.

Figure 50:
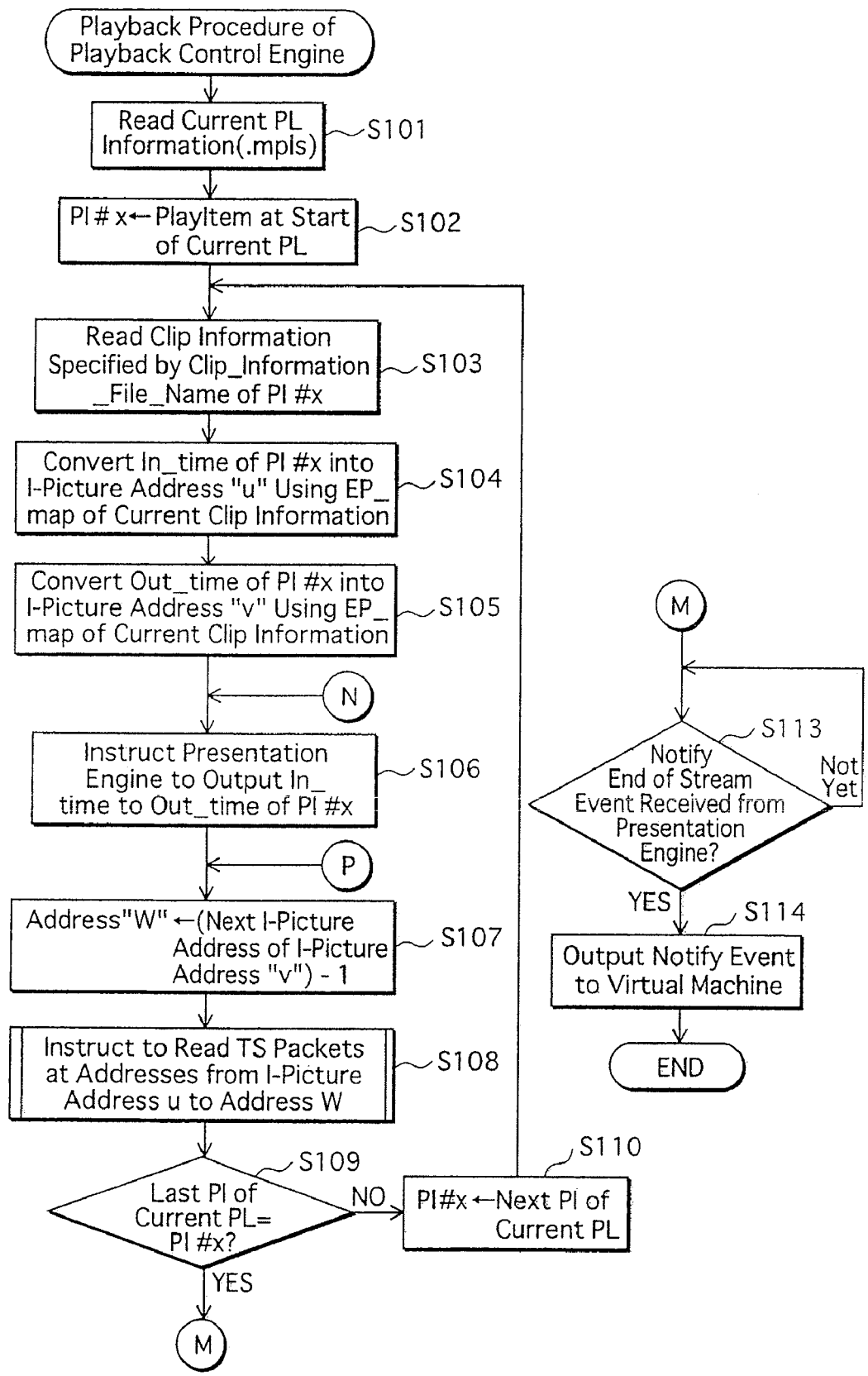
FIG. 50 is a flowchart showing the PL playback procedure performed by the playback control engine 32.

FIG. 50 is a flowchart showing the PL playback procedure performed by the playback control engine 32. The playback procedure mainly includes the control on the presentation engine 31 (step S106) and the control on the BD-ROM drive 1 or the local storage 18 (step S108). In this flowchart, the processing target PlayItem is indicated as PlayItem #x. In this flowchart, first the current PL information (.mpls) is read (step S101), and the processes of steps S102 to S110 are executed. The steps S102 to S110 constitute a loop process in which the processes of steps S103 to S110 are repeated for each piece of PI information constituting the current PL information until it is judged as YES in step S109. In the loop process, the processing target PlayItem is indicated as PlayItem #x (PI#x). The PlayItem #x is initialized when the PlayItem at the start of the current PL is set to the PlayItem #x (step S102). The condition for the above-mentioned loop process to end is that it is judged that the PlayItem #x is the last PlayItem in the current PL (step S109). If the PlayItem #x is not the last PlayItem in the current PL, the next PlayItem in the current PL is set to the PlayItem #x (step S110).

The steps S103 to S110 are repeatedly executed in the loop process as follows. The Clip information specified by the Clip_information_file_name of the PlayItem #x is read into the scenario memory 25 (step S103). The In_time of the PlayItem #x is converted into an I-Picture address "u" using the EPmap of the current Clip information (step S104). The Out_time of the PlayItem #x is converted into an I-Picture address "v" using the EPmap of the current Clip information (step S105). An address that is obtained by subtracting "1" from the next I-Picture address of the I-Picture address "v" is set to address "W" (step S107). The BD-ROM drive 1 or the local storage 18 is instructed to read TS packets from the locations at the I-Picture address "u" to the address "W" (step S108).

On the other hand, the presentation engine 31 is instructed to output data ranging from the mark_time_stamp of the current PLMark to the Out_time of the PlayItem #x (step S106). With the execution of the steps S105 to S108, a portion of AVClip that is specified by the PlayItem #x is played back.

After this, it is judged whether or not the PlayItem #x is the last PlayItem in the current PL (step S109).

If it is judged that the PlayItem #x is not the last PlayItem in the current PL, the next PlayItem in the current PL is set to the PlayItem #x (step S110), and the control returns to step S103. The above-described steps S103 to S110 are repeated to play back in sequence the PlayItems that constitute the PL.

Figure 51:
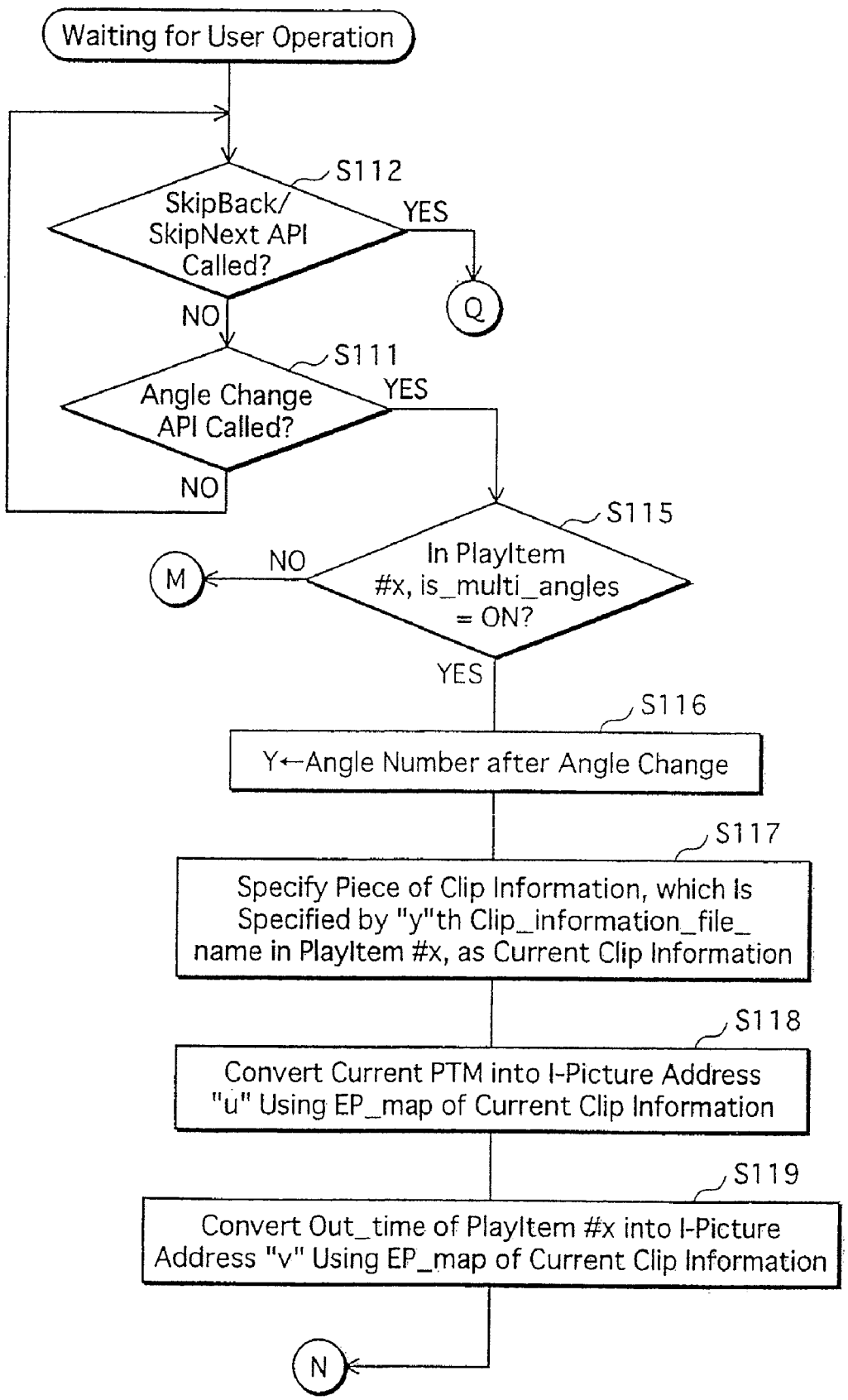
FIG. 51 is a flowchart showing the angle change procedure and the procedure for SkipBack/SkipNext.

FIG. 51 is a flowchart showing the angle change procedure and the procedure for SkipBack/SkipNext. This flowchart is executed in parallel with the process procedure shown in FIG. 50, and a loop process composed of steps S111 to S112 is repeated. In step S111 in this loop, it is judged whether or not an API that requests an angle change was called from the Java™ virtual machine 38. And if it is judged that an API requesting an angle change was called, the current Clip information is changed to another.

In step S115 of FIG. 51, it is judged whether or not the is_multi_angles of the PlayItem #x is ON. The is_multi_angles is a flag indicating whether or not the PlayItem #x is ready for the multi-angle. If it is judged as NO in step S115, the control moves to step S113. If it is judged as YES in step S115, steps S116 to S119 are executed. The steps S116 to S119 are executed as follows. The angle number after the angle change is substituted into a variable "y" (step S116). A piece of Clip Information, which is specified by "y"th Clip_information_file_name in the PlayItem #x, is read into the scenario memory 21 (step S117). The current PTM is converted into an I-Picture address "u" using the EP_map of the current Clip information (step S118). The Out_time of the PlayItem #x is converted into an I-Picture address "v" using the EP_map of the current Clip information (step S119). After the I-Picture addresses "u" and "v" are changed as described above, the process shown in FIG. 50 that is executed simultaneously with the present process is stopped, and then the control moves to step S106. With the move to step S106, TS packets are read from another AVClip, and the video contents are changed.

Figure 52:
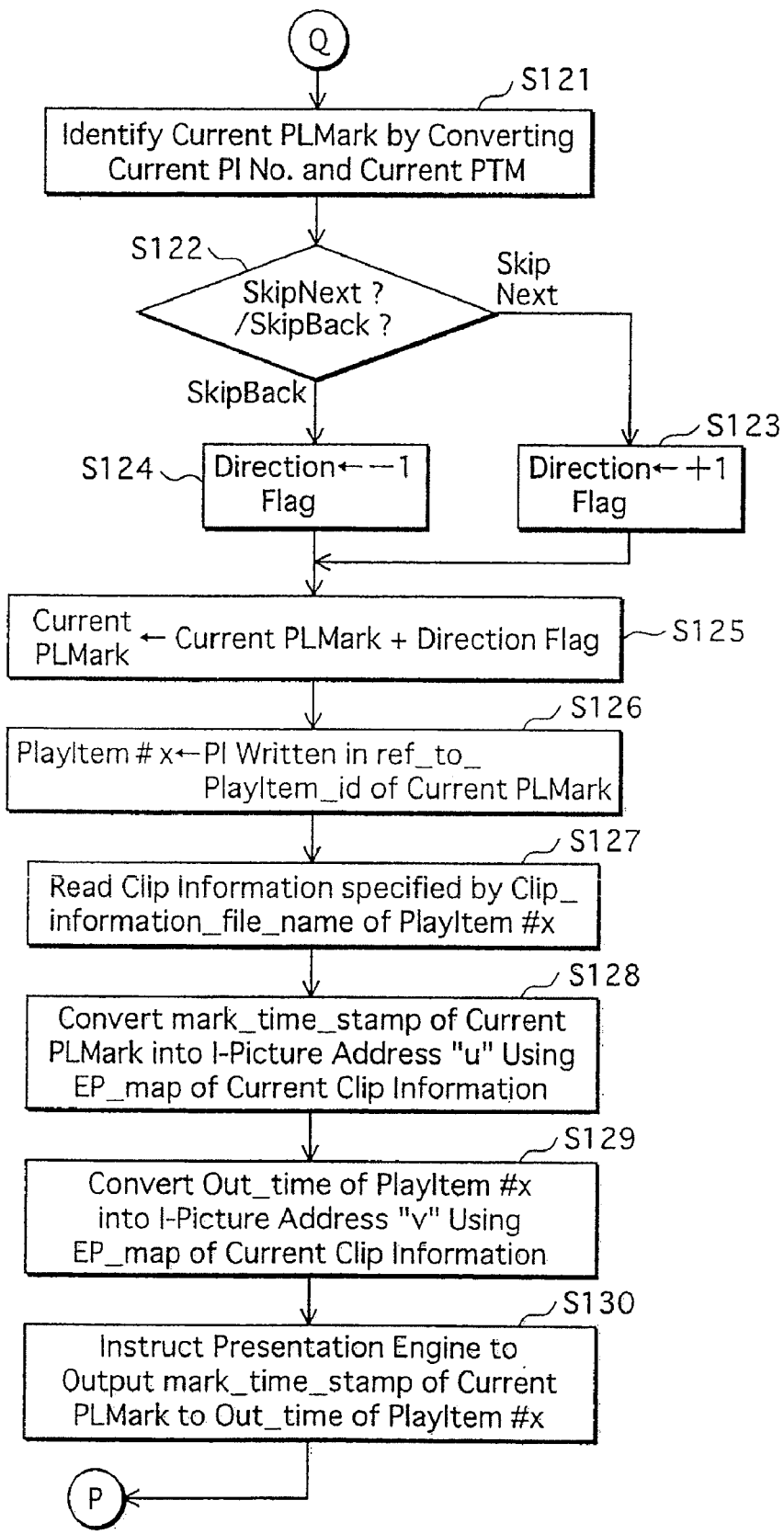
FIG. 52 is a flowchart showing the process procedure that is executed when it is judged that the SkipBack/SkipNext API was called.

On the other hand, in step S112 in the loop of FIG. 51, it is judged whether or not a SkipBack/SkipNext API was called from the Java™ virtual machine 38. And if it is judged that the SkipBack/SkipNext API was called, the process procedure shown in the flowchart of FIG. 52 is execute. FIG. 52 is a flowchart showing the process procedure that is executed when it is judged that the SkipBack/SkipNext API was called. The process procedure for executing the SkipBack or the SkipNext is of great variety. It should be noted therefore that only an example of such is described here.

In step s121, the current Mark information is obtained by converting the current PI number indicated by the PSR, and the current PTM. In step s122, it is judged whether the depressed is the SkipNext key or the SkipBack key. If the SkipNext key was depressed, the direction flag is set to "+1" in step S123. If the SkipBack key was depressed, the direction flag is set to "−1" in step S124.

In step s125, the current PL Mark number is set to a number that is obtained by adding the current PL Mark number to the value of the direction flag. Here, if the SkipNext key was depressed, the direction flag is set to "+1", and therefore the current PL Mark is incremented; if the SkipBack key was depressed, the direction flag is set to "−1", and therefore the current PL Mark is decremented.

In step s126, the PI described in the ref_to_PlayItem_Id of the current PL Mark is set to the PlayItem #x. In step S127, the Clip information specified by the Clip_information_file_name of the PlayItem #x is read. In step S128, the mark_time_stamp of the current PL Mark is converted into the I-Picture address "u" using the EP_map of the current Clip information. On the other hand, in step S129, the Out_time of the PlayItem #x is converted into the I-Picture address "v" using the EP_map of the current Clip information. In step S130, the presentation engine 31 is instructed to output data ranging from the mark_time_stamp of the current PL Mark to the Out_time of the PlayItem #x. The process shown in FIG. 50 that is executed simultaneously with the present process is stopped, and then the control moves to step S107 of FIG. 50. In this way, the control moves to step S107 after the I-Picture addresses "u" and "v" are changed and a playback of another portion is instructed. With the move to step S107, TS packets are read from another AVClip, and the video contents are changed.

Figure 53:
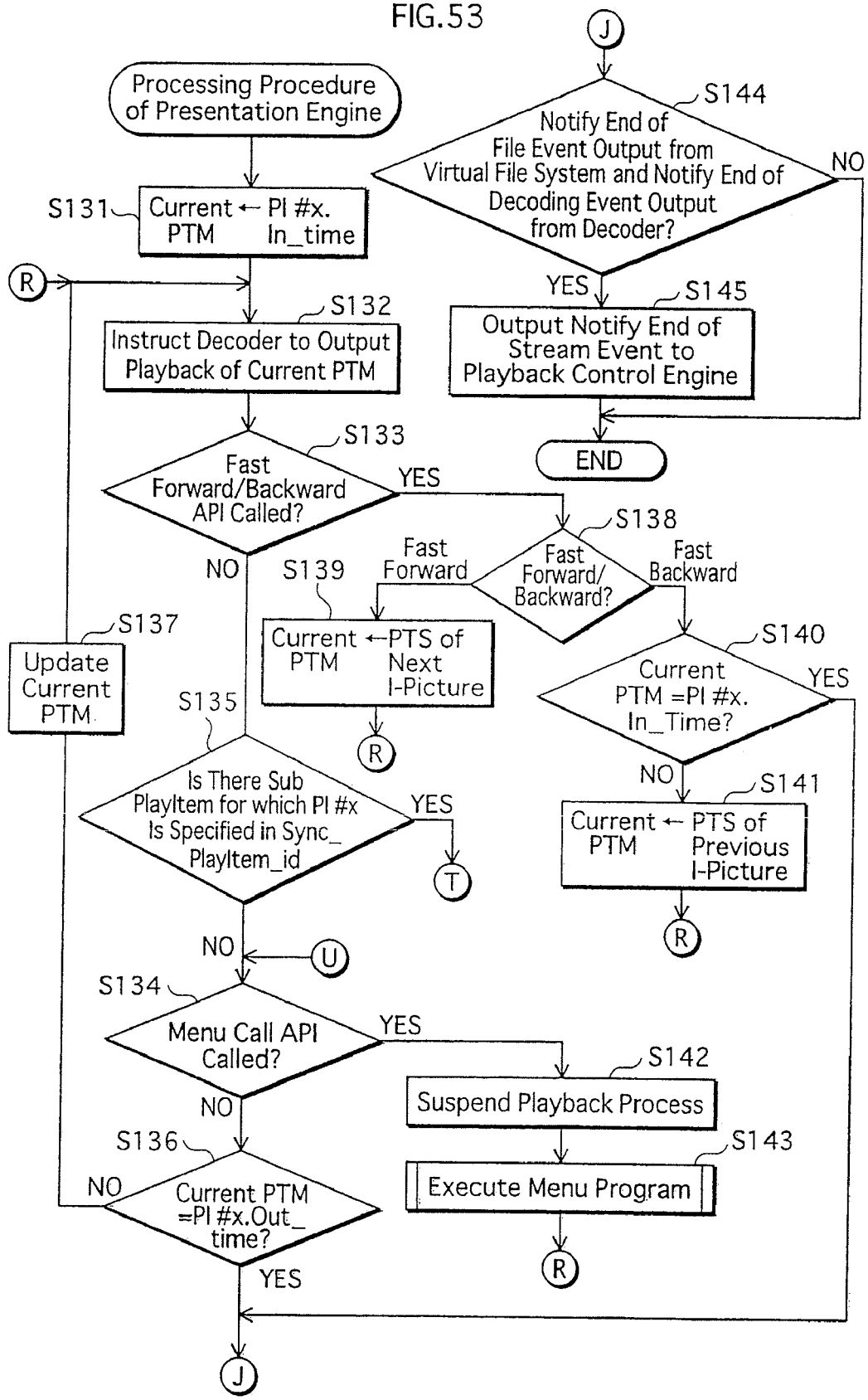
FIG. 53 is a flowchart that shows the process procedure of the presentation engine 31 in detail.

FIG. 53 is a flowchart that shows the process procedure of the presentation engine 31 in detail. In this flowchart, after the PTS of the I-Picture is set to the current PTM (step S131), a loop process composed of steps S132 to S137 is executed.

The following describes the loop process composed of steps S132 to S137. In this loop process, the output of the picture and audio corresponding to the current PTM and the update of the current PTM are repeated. In the loop process, step S136 defines a necessary condition for the loop process to end. That is to say, step S136 defines that it is necessary for the loop process to end that the current PTM is the Out_time of the PI #x.

In step S133, it is judged whether or not a FastForward API of a FastBackward API was called from the Java™ virtual machine 38. If it is judged that a FastForward API of a FastBackward API was called, it is judged in step S138 whether the called API is FastForward or FastBackward. If it is FastForward, the PTS of the next I-Picture is set to the current PTM (step S139). By setting the current PTM to the PTS of the next I-Picture, it is possible to playback the AVClip forward skipping every one second. With this arrangement, the AvClip is played back in the forward direction at the double speed or the like. In the case of FastBackward, it is judged whether or not the current PTM has reached the Out_time of the PlayItem #x (step S140). If it is judged that the current PTM has not reached the Out_time of the PlayItem #x, the PTS of the previous I-Picture is set to the current PTM (step S141). In this way, by setting the read destination address A to the previous I-Picture, it is possible to play back the AVClip backward skipping every one second. With this arrangement, the AVClip is played back in the backward direction at the double speed or the like. The process procedure for executing the FastForward or FastBackward is of great variety. It should be noted therefore that only an example of such is described here.

In step S134, it is judged whether or not a menu call API was called. If it is judged that a menu call API was called, the current playback process is suspended (step S142), and the menu program for the menu process is executed (step S143). With this process, when a menu call is performed, the playback process is suspended, and the menu program for the menu process is executed.

Figure 54:
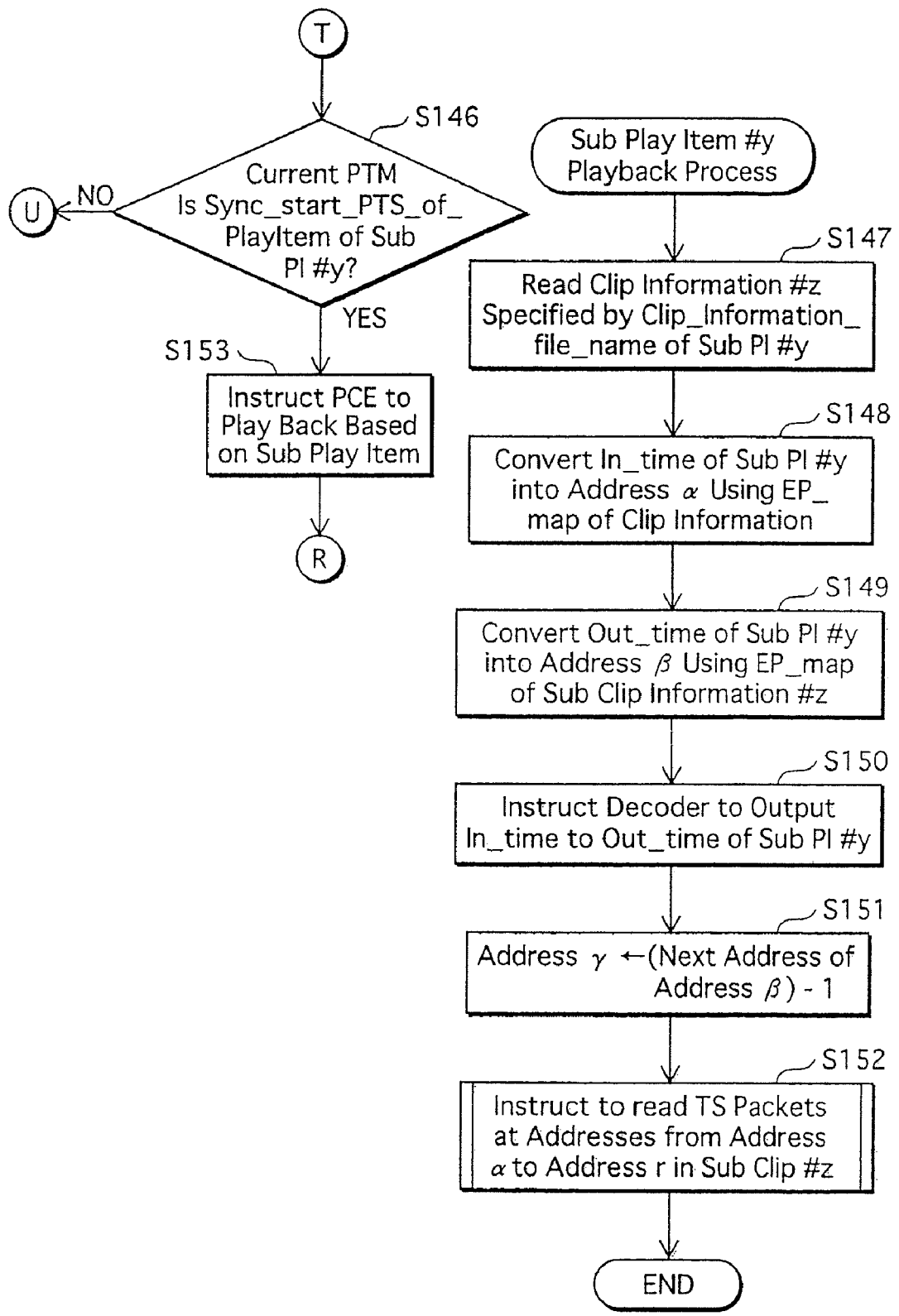
FIG. 54 is a flowchart showing the process procedure of the SubPlayItem.

In step S135, it is judged whether or not there is a SubPlayItem #y for which PlayItem #x is specified in sync_PlayItem_id. If it is judged that there is such a SubPlayItem #y, the control moves to the flowchart shown in FIG. 54. FIG. 54 is a flowchart showing the process procedure of the SubPlayItem. In this flowchart, first in step S146, it is judged whether or not the current PTM is Sync_start_PTS_of_PlayItem of Sub PI #y. If it is judged that the current PTM is Sync_start_PTS_of_PlayItem of Sub PI #y, the control moves to step S153 in which the playback control engine 32 is instructed to perform the playback process in accordance with the SubPlayItem #y.

If it is judged as YES in step S136, steps S144 and S145 are executed. In step S144, it is judged whether or not both of the following were satisfied: (i) the Notify End Of File event was output from the virtual file system 30; and (ii) the Notify End Of Decoding event was output from the decoder. If both were satisfied, the Notify End Of Stream event is output to the playback control engine 32.

The steps S147 to S152 of FIG. 54 constitute a flowchart that shows the process procedure that is based on the SubPlayItem #y.

In step S147, the Clip information specified by the Clip_information_file_name of the SubPlayItem #y is read. In step S148, the In_time of the SubPlayItem #y is converted into address α using the EP_map of the current Clip information. In step S149, the Out_time of the SubPlayItem #y is converted into address β using the EP_map of the current Clip information. In step S150, the decoder is instructed to output In_time to Out_time of the SubPlayItem #y. An address that is obtained by subtracting "1" from the next I-Picture address of the I-Picture address β is set to address γ (step S151). The BD-ROM drive 1 or the local storage 18 is instructed to read TS packets from the locations at the address α to the address γ in the SubClip #z (step S152).

Now, back to FIG. 50, the description of the process of the playback control engine 32 will be continued. In step S19, it is judged whether or not the playback control by the presentation engine 31 has completed. It is continued to be judged as NO in step S113 in so far as the process shown in the flowchart of FIG. 53 is performed upon the last PlayItem #x. When the process shown in the flowchart of FIG. 53 is completed, it is judged as YES in step S113, and the control moves to step S114. In step S114, the Notify event is output to the Java™ virtual machine 38. With this output, the Java™ virtual machine 38 can recognize elapse of two hours in the playback.

According to the present embodiment as described above, the application manager 36 can recognize the time at which the playback has continued for two hours. This enables the application manager 36 to instruct the Java™ virtual machine 38 to perform a process in synchronization with the end of the playback of the PlayList.

Notes

The above description does not show all the embodiments of the present invention. The present invention can be achieved by the following embodiments (A), (B), (C), (D), .... The invention defined in the claims of the present application is expansion or generalization of the above-described embodiments or modifications thereof. The level of the expansion or generalization is based on the technical level in technical field of the present invention at the time the present application is filed (A) In all the embodiments described above, the optical disc for achieving the present invention is indicated as the BD-ROM. However, the optical disc for achieving the present invention is characterized by the dynamic scenario recorded thereon and the IndexTable, and these characteristics do not depend on the physical property of the BD-ROM. Accordingly, any recording medium on which the dynamic scenario and the IndexTable can be recorded is applicable to the present invention. For example, an optical disc such as DVD-ROM, DVD-RAM, DVD-RW, DVD-R, DVD+RW, DVD+R, CD-R, and CD-RW, or a magneto-optical disk such as PD or MO may be used. Also, a semiconductor memory card such as the compact Flash™ card, smart media, memory stick, multimedia card, or PCM-CIA card may be used for the present invention. Also, (i) a magnetic recording disk such as the flexible disk, SuperDisk, Zip, or Clik!, or (ii) a removable hard disk drive such as the ORB, Jaz, SparQ, SyJet, EZFley, or micro-drive may be used for the present invention. Further, a hard disk that is embedded in an apparatus may be used for the present invention.

(B) In all the embodiments described above, the playback apparatus decodes AVClips recorded on the BD-ROM before it outputs them to the TV. However, the playback apparatus may be composed of only a BD-ROM drive, and component elements other than the BD-ROM drive may be provided in the TV. In this case, the playback apparatus and the TV may be incorporated into a home network to which they are connected by the IEEE1394. Also, in the embodiments described above, the playback apparatus is of a type that requires, for use thereof, the playback apparatus to be connected to a TV. However, the playback apparatus may be of a type in which a display is built in the playback apparatus. Further, a portion of the playback apparatus that achieves an essential process in each embodiment may be regarded as the playback apparatus of the present invention. Such playback apparatuses are each an invention described in the present application. And therefore, an act of manufacturing a playback apparatus based on the internal structure of the playback apparatus shown in each embodiment should be regarded as a practice of the invention that is described in the present application. Also, an act of transferring either for profit or for free (the case of "for profit" being selling, the case of "for free" being giving), lending, or importing the playback apparatus shown in each embodiment should be regarded as a practice of the present invention. Further, An act of offering, through an over-the-counter display, a catalog, distribution of a pamphlet or the like, the transferring or lending of the playback apparatus to the general user should also be regarded as a practice of the present invention.

(C) The program whose process procedure is shown in each flowchart is regarded as an independent invention since the program uses concrete hardware resources for the information processing performed by the program as shown in each flowchart. In the description of the achievement of the program of the present invention in each embodiment, the program is embedded in the playback apparatus. However, the program may be separated from the playback apparatus and may be used as a separate entity to realize the independent program shown in each embodiment. Such a practice of the present invention using the program shown in each embodiment as a separate entity is classified into, for example: (1) an act of manufacturing the program; (2) an act of transferring the program either for profit or for free; (3) an act of lending the program; (4) an act of importing the program; (5) an act of providing the public with the program via a bi-directional electronic communication line; and (6) an act of offering, through an over-the-counter display, a catalog, distribution of a pamphlet or the like, transferring or lending of the program to the general user.

(D) The time-related elements that are executed in time series in the steps of each flow chart are considered to be essential in identifying the present invention. It is considered therefore that the procedures shown in the flow charts disclose the use form of the playback method. It is therefore needless to say that implementing the steps of the flowcharts in time series to achieve an object of the present invention, obtaining the actions and effects of the present invention, is regarded as a practice of the present invention.

(E) When AVClips are recorded on the BD-ROM, it is desirable that an extension header is attached to each TS packet that constitutes the AVClips. The extension header is called TP_extra_header, includes "Arribval_Time_Stamp" and "copy_permission_indicator", and has a data length of four bytes. The TS packets with the TP_extra_header (herein after referred to as TS packets with EX) are divided into groups of 32, and are written into three sectors. Each group of 32 TS packets with EX has 6144 bytes (=32×192). This size of each group matches the size of each of the three sectors that is 6144 bytes (=2048×3). Each group of 32 TS packets with EX stored in the three sectors is called "Aligned Unit".

In use in a home network to which it is connected via the IEEE1394, a playback apparatus 200 transmits the Aligned Unit with the following transmission process. That is to say, a device on the side of a transmitter removes the TP_extra_header from each of the playback control engine 32 TS packets with EX contained in the Aligned Unit, encodes each body of the TS packets in accordance with the DTCP standard, and outputs the encoded TS packets. When outputting the encoded TS packets, the device inserts isochronous packets into the encoded TS packets. The positions of the isochronous packets to be inserted in the encoded TS packets are determined based on the time indicated by the Arribval_Time_Stamp of the TP_extra_header. When the TS packets are output, the playback apparatus 200 outputs DTCP_Descriptor. The DTCP_Descriptor indicates a copy permission/prohibition setting in the TP_extra_header. Here, describing the DTCP_Descriptor to indicate "copy prohibition" prohibits the TS packets from being recorded by other devices during the use in the home network connected via the IEEE1394.

(F) In all the embodiments described above, the digital stream recorded on the recording medium is the AVClip. However, the digital stream may be the VOB (Video Object) conforming to the DVD-Video standard or the DVD-Video Recording standard. The VOB is a program stream that is obtained by multiplexing video streams and audio streams, the program stream conforming to the ISO/IEC13818-1 standard. Also, the video stream in the AVClip may conform to the MPEG4 or WMV system. Further, the audio stream may conform to the Linear-PCM system, Dolby-AC3 system, MP3 system, MPEG-AAC system, Dts, or WMA (Windows (™) media audio).

(G) In all the embodiments described above, the video works may be obtained by encoding analog video signals that are broadcast by the analog broadcasting. Also, the video works may be stream data that is composed of transport streams broadcast by the digital broadcasting.

Also, a content may be obtained by encoding analog/digital video signals recorded on the video tape. Further, a content may be obtained by encoding analog/digital video signals that are directly obtained from a video camera. Further, a digital work may be obtained through distribution by a distribution server.

(H) The BD-J module 35 may be a Java™ platform that is embedded in a device for receiving satellite broadcast. When the BD-J module 35 is the Java™ platform, the playback apparatus of the present invention also performs processes as STB for MHP.

Further, the BD-J module 35 may be a Java™ platform that is embedded in a device for performing the process control of a mobile phone. When the BD-J module 35 is the Java™ platform, the playback apparatus of the present invention also performs processes as a mobile phone.

(I) in the layer model, the HDMV mode may be positioned on the BD-J mode. This is because especially the analysis of the dynamic scenario in the HDMV mode and the execution of the control procedure based on the dynamic scenario put light load on the playback apparatus, and there is no problem in executing the HDMV mode on the BD-J mode. Also, in the development process of the playback apparatus or a movie work, the operations can be guaranteed by only one mode.

Further, the playback process may be executed only in the BD-J mode. This is because as shown in Embodiment 5, a playback control can be performed in synchronization with a playback of a PL in the BD-J mode, and therefore the HDMV mode may not necessarily be provided.

(J) A branch between PLs may be achieved by providing a navigation command in an interactive graphics stream that is to be multiplexed into an AVClip.

(K) in Embodiment 1, the Title unboundary application is defined as a Tile whose life cycle extends over all the Titles that belong to one BD-ROM. However, the Title unboundary application may be defined as a Tile whose life cycle extends over all the Titles that belong to a plurality of BD-ROMs.

(L) In Embodiment 1, in creating the application management table, it is desirable that the number of applications that can be executed simultaneously is restricted to, for example, 4 or less.

The reason why the number of applications that can be executed simultaneously should be restricted to 4 or less is as follows. There are many BD-ROM playback apparatuses that are provided with a digital broadcast tuner function, and an application for achieving the tuner function is often resident in the memory. To make room for the resident application to operate, the number of applications that can be executed simultaneously is restricted to 4 or less. It is desirable that among the four applications, the first is the Title unboundary application, the second is the Title boundary application, and the third is the chapter boundary application.

(M) In Embodiment 2, the error management table is defined such that when one application terminates abnormally, one recovery process is performed. However, when one application terminates abnormally, a plurality of recovery processes may be performed. That is to say, when one application terminates abnormally, the playback apparatus may perform a continuation of a playback of a PlayList, a restart of an application, and an output of an event.

Also, the error management table may be constructed such that one recovery process is defined for each Title, not for each application.

(N) The AVClip can have an interactive graphics stream multiplexed therein for displaying a menu and receiving an interactive operation via the menu. Accordingly, the top menu Title may be created only by describing a navigation command, which only instructs to play back an AVClip for displaying the top menu and receiving an interactive operation, in the Movie Object (O) In each embodiment described above, the directory/file structure and the data structure in the files are provided as examples. The management information, which is one characteristic of the present invention, does not depend on the directory/file structure and the data structure in the files. Therefore, for example, the BD-J Object, which is an operation scenario in the BD-J mode, may be incorporated in the BDJA directory as a file (ZZZZZ.BD-J) having identifiers "bobj_id" and "BD-J", and only the identifier "bobj_id" may be stored in the BD-J Object[n] ( ) of the BD-J. Object.bdmv.

INDUSTRIAL APPLICABILITY

The recording medium and the playback apparatus of the present invention may be used personally as in a home theater system. However, the recording medium and the playback apparatus of the present invention may also be used industrially since the internal structure thereof is disclosed in the embodiments described above, and it is apparent that the recording medium and the playback apparatus of the present invention will be mass-produced. For this reason, the recording medium and the playback apparatus of the present invention have industrial applicability.

We claim:

1. A non-transitory machine readable recording medium in which a machine readable application program, a digital stream, a title, and management information including plural pieces of play list information which define playback: paths of the digital stream are recorded, the machine readable application program being a program written in a programming language which is readable by a virtual machine included in a machine, a life cycle during which the machine readable application program can be read and executed by the virtual machine being specified, and the management information includes first play list information among plural pieces of play list information, which defines a playback path of the digital stream and is requested to be played back by the application program that is executed by the virtual machine during the life cycle.

2. A non-transitory computer readable recording medium in which an application program written in a programming language, a digital stream, a title, and management information are recorded, the management information including first play list information which defines a playback path of the digital stream and is play list information that is requested to be played back by the application program that is executed by a virtual machine during a life cycle during which the application program can be read and executed by the virtual machine, the application program, the digital stream, the title, and the management information being read into a computer that includes:

a playback control engine operable to play back the digital stream that is recorded in the recording medium and is related to the title recorded in the recording medium; and a program module including the virtual machine that executes the application program that has been read onto a work memory from the recording medium, wherein when the life cycle, in which the virtual machine can execute the application program read onto the work memory, is reached within a playback period of the title recorded in the recording medium, the program module reads the application program from the recording medium onto the work memory and causes the virtual machine to execute the application program, and upon receiving, from the application program executed by the virtual machine in the life cycle, a request to play back the first play list information which being play list information recorded in the recording medium, defines the playback path of the digital stream related to the title and is requested to be played back by the application program, the program module causes the playback control engine to play back the digital stream in accordance with the playback path defined by the first play list information.

3. A playback apparatus, comprising:

a playback control engine operable to play back a digital stream that is recorded in a recording medium and is related to a title recorded in the recording medium; and a program module including a virtual machine that executes an application program that has been read onto a work memory from the recording medium, wherein when a life cycle, in which the virtual machine can execute the application program read onto the work memory, is reached within a playback period of the title recorded in the recording medium, the program module reads the application program from the recording medium onto the work memory and causes the virtual machine to execute the application program, and upon receiving, from the application program executed by the virtual machine in the life cycle, a request to play back first play list information which, being play list information recorded in the recording medium, defines a playback path of the digital stream related to the title and is requested to be played back by the application program the program module causes the playback control engine to play back the digital stream in accordance with the playback path defined by the first play list information.

4. A non-transitory recording medium in which a computer readable program is recorded, the computer readable program causing the computer to perform:

when a life cycle, in which an application program can be read onto a work memory of the computer and executed, is reached within a playback period of a title recorded in the recording medium, reading the application program from the recording medium onto the work memory and causing a virtual machine provided in the computer to execute the application program; and upon receiving, from the application program in the life cycle a request to play back first play list information which, being play list information recorded in the recording medium, defines a playback path of a digital stream related to the title and is requested to be played back by the application program, playing back the digital stream in accordance with the playback path defined by the first play list information.

5. A playback method for a playback apparatus, the playback method comprising:

when a life cycle, in which a virtual machine can execute an application program read onto a work memory, is reached within a playback period of a title recorded in a recording medium, reading the application program from the recording medium onto the work memory and causing the virtual machine to execute the application program; and upon receiving, from the application program in the life cycle, a request to play back first a list information which, being lay list information recorded in the recording medium, defines a playback path of a digital stream related to the title and is requested to be played back by the application program, causing a playback control engine to play back the digital stream in accordance with the playback path defined by the first play list information.

6. A machine for playing back a digital stream by executing a machine readable application which is recorded in a machine readable recording medium according to claim 1.

7. A computer for playing back a digital stream by executing an application program which is recorded in a computer readable recording medium according to claim 2.

8. A recording method, comprising:

recording, in a machine readable recording medium, a machine readable application program, a digital stream, and management information including plural pieces of play list information which define playback paths of the digital stream, the machine readable application program being a program written in a programming language readable by a virtual machine included in a machine, a life cycle during which the machine readable application program can be read and executed by the virtual machine being specified, and the management information includes first play list information, among plural pieces of play list information, which defines a playback path of the digital stream and is requested to be played back by the application program that is executed by the virtual machine during the life cycle.

9. The playback method of claim 5, further comprising:

when the life cycle is reached, playing back the digital stream in accordance with a playback path defined by second play list information which, being play list information recorded in the recording medium, defines the playback path of the digital stream related to the title that is to be played back simultaneously with the execution of the application program, and upon receiving, from the application program, the request to play back the first play list information, causing the playback control engine to play back the digital stream in accordance with the playback path defined by the first play list information instead of playing back the digital stream in accordance with the playback path defined by the second play list information.

* * * * *